US012792170B2

(12) United States Patent
Feng et al.

(10) Patent No.: US 12,792,170 B2
(45) Date of Patent: Nov. 10, 2026

(54) DISPLAY SUBSTRATE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Dawei Feng, Beijing (CN); Xiaojuan Wu, Beijing (CN); Zhiqiang Yu, Beijing (CN); Feng Liu, Beijing (CN); Ning Wang, Beijing (CN); Jiaxing Wang, Beijing (CN); Jinshuai Duan, Beijing (CN); Cuiyu Chen, Beijing (CN); Danxing Hou, Beijing (CN); Xiaofeng Yin, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 57 days.

(21) Appl. No.: 18/869,822

(22) PCT Filed: Sep. 15, 2023

(86) PCT No.: PCT/CN2023/119009
§ 371 (c)(1),
(2) Date: Nov. 26, 2024

(87) PCT Pub. No.: WO2025/054950
PCT Pub. Date: Mar. 20, 2025

(65) Prior Publication Data

US 2026/0244289 A1 Aug. 20, 2026

(51) Int. Cl.
*G06F 3/046* (2006.01)
*G06F 3/041* (2006.01)
*G02F 1/1333* (2006.01)

(52) U.S. Cl.
CPC ........ *G06F 3/0412* (2013.01); *G06F 3/04164* (2019.05); *G06F 3/046* (2013.01); *G02F 1/13338* (2013.01)

(58) Field of Classification Search
CPC ............................. G06F 3/046; G06F 3/04164
See application file for complete search history.

(56) References Cited

U.S. PATENT DOCUMENTS 11,662,867 B1 * 5/2023 Krah .................. G06F 3/04164 345/174
2014/0184559 A1 * 7/2014 Han ...................... G06F 3/0412 345/174

(Continued)

FOREIGN PATENT DOCUMENTS

CN 1825258 A 8/2006
CN 103543899 A 1/2014

(Continued)

OTHER PUBLICATIONS

International Search Report and Written Opinion dated Nov. 22, 2023, for corresponding PCT Application No. PCT/CN2023/119009, 6 pgs.

(Continued)

*Primary Examiner* — Kevin M Nguyen
(74) *Attorney, Agent, or Firm* — Kinney & Lange, P.A.

(57) ABSTRACT

A display substrate and a display device are provided. In the display substrate, a first touch line and a second touch line are at least located in a display region. The first touch line extends in a first direction, and the second touch line extends in a second direction. The first touch line is electrically connected to the first common signal line and the touch (Continued)

bonding terminal. The second touch line is electrically connected to the second common signal line and the touch bonding terminal. The first touch lines include M first touch line groups. The second touch lines include N second touch line groups. The first and second touch line groups are electrically connected to different sensing terminals of the touch bonding terminal, and different first touch line groups are electrically connected to different sensing terminals, while different second touch line groups are electrically connected to different sensing terminals.

20 Claims, 39 Drawing Sheets

(56) References Cited

U.S. PATENT DOCUMENTS

| | | | |
|---|---|---|---|
| 2017/0003786 | A1 | 1/2017 | Kim et al. |
| 2018/0348935 | A1 | 12/2018 | Kurasawa et al. |
| 2021/0168585 | A1 | 6/2021 | Li et al. |
| 2023/0049665 | A1 | 2/2023 | Lim |

FOREIGN PATENT DOCUMENTS

| | | | |
|---|---|---|---|
| CN | 104049814 | A | 9/2014 |
| CN | 104063091 | A | 9/2014 |
| CN | 104166489 | A | 11/2014 |
| CN | 104317467 | A | 1/2015 |
| CN | 104536637 | A | 4/2015 |
| CN | 104915083 | A | 9/2015 |
| CN | 106033765 | A | 10/2016 |
| CN | 106415458 | A | 2/2017 |
| CN | 107438820 | A | 12/2017 |
| CN | 108733256 | A | 11/2018 |
| CN | 107505795 | B | 5/2020 |
| CN | 112230480 | A | 1/2021 |
| CN | 114721534 | A | 7/2022 |
| JP | H06265844 | A | 9/1994 |
| KR | 20190105292 | A | 9/2019 |
| KR | 102179005 | B1 | 11/2020 |

OTHER PUBLICATIONS

Non-Final Office Action dated Jul. 23, 2026, received for U.S. Appl. No. 18/994,536, 14 pgs.

* cited by examiner

DISPLAY SUBSTRATE AND DISPLAY DEVICE

CROSS-REFERENCE TO RELATED APPLICATION(S)

This application is a Section 371 National Stage Application of International Application No. PCT/CN2023/119009, filed on Sep. 15, 2023, entitled "DISPLAY SUBSTRATE AND DISPLAY DEVICE", the content of which is incorporated herein by reference in its entirety.

TECHNICAL FIELD

The present disclosure relates to a field of display technology, in particular to a display substrate and a display device.

BACKGROUND

With a development of telecommuting and distance education, the market requirements for conference tablets or educational tablets that integrate writing, display, collaboration and other functions continues to increase. At present, products applied in scenes such as business and distance education may use electromagnetic touch technology (EMR technology for short) for writing experience.

Compared with traditional capacitive touch technology, electromagnetic touch technology has higher positioning accuracy and by matching active or passive pens, it is possible to achieve high-precision handwriting control and multi-level pressure sensing. However, the current electromagnetic touch technology uses an external electromagnetic touch coil, which generally requires to occupy additional space, so that a module is thicker and it is impossible to be thinned.

SUMMARY

In view of the above problems, the present disclosure provides a display substrate and a display device.

According to a first aspect of the present disclosure, a display substrate is provided, including a display region and a peripheral region at least partially surrounding the display region. The display substrate further includes:

- a base substrate;
- a plurality of sub-pixels disposed on the base substrate and located in the display region, where the plurality of sub-pixels are arranged in an array in a first direction and a second directions intersecting with the first direction;
- a first common signal line, a second common signal line and a touch bonding terminal disposed on the base substrate, where the first common signal line, the second common signal line and the touch bonding terminal are located in the peripheral region, the peripheral region includes a bonding pair region and a bonding region opposite to the bonding pair region in the first direction, and the touch bonding terminal is located in the bonding region; and
- a plurality of first touch lines and a plurality of second touch lines disposed on the base substrate, where the plurality of first touch lines and the plurality of second touch lines are at least located in the display region, the plurality of first touch lines and the plurality of second touch lines are insulated and spaced from each other, the plurality of first touch lines extend in the first direction, and the plurality of second touch lines extend in the second direction;
- where a first end of each of the plurality of first touch lines is electrically connected to the first common signal line, a second end of each of the plurality of first touch lines is electrically connected to the touch bonding terminal, a first end of each of the plurality of second touch lines is electrically connected to the second common signal line, and a second end of each of the plurality of second touch lines is electrically connected to the touch bonding terminal;
- where the plurality of first touch lines include M first touch line groups, the plurality of second touch lines include N second touch line groups, each first touch line group includes at least one first touch line, different first touch line groups include different first touch lines, each second touch line group includes at least one second touch line, and different second touch line groups include different second touch lines;
- where the touch bonding terminal includes a plurality of sensing terminals, the M first touch line groups and the N second touch line groups are electrically connected to different sensing terminals, different first touch line groups are electrically connected to different sensing terminals, and different second touch line groups are electrically connected to different sensing terminals; and
- where M and N are both positive integers.

According to embodiments of the present disclosure, the touch bonding terminal includes a plurality of first sensing terminals, a plurality of second sensing terminals, a plurality of third sensing terminals and a plurality of fourth sensing terminals, the plurality of first sensing terminals are located between two adjacent third sensing terminals, and the plurality of second sensing terminals are located between two adjacent fourth sensing terminals;

- where the M first touch line groups are electrically connected to the plurality of first sensing terminals, different first touch line groups are electrically connected to different first sensing terminals, the N second touch line groups are electrically connected to the plurality of second sensing terminals, and different second touch line groups are electrically connected to different second sensing terminals; and
- where an end of the first common signal line is electrically connected to one third sensing terminal, the other end of the first common signal line is electrically connected to another third sensing terminal, an end of the second common signal line is electrically connected to one fourth sensing terminal, and the other end of the second common signal line is electrically connected to another fourth sensing terminal.

According to embodiments of the present disclosure, orthographic projections of the plurality of first touch lines on the base substrate define a first pattern, orthographic projections of the plurality of second touch lines on the base substrate define a second pattern, and at least one of the first pattern and the second pattern covers an orthographic projection of the display region on the base substrate.

According to embodiments of the present disclosure, in the first direction, the first pattern protrudes from the orthographic projection of the display region on the base substrate, and in the second direction, the first pattern is located within the orthographic projection of the display region on the base substrate; and where the second pattern covers the orthographic projection of the display region on the base substrate.

According to embodiments of the present disclosure, in the first direction, the second pattern includes a first side edge and a second side edge opposite to the first side edge, the display region includes a third side edge and a fourth side edge opposite to the third side edge, a spacing between the first side edge and the third side edge is a first spacing, a spacing between the second side edge and the fourth side edge is a second spacing, and at least one of the first spacing and the second spacing is less than a width of a second touch line group.

According to embodiments of the present disclosure, the display substrate further includes a plurality of first touch leads and a plurality of second touch leads, where the peripheral region further includes two side edge regions opposite to each other in the second direction;

where the plurality of first touch lines are electrically connected to the touch bonding terminal through the plurality of first touch leads, and the first touch lines in different first touch line groups are electrically connected to the touch bonding terminal through different first touch leads;

where the plurality of second touch lines are electrically connected to the touch bonding terminal through the plurality of second touch leads, and the second touch lines in different second touch line groups are electrically connected to the touch bonding terminal through different second touch leads; and where the plurality of first touch leads are located in the bonding region, and the plurality of second touch leads are located in the same side edge region, and the plurality of second touch leads extend from the side edge region to the bonding region.

According to embodiments of the present disclosure, the display substrate further includes a plurality of gate lines and a plurality of data lines, where the plurality of gate lines and the plurality of data lines are located in the display region;

where the first common signal line includes a first line segment in the bonding pair region and a second line segment in the side edge region, the second common signal line includes a third line segment in the bonding pair region and a fourth line segment in the side edge region, the first line segment and the third line segment extend in the second direction, and the second line segment and the fourth line segment extend in the first direction;

where the first line segment and the third line segment are disposed on the same layer as the plurality of gate lines, and a material of each of the first line segment and the third line segment is the same as a material of each of the plurality of gate lines; and where the second line segment and the fourth line segment are disposed on the same layer as the plurality of data lines, and a material of each of the second line segment and the fourth line segment is the same as a material of each of the plurality of data lines.

According to embodiments of the present disclosure, the display substrate further includes a third common signal line disposed on the base substrate, where the third common signal line is located in the peripheral region, at least one sub-pixel includes a common electrode, and the third common signal line is electrically connected to the common electrodes of the plurality of sub-pixels;

where an orthographic projection of the third common signal line on the base substrate at least partially surrounds an orthographic projection of the display region on the base substrate;

where in the bonding pair region, an orthographic projection of the third line segment on the base substrate is located on a side of an orthographic projection of the first line segment on the base substrate away from the orthographic projection of the third common signal line on the base substrate; and where in the same side edge region, an orthographic projection of the second line segment on the base substrate is located on a side of an orthographic projection of the fourth line segment on the base substrate away from the orthographic projection of the third common signal line on the base substrate.

According to embodiments of the present disclosure, the display substrate further includes a gate driving circuit, where the gate driving circuit is located in at least one side edge region;

where in the same side edge region, the orthographic projection of the fourth line segment on the base substrate is located on a side of an orthographic projection of the gate driving circuit on the base substrate close to the orthographic projection of the third common signal line on the base substrate.

According to embodiments of the present disclosure, in the same side edge region, orthographic projections of the plurality of second touch leads on the base substrate are located on a side of an orthographic projection of the fourth line segment on the base substrate away from an orthographic projection of the second line segment on the base substrate.

According to embodiments of the present disclosure, orthographic projections of the plurality of first touch lines on the base substrate and orthographic projections of the plurality of first touch leads on the base substrate define a third pattern, and orthographic projections of the plurality of second touch lines on the base substrate and orthographic projections of the plurality of second touch leads on the base substrate define a fourth pattern; and where an orthographic projection of the first common signal line on the base substrate at least partially surrounds the third pattern, and an orthographic projection of the second common signal line on the base substrate at least partially surrounds the fourth pattern.

According to embodiments of the present disclosure, the display substrate further includes a first conductive layer, a first transparent electrode layer and a first insulation layer, where the first transparent electrode layer is located on a side of the first conductive layer away from the base substrate, the first insulation layer is located on a side of the first transparent electrode layer away from the base substrate, and the plurality of first touch lines are located in the first conductive layer;

where at least one sub-pixel includes a first transistor and a pixel electrode, the pixel electrode is located in the first transparent electrode layer, a first electrode of the first transistor is located in the first conductive layer, the first insulation layer covers the pixel electrode, the first electrode of the first transistor and the plurality of first touch lines; and where in the same sub-pixel, the pixel electrode is in connection with the first electrode of the first transistor.

According to embodiments of the present disclosure, the display substrate further includes a first conductive layer, a second insulation layer, a third conductive layer, a first transparent electrode layer and a first insulation layer, where the second insulation layer is located on a side of the third conductive layer away from the base substrate, the first conductive layer is located on a side of the second insulation layer away from the base substrate, the first transparent electrode layer is located on a side of the first conductive layer away from the base substrate, and the first insulation layer is located on a side of the first transparent electrode layer away from the base substrate;

where the plurality of first touch lines are located in the first conductive layer;

where at least one sub-pixel includes a first transistor and a pixel electrode, the pixel electrode is located in the first transparent electrode layer, a first electrode of the first transistor is located in the third conductive layer, the second insulation layer covers the first electrode of the first transistor, and the first insulation layer covers the pixel electrode and the plurality of first touch lines; and where in the same sub-pixel, the pixel electrode is electrically connected to the first electrode of the first transistor through a first via hole penetrating through the second insulation layer.

According to embodiments of the present disclosure, the display substrate further includes a first conductive layer on the base substrate, where the display substrate further includes a plurality of data lines, and the plurality of data lines extend in the first direction;

where the plurality of data lines and the plurality of first touch lines are located in the first conductive layer, and orthographic projections of the plurality of first touch lines on the base substrate do not overlap with orthographic projections of the plurality of data lines on the base substrate;

where the plurality of sub-pixels include a plurality of sub-pixel groups arranged in the second direction, and at least one sub-pixel group includes a plurality of sub-pixels arranged in the first direction; and where a plurality of sub-pixel groups are disposed between two adjacent first touch lines.

According to embodiments of the present disclosure, the display substrate further includes a second conductive layer on the base substrate;

where the display substrate further includes a plurality of gate lines and a plurality of common electrode lines, the plurality of gate lines extend in the second direction, the plurality of common electrode lines extend in the second direction, and the plurality of common electrode lines are electrically connected to common electrodes of the plurality of sub-pixels;

where the plurality of second touch lines, the plurality of gate lines and the plurality of common electrode lines are located in the second conductive layer;

where the plurality of sub-pixels include a plurality of sub-pixel groups arranged in the second direction, and at least one sub-pixel group includes a plurality of sub-pixels arranged in the first direction;

where at least one common electrode line, at least one gate line and at least one second touch line are disposed between two adjacent sub-pixels in the first direction; and where the second touch line and the common electrode line are symmetrical relative to the gate line between two adjacent sub-pixels in the first direction.

According to embodiments of the present disclosure, at least one sub-pixel includes a first transistor, and the first transistor is electrically connected to at least one gate line;

an orthographic projection of the first transistor electrically connected to the gate line between two adjacent sub-pixels on the base substrate in the first direction is located between an orthographic projection of the second touch line on the base substrate and an orthographic projection of the common electrode line on the base substrate.

According to embodiments of the present disclosure, the display substrate further includes a first conductive layer and a third conductive layer, where the third conductive layer is located on a side of the first conductive layer close to the base substrate;

where the display substrate further includes a plurality of data lines, the plurality of data lines extend in the first direction, the plurality of data lines are located in the third conductive layer, and the plurality of first touch lines are located in the first conductive layer; and where in the display region, an orthographic projection of at least one first touch line on the base substrate overlaps with an orthographic projection of at least one data line on the base substrate, and a ratio of an area of the overlapping region to an area of the first touch line is greater than or equal to 90%.

According to embodiments of the present disclosure, the display substrate further includes a second conductive layer and a fourth conductive layer, where the fourth conductive layer is located on a side of the second conductive layer close to the base substrate;

where the display substrate further includes a plurality of common electrode lines, the plurality of common electrode lines extend in the second direction, and the plurality of common electrode lines are electrically connected to common electrodes of the plurality of sub-pixels;

where the plurality of common electrode lines are located in the fourth conductive layer, and the plurality of second touch lines are located in the second conductive layer; and where in the display region, an orthographic projection of at least one second touch line on the base substrate overlaps with an orthographic projection of at least one common electrode line on the base substrate, and a ratio of an area of the overlapping region to an area of the second touch line is greater than or equal to 90%.

According to embodiments of the present disclosure, the display substrate further includes a first conductive layer, a second conductive layer, a third conductive layer and a fourth conductive layer, where the fourth conductive layer, the third conductive layer, the second conductive layer and the first conductive layer are sequentially disposed in a direction away from the base substrate;

where the display substrate further includes a plurality of common electrode lines and a plurality of data lines, the plurality of data lines extend in the first direction, the plurality of common electrode lines extend in the second direction, and the plurality of common electrode lines are electrically connected to common electrodes of the plurality of sub-pixels;

where the plurality of first touch lines are located in the first conductive layer, the plurality of second touch lines are located in the second conductive layer, the plurality of data lines are located in the third conductive layer, and the plurality of common electrodes are located in the fourth conductive layer; and where in the display region, an orthographic projection of at least one first touch line on the base substrate overlaps with an orthographic projection of at least one data line on the base substrate, and a ratio of an area of the overlapping region to an area of the first touch line is greater than or equal to 90%; and/or, an orthographic projection of at least one second touch line on the base substrate overlaps with an orthographic projection of at least one common electrode line on the base substrate, and a ratio of an area of the overlapping region to an area of the second touch line is greater than or equal to 90%.

According to embodiments of the present disclosure, the display substrate further includes a plurality of second touch leads, a gate driving circuit and a third common signal line;

where the third common signal line is located in the peripheral region, at least one sub-pixel includes a common electrode, the third common signal line is electrically connected to common electrodes of the plurality of sub-pixels, and the plurality of second touch lines are electrically connected to the touch bonding terminal through the plurality of second touch leads, and the second touch lines in the different second touch line groups are electrically connected to the touch bonding terminal through different second touch leads;

where the plurality of second touch leads are located in the second conductive layer, and a layer in which the first common signal line, the second common signal line, the third common signal line and the gate driving circuit are located is on a side of the second conductive layer close to the base substrate; and where orthographic projections of the plurality of second touch leads on the base substrate overlap with an orthographic projection of at least one of the first common signal line, the second common signal line, the third common signal line and the gate driving circuit on the base substrate.

According to embodiments of the present disclosure, the plurality of sub-pixels include a plurality of sub-pixel groups, the plurality of sub-pixel groups are arranged in the second direction, each sub-pixel group includes a plurality of sub-pixels arranged in the first direction, and the sub-pixels in different sub-pixel groups are different; and where at least one first touch line is disposed between two adjacent sub-pixel groups.

According to embodiments of the present disclosure, the plurality of sub-pixels include a plurality of sub-pixel groups arranged in the second direction, and each sub-pixel group includes a plurality of sub-pixels arranged in the first direction;

where at least one sub-pixel includes a common electrode, and the common electrode is provided with a plurality of slits;

where in at least one sub-pixel group, an orthographic projection of an $i^{th}$ slit of the plurality of sub-pixels on the base substrate defines a fifth pattern, and an orthographic projection of the at least one first touch line on the base substrate overlaps with the fifth pattern; and where i is a positive integer.

According to a second aspect of the present disclosure, a display device is provided, including the display substrate as described above.

BRIEF DESCRIPTION OF THE DRAWINGS

Through the following descriptions of embodiments of the present disclosures with reference to accompanying drawings, the above content, and other purposes, features and advantages of the present disclosure will be clearer, and in the drawings.

Through the following descriptions of embodiments of the present disclosures with reference to accompanying drawings, the above content, and other purposes, features and advantages of the present disclosure will be clearer, and in the drawings.

DETAILED DESCRIPTION OF EMBODIMENTS

Figure 1:
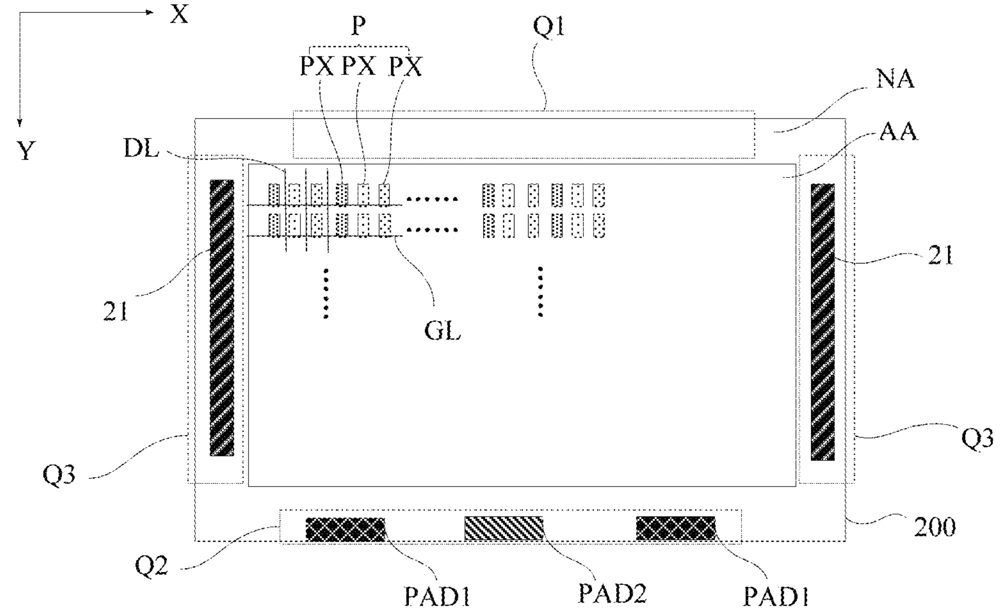
FIG. 1 schematically shows a first plan view of a display substrate according to embodiments of the present disclosure.

In order to make purposes, technical solutions, and advantages of embodiments of the present disclosure clearer, technical solutions in embodiments of the present disclosure will be described clearly and completely in combination with accompanying drawings. Apparently, the described embodiments are only part of embodiments of the present disclosure, not all of embodiments. Based on the described embodiments of the present disclosure, all other embodiments obtained by those of ordinary skill in the art without creative labor fall within the protection scope of the present disclosure.

It should be noted that, in the accompanying drawings, a dimension and a relative dimension of an element may be enlarged for clarity and/or description. In this way, the dimension and relative dimension of each element do not need to be limited to the dimension and relative dimension shown in the figure. In the specification and the accompanying drawings, the same or similar reference number indicates the same or similar component.

When an element is described as being "on", "connected to", or "coupled to" another element, the element may be directly on, directly connected to, or directly coupled to another element, or an intermediate element may exist. However, when an element is described as being "directly on", "directly connected to", or "directly coupled to" another element, there is no intermediate element. Other terms and/or expressions used to describe a relationship between elements will be interpreted in a similar manner, e.g., "between" versus "directly between", "adjacent" versus "directly adjacent", or "on" versus "directly on" etc. Furthermore, the term "connected" may refer to a physical connection, an electrical connection, a communication connection, and/or a fluid connection. In addition, an X axis, a Y axis and a Z axis are not limited to the three axes of a rectangular coordinate system, and may be interpreted in a broader sense. For example, the X, Y, and Z axes may be perpendicular to each other, or may represent different directions that are not perpendicular to each other. For the purposes of the present disclosure, "at least one of X, Y, or Z" and "at least one selected from the group composed of X, Y, and Z" may be interpreted as only X, only Y, only Z, or any combination of two or more of X, Y and Z such as XYZ, XY, YZ and ZZ. As used herein, the term "and/or" includes any combination and all combinations of one or more of the listed associated items.

It should be noted that although the terms "first", "second", etc. may be used here to describe various components, members, elements, regions, layers, and/or parts, these components, members, elements, regions, layers, and/or parts should not be limited by these terms. Instead, these terms are used to distinguish one component, member, element, region, layer, and/or part from another component, member, element, region, layer, and/or part. Therefore, for example, the first component, the first member, the first element, the first region, the first layer, and/or the first part described below may be referred to as the second component, the second member, the second element, the second region, the second layer, and/or the second part, without departing from the teachings of the present disclosure.

For ease of description, a spatially relational term, e.g., "upper", "lower", "left", "right", etc. may be used herein to describe a relationship between one element or feature with another element or feature as shown in the drawings. It should be understood that the spatially relational terms are intended to encompass other different orientations of the apparatus in use or operation in addition to an orientation depicted in the drawings. For example, if the apparatus in the drawings is turned over, the elements described as "below" or "beneath" the other elements or features may then be oriented "above" or "on" the other elements or features.

In the present disclosure, the terms "substantially", "about", "approximately", "roughly" and other similar terms are used as approximate terms rather than as terms of degree, and they are intended to explain the fixed deviation of measured or calculated values that will be recognized by those of ordinary skill in the art. Taking into account factors such as process fluctuations, measurement problems and errors related to the measurement of a specific amount (i.e., the limitations of the measurement system), the "about" or "approximately" used here includes the stated value, and indicates that the specific value determined by those of ordinary skill in the art is within the acceptable deviation range. For example, "about" may be expressed within one or more standard deviations, or within ±30%, ±20%, ±10%, ±5% of the stated values.

It should be noted that, in the present disclosure, the term "same layer" refers to a layer structure formed by using the same film-forming process to form a film layer with a specific pattern, followed by patterning the film layer through a single patterning process using the same mask. Depending on the specific shape, the single patterning process may include multiple exposure, development, or etching processes, and the specific shape in the formed layer structure may be continuous or discontinuous. That is, a plurality of elements, components, structures, and/or parts located in the "same layer" are formed by the same material and formed through the same patterning process. Typically, the plurality of elements, components, structures, and/or parts located in the "same layer" have substantially the same thickness.

Those skilled in the art should understand that in the present disclosure, unless otherwise specified, the term "height" or "thickness" refers to the dimensions along the surface of each film layer provided perpendicular to the display substrate, that is, the dimensions in the direction of light output of the display substrate, or the dimensions in the normal direction of the display device.

At present, electromagnetic touch technology is mainly applied to medium-sized screens and large-sized screens, and an electromagnetic induction coil may be disposed on a back side of a display module in an external method. For example, an independent circuit board is added on the back side of the display module, and the electromagnetic induction coil is formed on the circuit board. The electromagnetic induction coil may cooperate with a stylus to achieve touch function. The back side of the display module may refer to a backlit side of the display module. Accordingly, an emission side of the display module may be referred to as a display side.

For example, the electromagnetic induction coil may cooperate with a pressure sensor of the stylus and an electromagnetic field transmission device to sense a horizontal movement of the stylus on a display surface, and also sense a distance between the stylus and the display screen, so as to achieve position information detection in three dimensions, thereby achieving a rich pressure-sensitive touch effect and providing a delicate writing experience.

However, the external electromagnetic touch coil structure requires to occupy additional space, so that the entire module is thicker and it is impossible to be thinned.

In view of this, embodiments of the present disclosure provide a display substrate including a display region and a peripheral region at least partially surrounding the display region, where the display substrate further includes: a base substrate; a plurality of sub-pixels disposed on the base substrate and located in the display region, where the plurality of sub-pixels are arranged in an array in a first direction and a second direction intersecting with the first direction; a first common signal line, a second common signal line and a touch bonding terminal disposed on the base substrate, where the first common signal line, the second common signal line and the touch bonding terminal are located in the peripheral region, the peripheral region includes a bonding pair region and a bonding region opposite to the bonding pair region in the first direction, and the touch bonding terminal is located in the bonding region; and a plurality of first touch lines and a plurality of second touch lines disposed on the base substrate, where the plurality of first touch lines and the plurality of second touch lines are at least located in the display region, the plurality of first touch lines and the plurality of second touch lines are insulated and spaced from each other, the plurality of first touch lines extend in the first direction, and the plurality of second touch lines extend in the second direction; where a first end of each of the plurality of first touch lines is electrically connected to the first common signal line, a second end of each of the plurality of first touch lines is electrically connected to the touch bonding terminal, a first end of each of the plurality of second touch lines is electrically connected to the second common signal line, and a second end of each of the plurality of second touch lines is electrically connected to the touch bonding terminal; where the plurality of first touch lines include M first touch line groups, the plurality of second touch lines include N second touch line groups, each first touch line group includes at least one first touch line, different first touch line groups include different first touch lines, each second touch line group includes at least one second touch line, and different second touch line groups include different second touch lines; where the touch bonding terminal includes a plurality of sensing terminals, the M first touch line groups and the N second touch line groups are electrically connected to different sensing terminals, different first touch line groups are electrically connected to different sensing terminals, and different second touch line groups are electrically connected to different sensing terminals; and where M and N are positive integers.

In this way, the touch electromagnetic coil may be integrated on the display substrate, which is conducive to the lightness and thinness of the display product. Besides, the touch line groups (first touch line group and second touch line group) for forming touch electromagnetic coils may be selected as desired in practice, so that different sizes of touch electromagnetic coils may be selected to achieve different touch performance.

The display substrate of embodiments of the present disclosure will be explained in detail below.

FIG. 1 schematically shows a first plan view of a display substrate according to embodiments of the present disclosure.

With reference to FIG. 1, the display substrate in embodiments of the present disclosure includes a display region AA and a peripheral region NA located at least one side of the display region AA.

The display region AA may have various shapes. For example, the display region AA may have various shapes such as a shape of a closed polygon (such as rectangle) including straight sides; a shape of a circle or an ellipse, etc. including curved sides; or a shape of a semicircle or a semi ellipse, etc. including straight sides and curved sides. In embodiments of the present disclosure, the display region AA is provided as a region with a quadrilateral shape including straight sides. It should be understood that this is only an exemplary embodiment of the present disclosure, rather than a limitation on the present disclosure.

The display substrate may further include a base substrate 200 and a plurality of pixel units P disposed on the base substrate 200 and located in the display region AA. The plurality of pixel units P may be arranged in an array in a first direction Y and a second direction X. The first direction Y intersects with the second direction X, for example, the first direction Y may include a vertical direction in FIG. 1, and the second direction X may include a horizontal direction in FIG. 1, that is, the first direction Y and the second direction X are perpendicular to each other.

Each pixel unit P may include a plurality of sub-pixels PX. For example, the pixel unit P may include a first sub-pixel, a second sub-pixel and a third sub-pixel. For example, the first sub-pixel, the second sub-pixel and the third sub-pixel may be set as a red sub-pixel, a green sub-pixel and a blue sub-pixel, respectively. However, embodiments of the present disclosure are not limited to this.

With reference to FIG. 1, the plurality of sub-pixels PX may be arranged in an array in the first direction Y and the second direction X, but embodiments of the present disclosure are not limited to this. For convenience of expression, in embodiments of the present disclosure, the plurality of sub-pixels PX arranged in the first direction Y are referred to as a column of sub-pixels PX (or also known as a sub-pixel group), and the plurality of sub-pixels PX arranged in the second direction X are referred to as a row of sub-pixels PX.

The display substrate further includes a plurality of gate lines GL and a plurality of data lines DL disposed on the base substrate 200 and located at least in the display region AA. The plurality of data lines DL extend in the first direction Y, and the plurality of gate lines GL extend in the second direction X. For example, a sub-pixel PX is correspondingly connected to a data line DL and a gate line GL, the same row of sub-pixels PX are connected to the same gate line GL, different rows of sub-pixels PX are connected to different gate lines GL, the same column of sub-pixels PX are connected to the same data line DL, and different columns of sub-pixels PX are connected to different data lines DL.

The peripheral region NA may be disposed on at least one side of the display region AA. For example, the peripheral region NA may surround a periphery of the display region AA. In embodiments of the present disclosure, the peripheral region NA may include a vertical portion extending in the first direction Y and a lateral portion extending in the second direction X.

The display substrate may further include a gate driving circuit 21 and a display bonding terminal PAD1 disposed on the base substrate 200 and located in the peripheral region NA. For example, the gate driving circuit 21 may be located on at least one side of the display region AA. In the embodiment shown in FIG. 1, the gate driving circuit 21 is disposed on the left side of the display region AA and the right side of the display region AA, respectively. It should be noted that the left side and the right side may refer to the left side and the right side of the display substrate (screen) viewed by eyes during display. For example, the display bonding terminal PAD1 may be located on at least one side of the display region AA. In the embodiment shown in FIG. 1, the display bonding terminal PAD1 is located on a lower side of the display region AA. It should be noted that the lower side may be the lower side of the display substrate (screen) viewed by eyes during display.

The display bonding terminal PAD1 is used to be electrically connected to a display driving chip (not shown in the figure). For example, the display bonding terminal PAD1 may be directly connected to the display driving chip through bonding or other means. Alternatively, the display bonding terminal PAD1 may be connected to the display driving chip through a flexible circuit board and other devices. The display driving chip includes a data driving circuit. The data driving circuit is used to sequentially lock input data at scheduled times based on a clock signal and convert the locked data into an analog signal, and then input the analog signal onto various data lines DL of the display substrate. The gate driving circuit 21 is usually implemented by a shift register. The shift register converts the clock signal into a turn-on/turn-off voltage and outputs the turn-on/turn-off voltage to various gate lines GL of the display substrate.

It should be noted that although FIG. 1 shows the gate driving circuit 21 located on the left and right sides of the display region AA, and the display bonding terminal PAD1 located on the lower side of the display region AA, embodiments of the present disclosure are not limited to this. The gate driving circuit 21 and the display bonding terminal PAD1 may be located at any suitable position in the peripheral region NA.

For example, the gate driving circuit 21 may adopt GOA technology, that is, Gate Driver on Array. In GOA technology, the gate driving circuit 21 is directly disposed on an array substrate, so as to replace an external chip. Each GOA unit serves as a shift register, and each shift register is connected to a gate line GL. Through outputting a scanning signal by each shift register sequentially, the scanning of sub-pixels PX row by row may be achieved. In some embodiments, each shift register may be connected to a plurality of gate lines GL. In this way, it is possible to adapt to a development trend of high resolution and narrow borders of display substrate.

Figure 2:
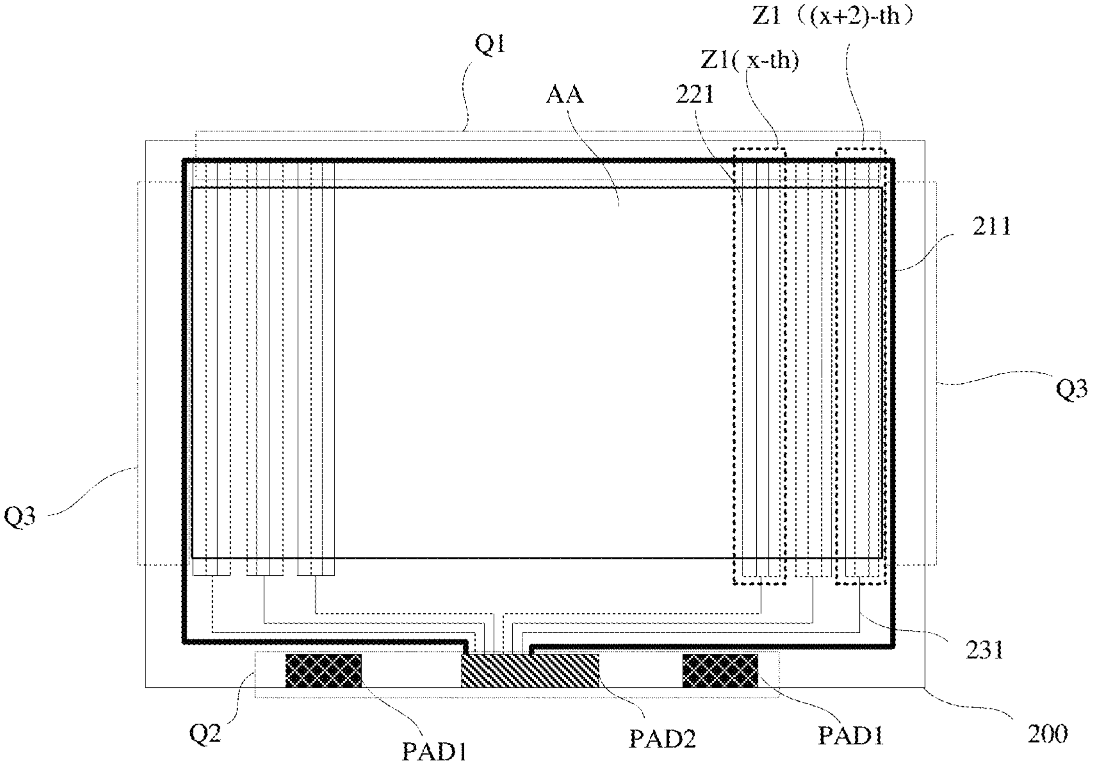
FIG. 2 schematically shows a plan view of a first touch line, a first common signal line, a first touch lead and a touch bonding terminal according to embodiments of the present disclosure.
Figure 3:
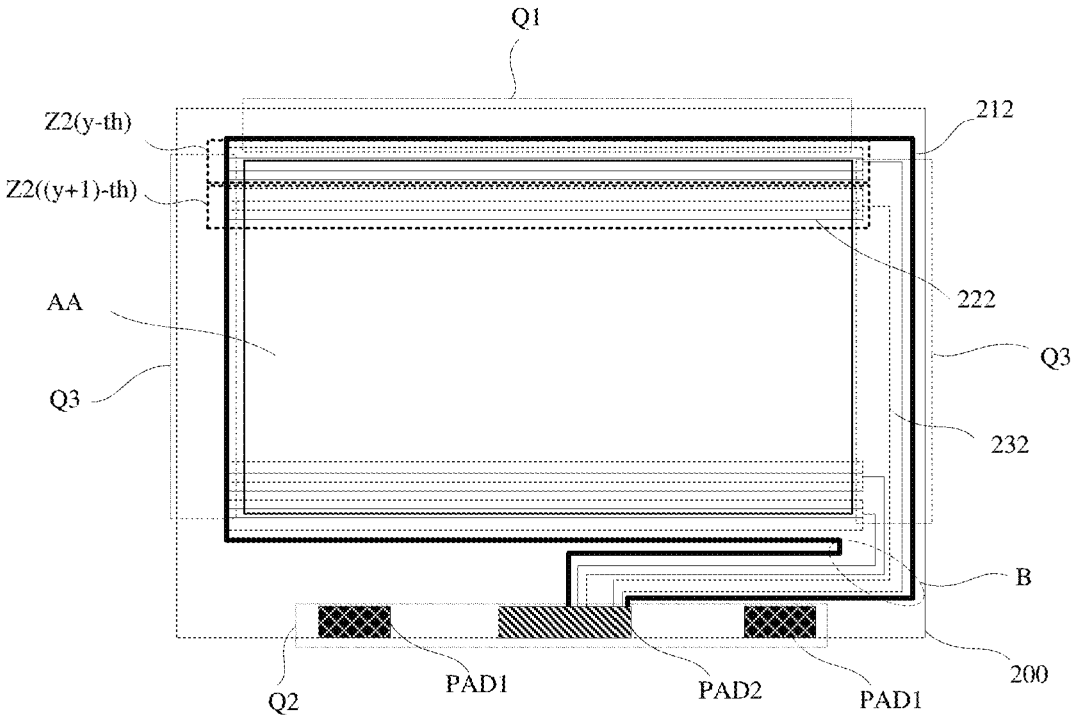
FIG. 3 schematically shows a plan view of a second touch line, a second common signal line, a second touch lead and a touch bonding terminal according to embodiments of the present disclosure.

FIG. 2 schematically shows a plan view of a first touch line, a first common signal line, a first touch lead and a touch bonding terminal according to embodiments of the present disclosure. FIG. 3 schematically shows a plan view of a second touch line, a second common signal line, a second touch lead and a touch bonding terminal according to embodiments of the present disclosure.

With reference to FIG. 2 and FIG. 3, in embodiments of the present disclosure, the display substrate further includes: a first common signal line 211, a second common signal line 212 and a touch bonding terminal PAD2 disposed on the base substrate 200. The first common signal line 211, the second common signal line 212 and the touch bonding terminal PAD2 are located in the peripheral region NA. The peripheral region NA includes a bonding pair region Q1 and a bonding region Q2 opposite to the bonding pair region Q1 in the first Y-direction. The touch bonding terminal PAD2 is located in the bonding region Q2.

With reference to FIG. 2, the bonding pair region Q1 is located above the display region AA, and the bonding region Q2 is located below the display region AA. The display bonding terminal PAD1 and the touch bonding terminal PAD2 are located in the bonding region Q2. In embodiments of the present disclosure, the first common signal line 211 may at least partially surround the display region AA. For example, with reference to FIG. 2, the first common signal line 211 surrounds at least an upper side of the display region AA, a left side of the display region AA and a right side of the display region AA, and the first common signal line 211 is electrically connected to the touch bonding terminal PAD1 on the lower side of the display region AA. The second common signal line 212 may at least partially surround the display region AA. For example, with reference to FIG. 3, the second common signal line 212 surrounds the upper side of the display region AA, the left side of the display region AA and the right side of the display region AA, and the second common signal line 212 is electrically connected to the touch bonding terminal PAD1 on the lower side of the display region AA.

The touch bonding terminal PAD1 may electrically connect the signal lines used for implementing touch function on the display substrate to a touch detection chip (not shown in the figure). The touch detection chip may be disposed at any suitable position on the display substrate, for example, the touch detection chip may be disposed on the back side of the display substrate. The signal lines used for implementing touch function include the first common signal line 211, the second common signal line 212, and a first touch line 221 and a second touch line 222 which will be mentioned below. The back side of the display substrate may refer to a backlit side of the display substrate, and accordingly an emission side of the display substrate may be referred to as a display side.

In embodiments of the present disclosure, the display bonding terminal PAD1 may electrically connect the signal lines used for implementing display function on the display substrate to the display driving chip. The signal lines used for implementing display function may include the data line DL, the gate line GL, and a third common signal line 213 which will be mentioned below.

Optionally, the number of display bonding terminal PAD1 may be more than one, for example, two display bonding terminals PAD1 may be provided, and in the second direction X, the touch bonding terminal PAD1 is located between the two display bonding terminals PAD1.

The display substrate further includes a plurality of first touch lines 221 and a plurality of second touch lines 222 disposed on the base substrate 200. The plurality of first touch lines 221 and the plurality of second touch lines 222 are located at least in the display region AA. The plurality of first touch lines 221 and the plurality of second touch lines 222 are insulated and spaced from each other. The plurality of first touch lines 221 extend in the first direction Y, and the plurality of second touch lines 222 extend in the second direction X.

Figure 4:
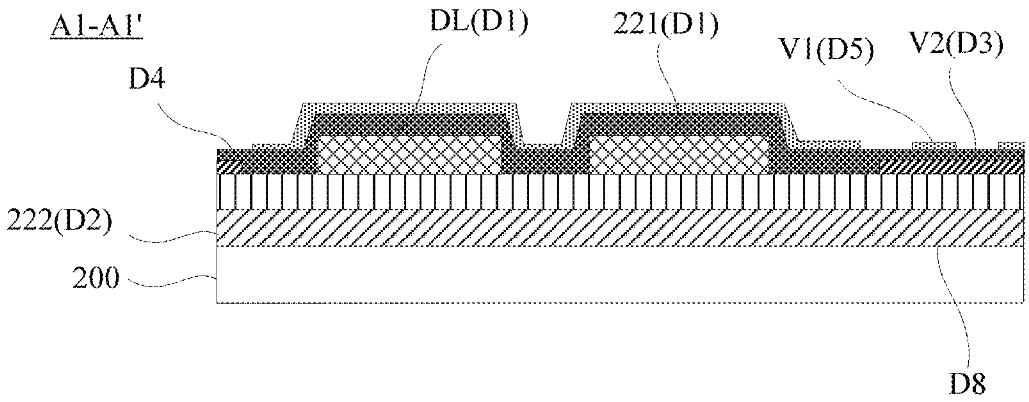
FIG. 4 schematically shows a sectional view taken along sectional line A1-A1' in FIG. 18.
Figure 5:
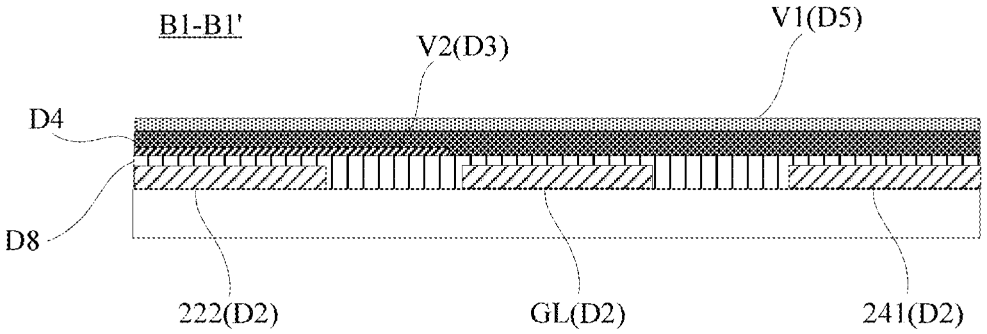
FIG. 5 schematically shows a sectional view taken along sectional line B1-B1' in FIG. 18.
Figure 18:
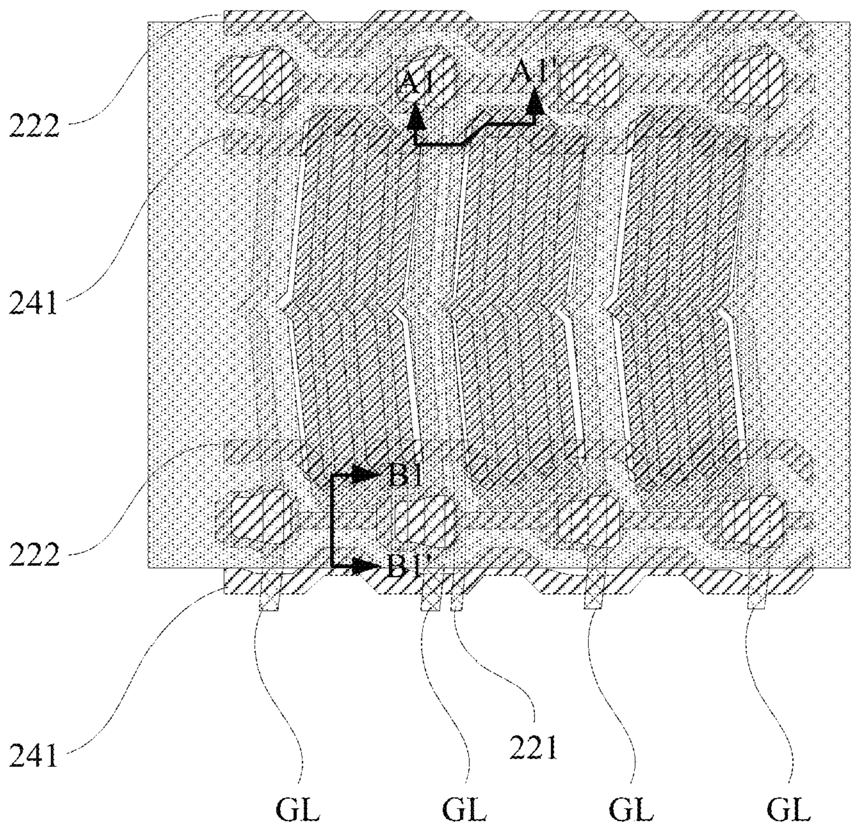

FIG. 4 schematically shows a sectional view taken along sectional line A1-A1' in FIG. 18. FIG. 5 schematically shows a sectional view taken along sectional line B1-B1' in FIG. 18.

With reference to FIG. 4 and FIG. 5, the display substrate further includes a first conductive layer D1, a second conductive layer D2, and at least one insulation layer located between the first conductive layer D1 and the second conductive layer D2. The first touch line 221 is located in the first conductive layer D1, and the second touch line 222 is located in the second conductive layer D2. The plurality of first touch lines 221 and the plurality of second touch lines 222 are spaced from each other by an insulation layer, thereby isolating and spacing the two. For example, the plurality of first touch lines 221 extend in the vertical direction in FIG. 2, and the plurality of second touch lines 222 extend in the horizontal direction in FIG. 3, that is, an extension direction of the first touch line 221 is perpendicular to an extension direction of the second touch line 222.

In embodiments of the present disclosure, at least one of the plurality of first touch lines 221 and the plurality of second touch lines 222, in addition to being located in the display region AA, may also extend to the periphery of the display region AA, so as to cover the display region AA and a part of the periphery of the display region AA, thereby increasing a touch sensing area and ensure touch effect at an edge of the display region AA. For example, with reference to FIG. 2, the plurality of first touch lines 221 extend to the periphery of the display region AA in the first direction Y, and with reference to FIG. 3, the plurality of second touch lines 222 extend to the periphery of the display region AA in the second direction X.

A first end of each of the plurality of first touch lines 221 is electrically connected to the first common signal line 211, a second end of each of the plurality of first touch lines 221 is electrically connected to the touch bonding terminal PAD1. A first end of each of the plurality of second touch lines 222 is electrically connected to the second common signal line 212, and a second end of each of the plurality of second touch lines 222 is electrically connected to the touch bonding terminal PAD1. The plurality of first touch lines 221 include M first touch line groups Z1. The plurality of second touch line groups 222 include N second touch line groups Z2. A first touch line group Z1 includes at least one first touch line 221, and different first touch line groups Z1 include different first touch lines 221. A second touch line group Z2 includes at least one second touch line 222, and different second touch line groups Z2 include different second touch lines 222. The M and the N are both positive integers.

In embodiments of the present disclosure, each first touch line group Z1 includes a plurality of first touch lines 221, and the number of first touch lines 221 is the same in any two first touch line groups Z1. Each second touch line group Z2 includes a plurality of second touch lines 222, and the number of second touch lines 222 is the same in any two second touch line groups Z2.

With reference to FIG. 2, a first end of the first touch line 221 may refer to an upper end of the first touch line 221, and a second end of the first touch line 221 may refer to a lower end of the first touch line 221. The upper ends of the plurality of first touch lines 221 are electrically connected to the first common signal line 211, while the lower ends of the plurality of first touch lines 221 are electrically connected to the touch bonding terminal PAD1 by taking a group as a unit.

Figure 6:
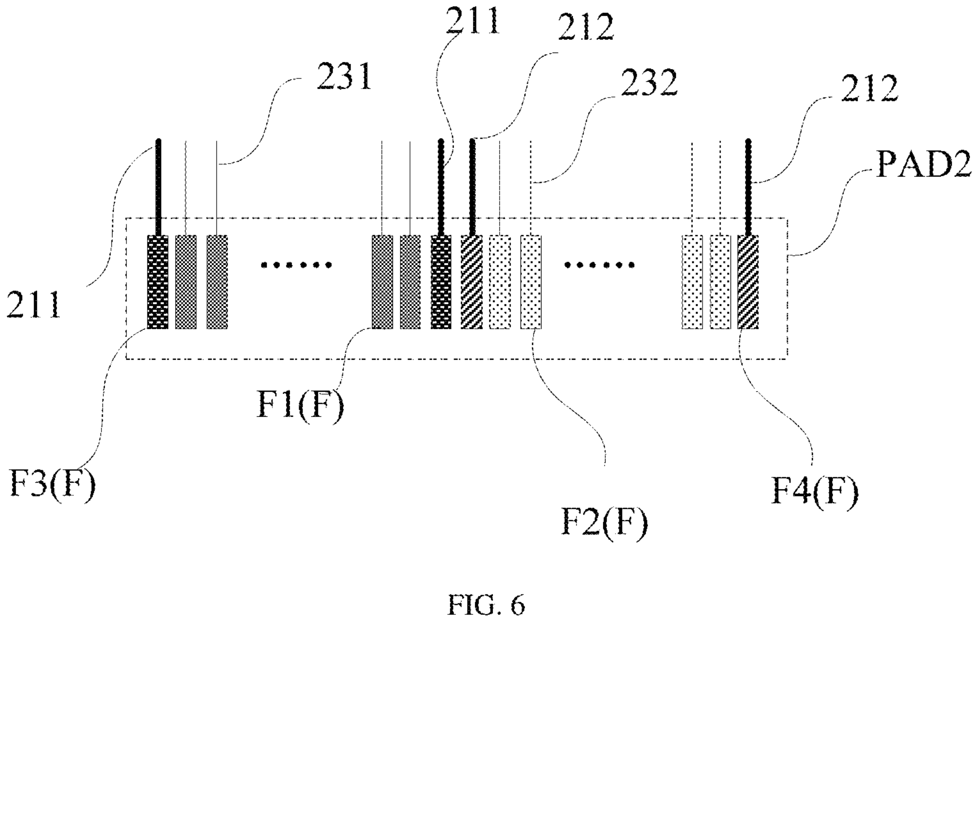
FIG. 6 schematically shows a schematic diagram of a touch bonding terminal according to embodiments of the present disclosure.

FIG. 6 schematically shows a schematic diagram of a touch bonding terminal according to embodiments of the present disclosure.

With reference to FIG. 6, in embodiments of the present disclosure, the touch bonding terminal PAD2 includes a plurality of sensing terminals F. The M first touch line groups Z1 and the N second touch line groups Z2 are electrically connected to different sensing terminals F, and different first touch line groups Z1 are electrically connected to different sensing terminals F.

For example, with reference to FIG. 2 and FIG. 6, the touch bonding terminal PAD1 includes a plurality of first sensing terminals F1. The first touch lines 221 in the same first touch line group Z1 are electrically connected to the same first sensing terminal F1 through the same first touch lead 231, while the first touch lines 221 in different first touch line groups Z1 are electrically connected to different first sensing terminals F1. In other words, the plurality of first touch lines 221 in the same first touch line group Z1 are disposed in parallel.

With reference to FIG. 3, a first end of the second touch line 222 may refer to a left end of the first touch line 221, and a second end of the second touch line 222 may refer to a right end of the second touch line 222. The left ends of the plurality of second touch lines 222 are electrically connected to the second common signal line 212, while the right ends of the plurality of second touch lines 222 are electrically connected to the touch bonding terminal PAD2 by taking a group as a unit.

In embodiments of the present disclosure, different second touch line groups are electrically connected to different sensing terminals F. For example, with reference to FIG. 3 and FIG. 6, the display bonding terminal PAD1 includes a plurality of second sensing terminals F2. The second touch lines 222 in the same second touch line group Z2 are electrically connected to the same second sensing terminal F2 through the same second touch lead 232, while the second touch lines 222 in different second touch line groups Z2 are electrically connected to different second sensing terminals F2. In other words, the plurality of second touch lines 222 in the same second touch line group Z2 are disposed in parallel.

In embodiments of the present disclosure, the touch bonding terminal PAD2 may be bound and connected to a first flexible circuit board, and then may be electrically connected to the touch sensing chip through the first flexible circuit board. When performing touch detection, the touch detection chip may be selectively conductive with the sensing terminal F on the touch bonding terminal PAD2 according to a set scanning sequence, so as to scan the first touch line 221 and the second touch line 222. For example, the first touch line 221 may be scanned in the second direction X, and during scanning, m first touch line groups Z1 may be conductive with the touch detection chip each time. For example, the second touch line 222 may be scanned in the first direction Y, and during scanning, n second touch line groups Z2 may be conductive with the touch detection chip each time. Therefore, touch scanning of the entire display region AA may be achieved. The m and the n are both positive integers, and $1<m<M$, $1<n<N$.

For example, when scanning the first touch line 221, a scanning cycle may be divided into a plurality of first sub-stages. In each first sub-stage, m first touch line groups Z1 (as shown in an $x^{th}$ and an $(x+2)^{th}$ first touch line groups Z1 in FIG. 2) may be conductive with the touch detection chip, so that the m first touch line groups Z1 may form a first touch electromagnetic coil.

For example, when the stylus moves within a sensing range of the first touch electromagnetic coil, the first touch electromagnetic coil will sense corresponding electromagnetic signals, including but not limited to changes in amplitude and frequency. The first touch electromagnetic coil may determine first position information of a touch by analyzing the change, and the first position information may include coordinates of a touch point in the first direction Y. The sensing range of the first touch electromagnetic coil may include a region surrounded by edges of the m first touch line groups Z1.

It should be noted that the m first touch line groups Z1 may be adjacent first touch line groups Z1 or first touch line groups Z1 spaced from each other. In two adjacent first sub-stages, the first touch line groups Z1 may be partially repeated or may be completely non-repeated. For example, the m first touch line groups Z1 selectively conducted by the touch detection chip each time may include two adjacent first touch line groups Z1. For another example, the m first touch line groups Z1 selectively conducted by the touch detection chip each time may include two first touch line groups Z1 spaced from each other. For example, the m first touch line groups Z1 selectively conducted by the touch detection chip each time may include the $x^{th}$ first touch line group Z1 and the $(x+2)^{th}$ first touch line group Z1. In this way, the regions covered by the first touch line groups Z1 selectively conducted in consecutive events may overlap, so as to improve the coverage of touch detection.

When scanning the second touch line, the entire scanning cycle may be divided into a plurality of second sub-stages. In each second sub-stage, n second touch line groups Z2 (as shown in a $y^{th}$ and a $(y+1)^{th}$ second touch line groups Z2 in FIG. 3) may be conductive with the touch detection chip, so that the n second touch line groups Z2 may form a second touch electromagnetic coil.

When the stylus moves within a sensing range of the second touch electromagnetic coil, the second touch electromagnetic coil will sense corresponding electromagnetic signals, including but not limited to changes in amplitude and frequency. The touch detection chip may determine second position information of a touch by analyzing the change, and the second position information may include coordinates of a touch point in the second direction X. The sensing range of the second touch electromagnetic coil may include a region surrounded by edges of the n second touch line groups Z2.

It should be noted that the n second touch line groups Z2 may be adjacent second touch line groups Z2 or second touch line groups Z2 spaced from each other. In two adjacent second sub-stages, the second touch line groups Z2 may be partially repeated. For example, the n second touch line groups Z2 selectively conducted by the touch detection chip each time may include two adjacent second touch line groups Z2. For another example, the n second touch line groups Z2 selectively conducted by the touch detection chip each time may include two second touch line groups Z2 spaced from each other. For example, the n second touch line groups Z2 selectively conducted by the touch detection chip each time may include the $y^{th}$ second touch line group Z2 and the $(y+2)^{th}$ second touch line group Z2. In this way, the regions covered by the second touch line groups Z2 selectively conducted in consecutive events may overlap, so as to improve the coverage of touch detection. The x and the y are both positive integers, $x+2 \leq M$, and $y+2 \leq N$.

It should be noted that since the first touch line 221 and the second touch line 222 are electrically connected to the touch detection chip through different sensing terminals F, the touch detection chip may scan the first touch line 221 and the second touch line 222 in a time-segmented manner, and may also simultaneously scan the first touch line 221 and the second touch line 222. The specific details may be determined as desired in practice, and embodiments of the present disclosures are not limited to this. When the touch detection chip scans the first touch line 221 and the second touch line 222 in a time-segmented manner, it is possible to reduce the interference between the first touch line 221 and the second touch line 222, thereby being beneficial for improving the accuracy of touch detection.

In embodiments of the present disclosure, the touch electromagnetic coil may be integrated on the display substrate through the above method, which is conducive to the thinning of the display product. In this case, by changing the selectively conducted first touch line group Z1 and second touch line group Z2, the size of the touch electromagnetic coil finally formed may be adjusted, thereby achieving different touch performances. Taking the first touch line group Z1 as an example, when the first touch line group Z1 is selectively conducted each time, two adjacent first touch line groups Z1 may be selectively conducted, so that the accuracy of touch detection may be improved. Alternatively, when the first touch line group Z1 is selectively conducted each time, two first touch line groups Z1 spaced from each other may be selectively conducted, so that the regions covered by the first touch line groups Z1 selectively conducted in consecutive events may overlap. This is beneficial for improving the coverage of touch detection and reducing detection blind regions.

The display substrate of embodiments of the present disclosure will be explained in detail below.

Figure 7:
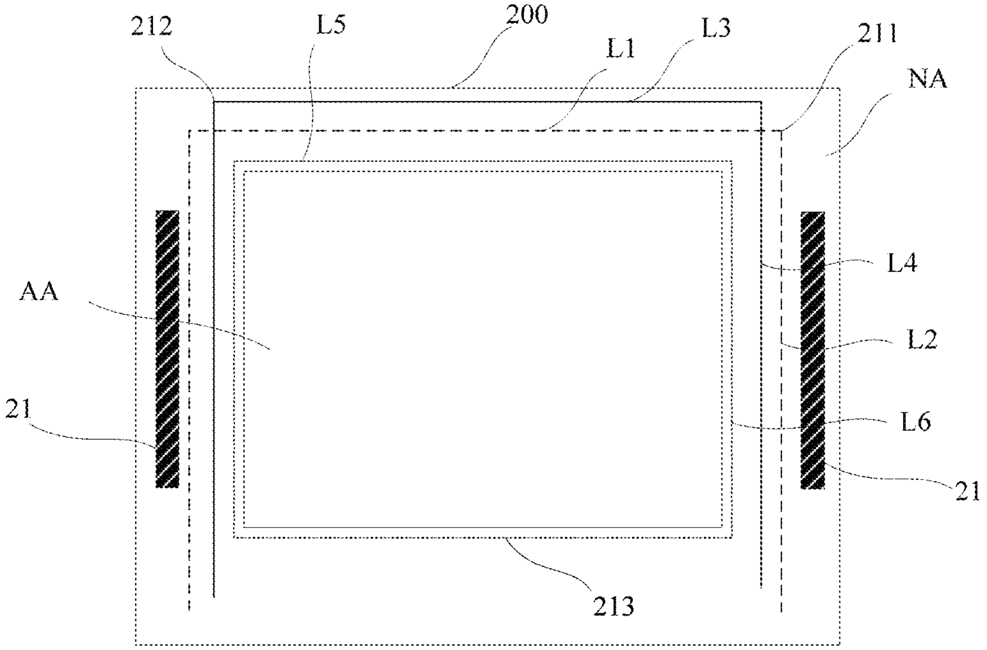
FIG. 7 schematically shows a second plan view of a display substrate according to embodiments of the present disclosure.

FIG. 7 schematically shows a second plan view of a display substrate according to embodiments of the present disclosure.

In some specific embodiments, the display substrate may be applied to a liquid crystal display panel. With reference to FIG. 7, the display substrate further includes a third common signal line 213 disposed on the base substrate 200. The third common signal line 213 is located in the peripheral region NA. At least one sub-pixel PX includes a common electrode V1. The third common signal line 213 is electrically connected to the common electrodes V1 of the plurality of sub-pixels PX. The third common signal line 213 is used to provide a first electrical signal to the common electrodes V1 of the plurality of sub-pixels PX, and the first electrical signal may be referred to as a common voltage signal.

In embodiments of the present disclosure, the liquid crystal display panel includes a liquid crystal layer. The sub-pixel PX includes a pixel electrode V2 in addition to the common electrode V1. By providing a data voltage signal to the pixel electrode V2 and providing a common voltage signal to the common electrode V1, a corresponding electric field may be formed between the pixel electrode V2 and the common electrode V1. The liquid crystal in the liquid crystal layer may be deflected under a driving force of this electric field, thereby achieving display function.

With reference to FIG. 2, FIG. 3 and FIG. 6, the touch bonding terminal PAD1 includes a plurality of first sensing terminals F1, a plurality of second sensing terminals F2, a plurality of third sensing terminals F3 and a plurality of fourth sensing terminals F4. The M first touch line groups Z1 are electrically connected to the plurality of first sensing terminals F1, and different first touch line groups Z1 are electrically connected to different first sensing terminals F1. The N second touch line groups Z2 are electrically connected to the plurality of second sensing terminals F2, and different second touch line groups Z2 are electrically connected to different second sensing terminals F2.

In embodiments of the present disclosure, the plurality of first sensing terminals F1 are arranged in the second direction X, and the plurality of second sensing terminals F2 are arranged in the second direction X. In the second direction X, the plurality of first sensing terminals F1 may be located on the same side of the plurality of second sensing terminals F2.

The plurality of first sensing terminals F1 are located between two adjacent third sensing terminals F3, and the plurality of second sensing terminals F2 are located between two adjacent fourth sensing terminals F4. An end of the first common signal line 211 is electrically connected to a third sensing terminal F3, and the other end of the first common signal line 211 is electrically connected to another third sensing terminal F3. An end of the second common signal line 212 is electrically connected to a fourth sensing terminal F4, and the other end of the second common signal line 212 is electrically connected to another fourth sensing terminal F4.

Optionally, the number of third sensing terminals F3 may be two. In the second direction X, the two third sensing terminals F3 are located on opposite sides of the plurality of first sensing terminals F1. The two third sensing terminals F3 are electrically connected to two ends of the first common signal line 211, so that the first common signal line 211 and the touch bonding terminal PAD1 may form a closed ring. When the first common signal line 211 is conductive with the touch detection chip, the ring may form a first touch electromagnetic coil. Accordingly, the number of fourth sensing terminals F4 may be two. In the second direction X, the two fourth sensing terminals F4 are located on opposite sides of the plurality of second sensing terminals F2. The two fourth sensing terminals F4 are electrically connected to two ends of the second common signal line 212, so that the second common signal line 212 and the touch bonding terminal PAD1 may form a closed ring. When the second common signal line 212 is conductive with the touch detection chip, the ring may form a second touch electromagnetic coil.

In this way, on the one hand, the crossing between the first common signal line 211, the second common signal line 212, the first touch lead 231, and the second touch lead 232 may be reduced, and the crossing between the first common signal line 211, the second common signal line 212, the first touch lead 231, and the second touch lead 232 with existing signal lines such as the data line DL and the gate line GL may be reduced, thereby reducing interference between wiring.

Optionally, the third sensing terminal F3 and the fourth sensing terminal F4 may supply power (or may also be referred to as a sensing reference voltage) to the first common signal line 211 and the second common signal line 212. The sensing reference voltage provided by the third sensing terminal F3 and the fourth sensing terminal F4 is substantially the same as a voltage of the first electrical signal. In this way, the sensing reference voltage on the first common signal line 211, the second common signal line 212, the first touch line 221 and the second touch line 222 may be substantially the same as the common voltage signal during touch detection, so as to prevent interference between different electrical signals.

In some specific embodiments, orthographic projections of the plurality of first touch lines 221 on the base substrate 200 define a first pattern, orthographic projections of the plurality of second touch lines 222 on the base substrate 200 define a second pattern, and at least one of the first pattern and the second pattern covers an orthographic projection of the display region AA on the base substrate 200.

In embodiments of the present disclosures, the first pattern may refer to a pattern surrounded by an outermost edge of the orthographic projections of the plurality of first touch lines 221 on the base substrate 200, and the second pattern may refer to a pattern surrounded by an outermost edge of the orthographic projections of the plurality of second touch lines 222 on the base substrate 200. For example, the first pattern and the second pattern may include rectangles, but embodiments of the present disclosures are not limited to this.

Through covering the display region AA by the first pattern (or second pattern), a degree of covering the edge of the display region AA by a touch monitoring region may be improved, thereby reducing touch blind spots.

In some specific embodiments, in the first direction Y, the first pattern protrudes from the orthographic projection of the display region AA on the base substrate 200, and in the second direction X, the first pattern is located within the orthographic projection of the display region AA on the base substrate 200. The second pattern covers the orthographic projection of the display region AA on the base substrate 200.

With reference to FIG. 2 and FIG. 3, the upper and lower sides of the first touch line group Z1 protrude from the display region AA, so that the plurality of first touch line groups Z1 may cover the upper and lower side edges of the display region AA. The left and right sides of the second touch line group Z2 protrude from the display region AA, and the highest and lowest second touch line groups Z2 among the plurality of second touch line groups Z2 protrude from the display region AA in the first direction Y. In this way, the plurality of second touch lines 222 may cover the upper and lower side edges of the display region AA and the left and right side edges of the display region AA, thereby reducing a touch sensing blind region of the display region AA.

Optionally, the leftmost and rightmost second touch line groups Z2 among the plurality of first touch line groups Z1 may protrude from the display region AA in the second direction X. In this way, the plurality of second touch lines 222 may cover the left and right side edges of the display region AA, thereby further reducing the touch sensing blind region of the display region AA.

In some specific embodiments, in the first direction Y, the second pattern includes a first side edge and a second side edge opposite to the first side edge. The display region AA includes a third side edge and a fourth side edge opposite to the third side edge. A spacing between the first side edge and the third side edge is a first spacing. A spacing between the second side edge and the fourth side edge is a second spacing. At least one of the first spacing and the second spacing is less than a width of the second touch line group Z2.

In embodiments of the present disclosures, unless otherwise specified, a similar expression such as "a spacing between the first side edge and the third side edge is a first spacing" represent an average distance between the first side edge and the third side edge. A similar expression such as "a width of the second touchline group Z2" represent an average width of the second touchline group Z2. The width of the second touch line group Z2 may refer to a size of the second touch line group Z2 in the first direction Y.

The first side edge may refer to an upper side edge of the second pattern, the second side edge may refer to a lower side edge of the second pattern, the third side edge may include an upper side edge of the display region AA, and the fourth side edge may include a lower side edge of the display region AA. The larger the first spacing (second spacing), the stronger the magnetic field sensing ability of the upper edge (lower edge) of the display region AA, which is beneficial for improving the touch sensing effect at such edge.

The first spacing and the second spacing may be substantially the same. For example, the first spacing (second spacing) may be set to 1 mm-5 mm, for example, the first spacing (second spacing) may be set to 3 mm. The width of the second touch line group Z2 may be set to 4 mm-8 mm, for example, the width of the second touch line group Z2 may be set to 6.1 mm. In this way, it is beneficial to allowing the upper edge (lower edge) of the display region AA to be covered by a second touch line group Z2, and allowing the upper edge to be close to a centerline of the second touch line group Z2, which is conducive to further improving the touch sensing effect at such edge.

In some specific embodiments, the display substrate further includes a plurality of first touch leads 231 and a plurality of second touch leads 232. The peripheral region NA further includes two side edge regions Q3 opposite to each other in the second direction X. The plurality of first touch lines 221 are electrically connected to the touch bonding terminal PAD1 through the plurality of first touch leads 231, and the first touch lines 221 in different first touch line groups Z1 are electrically connected to the touch bonding terminal PAD1 through different first touch leads 231. The plurality of second touch lines 222 are electrically connected to the touch bonding terminal PAD1 through the plurality of second touch leads 232. The second touch lines 222 in different second touch line groups Z2 are electrically connected to the touch bonding terminal PAD1 through different second touch leads 232. The plurality of first touch leads 231 are located in the bonding region Q2, the plurality of second touch leads 232 are located in the same side edge region Q3, and extend from the side edge region Q3 to the bonding region Q2.

For example, the two side edge regions Q3 are located on the left and right sides of the display region AA, respectively. In embodiments of the present disclosure, the first touch line group Z1 is connected to the first touch lead 231 in one-to-one correspondence, for example, the first touch lines 221 in each first touch line group Z1 are electrically connected to the same first sensing terminal F1 in the touch bonding terminal PAD1 through the same first touch lead 231.

With reference to FIG. 2 and FIG. 6, the plurality of first touch leads 231 include two parts, and the two parts have different trends. Specifically, the peripheral region NA further includes a lead region located between the bonding region Q2 and the side edge region Q3. One part in the lead region is bent to the right, while the other part in the lead region is bent to the left. The two parts finally converge to an upper side of the touch bonding terminal PAD1, and the two parts are electrically connected to the corresponding first sensing terminal F1 on the touch bonding terminal PAD1. Extension directions of the plurality of first touch leads 231 bent towards the right are parallel to each other, and accordingly, extension directions of the plurality of first touch leads 231 bent towards the left are parallel to each other.

For example, with reference to FIG. 2, after the $x^{th}$ first touch line group Z1 and the $(x+2)^{th}$ touch line group are selectively conducted with the touch detection chip, the $x^{th}$ first touch line group Z1 and the $(x+2)^{th}$ touch line group form a first touch electromagnetic coil through the first common signal line 211 and the first touch lead 231.

With reference to FIG. 3 and FIG. 6, the second touch line group Z2 is connected to the second touch lead 232 in one-to-one correspondence. For example, the second touch leads 232 in each second touch line group Z2 are electrically connected to the same second sensing terminal F2 in the touch bonding terminal PAD1 through the same second touch lead 232. With reference to FIG. 3, the plurality of second touch leads 232 extend from the side edge region Q3 on the right side of the display region AA to the bonding region on the lower side of the display region AA. In the same second touch line group Z2, the right end of the second touch line 222 is electrically connected to the same second touch lead 232. The trends of the plurality of second touch leads 232 are the same. Specifically, the plurality of second touch leads 232 extend in the first direction Y to the bonding region Q2, and then bend to the left in the bonding region Q2. The plurality of bent second touch leads 232 converge above the touch bonding terminal PAD1 and are electrically connected to the corresponding second sensing terminal F2.

For example, with reference to FIG. 3, after a $y^{th}$ second touch line group Z2 and a $(y+1)^{th}$ second touch line group Z2 are selectively conducted with the touch detection chip, the $y^{th}$ second touch line group Z2 and the $(y+1)^{th}$ second touch line group Z2 form a second touch electromagnetic coil through the second common signal line 212 and the second touch lead 232.

In some specific embodiments, the display substrate further includes a plurality of gate lines GL and a plurality of data lines DL. The plurality of gate lines GL and the plurality of data lines DL are located in the display region AA. With reference to FIG. 1, FIG. 2, FIG. 3 and FIG. 7, the first common signal line 211 includes a first line segment L1 located in the bonding pair region Q1 and a second line segment L2 located in the side edge region Q3. The second common signal line 212 includes a third line segment L3 located in the bonding pair region Q1 and a fourth line segment L4 located in the side edge region Q3. The first line segment L1 and the third line segment L3 extend in the second direction X, while the second line segment L2 and the fourth line segment L4 extend in the first direction Y. The first line segment L1 and the third line segment L3 are disposed on the same layer as the plurality of gate lines GL, a material of the first line segment L1 and the third line segment L3 is the same as a material of the plurality of gate lines GL. The second line segment L2 and the fourth line segment L4 are disposed on the same layer as the plurality of data lines DL, and a material of the second line segment L2 and the fourth line segment L4 is the same as a material of the plurality of data lines DL.

Figure 8:
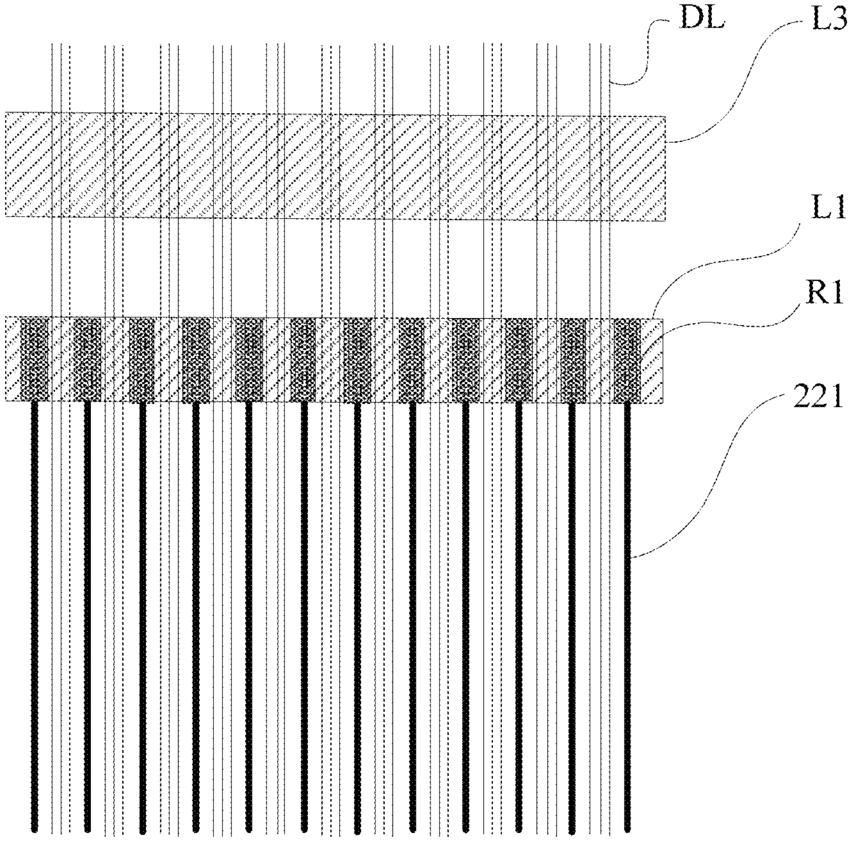
FIG. 8 schematically shows a plan view of a bonding pair region according to embodiments of the present disclosure.

FIG. 8 schematically shows a plan view of a bonding pair region according to embodiments of the present disclosure.

In embodiments of the present disclosure, the data line DL and the gate line GL are arranged in different layers. With reference to FIG. 1, FIG. 2, FIG. 7 and FIG. 8, in the bonding pair region Q1, the data line DL extends in the first direction Y, and the first line segment L1 and the third line segment L3 extend in the second direction X. Through disposing the first line segment L1 and the third line segment L3 on the same layer as the plurality of gate lines GL and manufacturing the first line segment L1, the third line segment L3 and the plurality of gate lines GL by the same material, the first line segment L1 and the third line segment L3 may be disposed in a layer different from that of the data line DL, thereby reducing the crossing between the first line segment L1, the third line segment L3 and the data line DL. Optionally, the first touch line 221 is electrically connected to the first line segment L1 through a first transfer structure R1.

Figure 9:
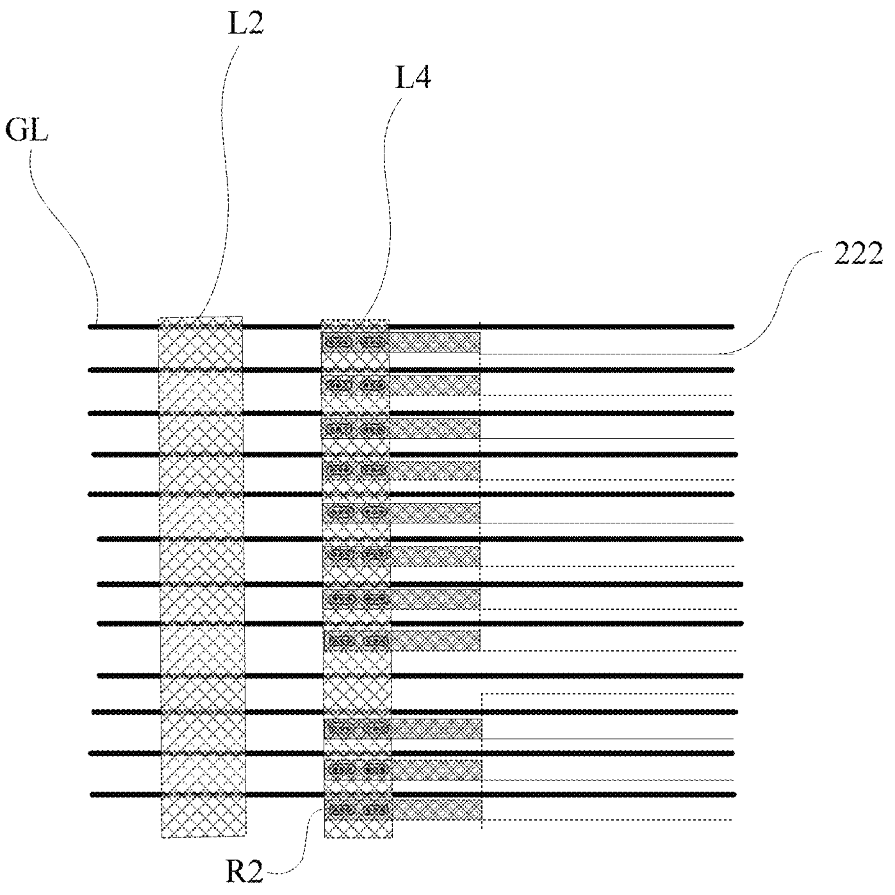
FIG. 9 schematically shows a plan view of a side edge region located on a left side of a display region according to embodiments of the present disclosure.
Figure 10:
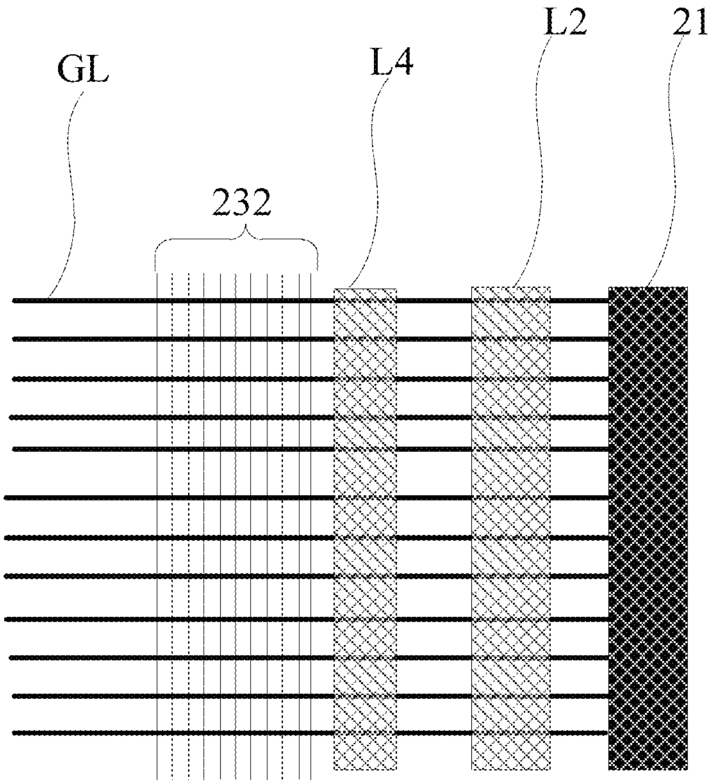
FIG. 10 schematically shows a plan view of a side edge region located on a right side of a display region according to embodiments of the present disclosure.

FIG. 9 schematically shows a plan view of a side edge region located on a left side of a display region according to embodiments of the present disclosure. FIG. 10 schematically shows a plan view of a side edge region located on a right side of a display region according to embodiments of the present disclosure.

With reference to FIG. 1, FIG. 3, FIG. 7, FIG. 9 and FIG. 10, in the side edge region Q3, the gate line GL extends in the second direction X, while the second line segment L2 and the fourth line segment L4 extend in the first direction Y. Through disposing the second line segment L2 and the fourth line segment L4 on the same layer as the plurality of data lines DL and manufacturing the second line segment L2, the fourth line segment L4 and the plurality of data lines DL by the same material, the second line segment L2 and the fourth line segment L4 may be disposed in a layer different from that of the gate line GL, thereby reducing the crossing between the second line segment L2, the fourth line segment L4 and the gate line GL. Optionally, the second touch line 221 is electrically connected to the fourth line segment L4 through a second transfer structure R2.

With reference to FIG. 7, in some specific embodiments, the display substrate further includes a third common signal line 213 disposed on the base substrate 200. The third common signal line 213 is located in the peripheral region NA. At least one sub-pixel PX includes a common electrode V1. The third common signal line 213 is electrically connected to the common electrodes V1 of the plurality of sub-pixels PX. An orthographic projection of the third common signal line 213 on the base substrate 200 at least partially surrounds an orthographic projection of the display region AA on the base substrate 200. In the bonding pair region Q1, an orthographic projection of the third line segment L3 on the base substrate 200 is located on a side of an orthographic projection of the first line segment L1 on the base substrate 200 away from the orthographic projection of the third common signal line 213 on the base substrate 200. In the same side edge region Q3, an orthographic projection of the second line segment L2 on the base substrate 200 is located on a side of an orthographic projection of the fourth line segment L4 on the base substrate 200 away from the orthographic projection of the third common signal line 213 on the base substrate 200.

With reference to FIG. 7, the third common signal line 213 surrounds at least the upper, left and right sides of the display region AA. However, embodiments of the present disclosure are not limited to this. For example, the third common signal line 213 surrounds the upper, lower, left and right sides of the display region AA.

The first common signal line 211 and the second common signal line 212 are located on an outer side of the third common signal line 213. The outer side of the third common signal line 213 may refer to a side of the third common signal line 213 away from the display region AA.

For example, the third common signal line 213 includes a fifth segment L5 located in the bound pair region Q1 and a sixth segment L6 located in the side edge region Q3. The fifth segment L5 extends in the second direction X, and the sixth segment L6 extends in the first direction Y. In the bonding pair region Q1, the fifth line segment L5, the first line segment L1 and the third line segment L3 are disposed sequentially in a direction away from the display region AA. In this way, the interference of the second common signal line 212 on the first touch line 221 may be shielded through the first common signal line 211.

In the side edge region Q3, the sixth line segment L6, the fourth line segment L4, and the second line segment L2 are disposed sequentially in the direction away from the display region AA. In this way, the interference of the first common signal line 211 on the second touch line 222 may be shielded through the second common signal line 212.

In some specific embodiments, in the same side edge region Q3, orthographic projections of the plurality of second touch leads 232 on the base substrate 200 are located on a side of the orthographic projection of the fourth line segment L4 on the base substrate 200 away from the orthographic projection of the second line segment L2 on the base substrate 200. In this way, the interference of the first common signal line 211 on the second touch lead 232 may be shielded through the second common signal line 212.

In some specific embodiments, the display substrate further includes a gate driving circuit 21. The gate driving circuit 21 is located in at least one side edge region Q3. In the same side edge region Q3, the orthographic projection of the fourth line segment L4 on the base substrate 200 is located on a side of an orthographic projection of the gate driving circuit 21 on the base substrate 200 close to the orthographic projection of the third common signal line 213 on the base substrate 200.

In embodiments of the present disclosure, the gate driving circuits 21 are provided in two side edge regions Q3 of the display substrate. In each side edge region Q3, the second line segment L2 and the fourth line segment L4 are closer to the display region AA compared to the gate driving circuit 21. The first touch line 221 is located on a side of the second line segment L2 away from the gate driving circuit 21. The second touch line 222 and the second touch lead 232 are located on a side of the fourth line segment L4 away from the gate driving circuit 21. In this way, it is possible to avoid an overlap between any one of the first common signal line 211, the second common signal line 212, the first touch line 221, the second touch line 222, and the second touch lead 232 and a region in which the gate driving circuit 21 is located, thereby reducing wiring crossing.

In some specific embodiments, orthographic projections of the plurality of first touch lines 221 on the base substrate and orthographic projections of the plurality of first touch leads 231 on the base substrate 200 define a third pattern. Orthographic projections of the plurality of second touch lines 222 on the base substrate and orthographic projections of the plurality of second touch leads 232 on the base substrate 200 define a fourth pattern. An orthographic projection of the first common signal line 211 on the base substrate 200 at least partially surrounds the third pattern, and an orthographic projection of the second common signal line 212 on the base substrate 200 at least partially surrounds the fourth pattern.

In embodiments of the present disclosure, the third pattern may refer to a pattern surrounded by two outermost first touch lines 221 among the plurality of first touch lines 221 and the first touch leads 231 electrically connected to the two outermost first touch lines 221. The first common signal lines 211 surrounding the third pattern may refer to the first common signal lines 211 being disposed substantially parallel to the edges of the third pattern. In this way, it is beneficial for allowing a wiring direction of the first common signal line 211 to be consistent with a wiring direction of the first touch line 221, so that the first common signal line 211 may be reused as a first touch line group Z1, thereby increasing the region covered by the first touch line group Z1.

In embodiments of the present disclosure, the fourth pattern may refer to a pattern surrounded by two outermost second touch lines 222 among the plurality of second touch lines 222 and the second touch leads 232 electrically connected to the two outermost second touch lines 222. The second common signal lines 212 surrounding the fourth pattern may refer to the second common signal lines 212 being disposed substantially parallel to edges of the fourth pattern. In this way, it is beneficial for allowing a wiring direction of the second common signal line 212 to be consistent with a wiring direction of the second touch line 222, so that the second common signal line 212 may be reused as a second touch line group Z2, thereby increasing the region covered by the second touch line group Z2.

Figure 11:
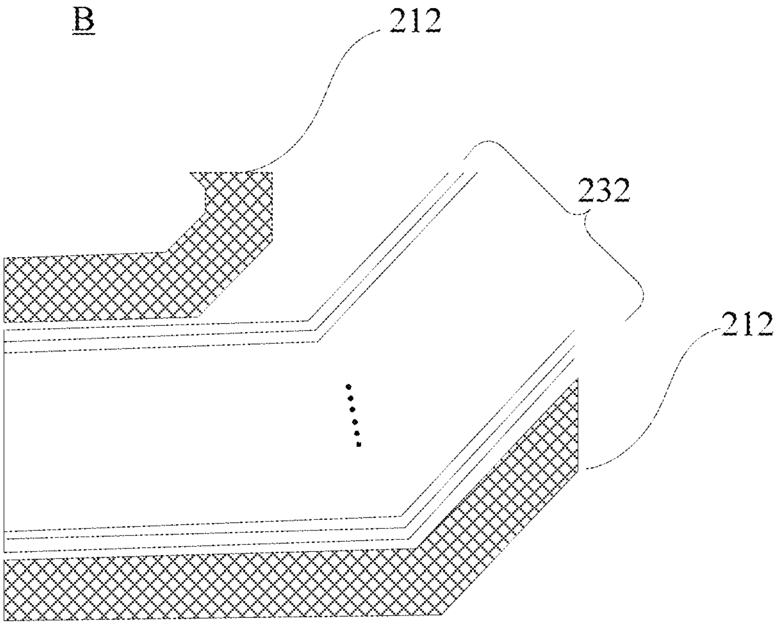
FIG. 11 schematically shows a plan view of a wiring direction of a second common signal line according to embodiments of the present disclosure.

FIG. 11 schematically shows a plan view of a wiring direction of a second common signal line according to embodiments of the present disclosure.

With reference to FIG. 3 and FIG. 11, in the side edge region Q3 located on the left side of the display region AA, the second common signal line 212 extends in the first direction Y into a lead region, and the second common signal line 212 is bent at least four times in the lead region. In this way, it is possible to allow the second common signal line 212 and the second touch lead 232 adjacent to the second common signal line 212 to maintain the same wiring direction as much as possible, so that the second common signal line 212 may be reused as the second touch line group Z2, and the region covered by the second touch line group Z2 may extend downwards.

In embodiments of the present disclosure, the first touch line 221 and the second touch line 222 may be manufactured by reusing existing film layers or by using new film layers. The specific scheme of the film layers in which the first touch line 221 and the second touch line 222 are located in embodiments of the present disclosure will be explained in conjunction with FIG. 12 to FIG. 52.

Figure 12:
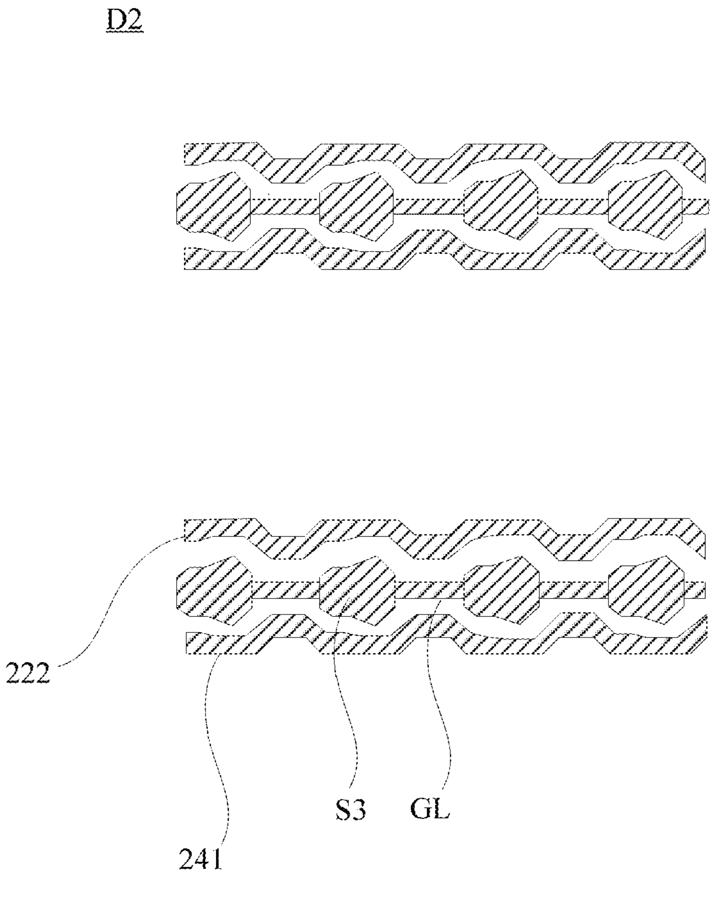
FIG. 12 to FIG. 18 schematically show first partial plan views of upper film layers on a display substrate according to embodiments of the present disclosure.
Figure 13:
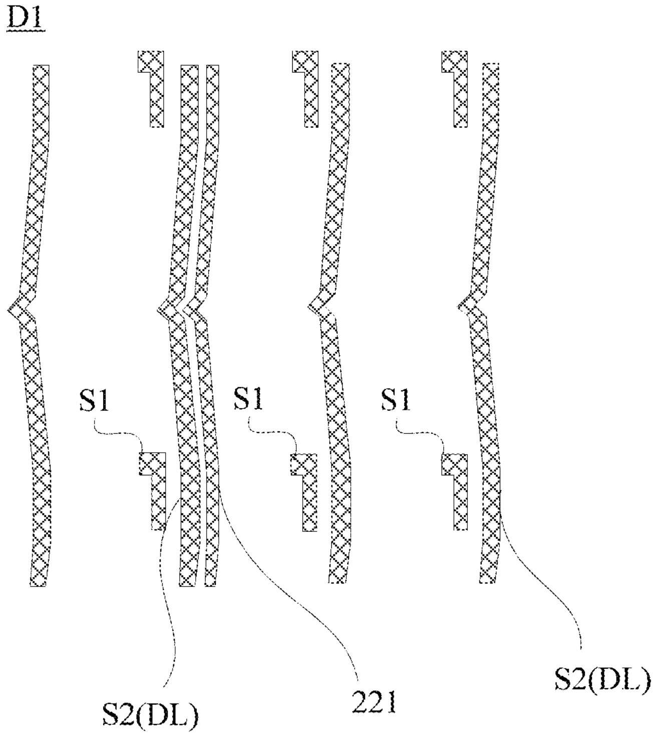
Figure 14:
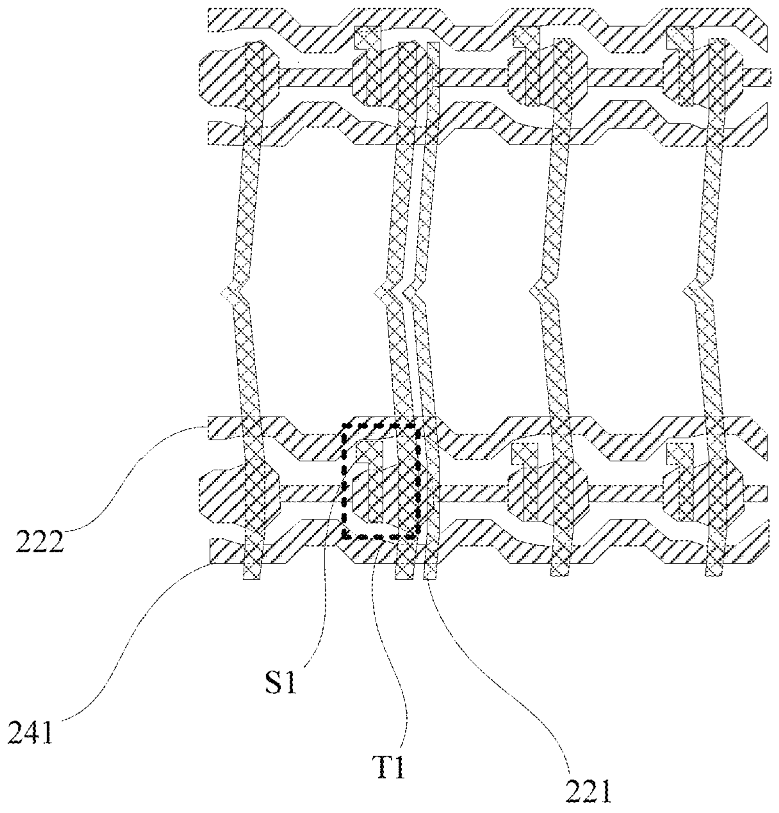
Figure 15:
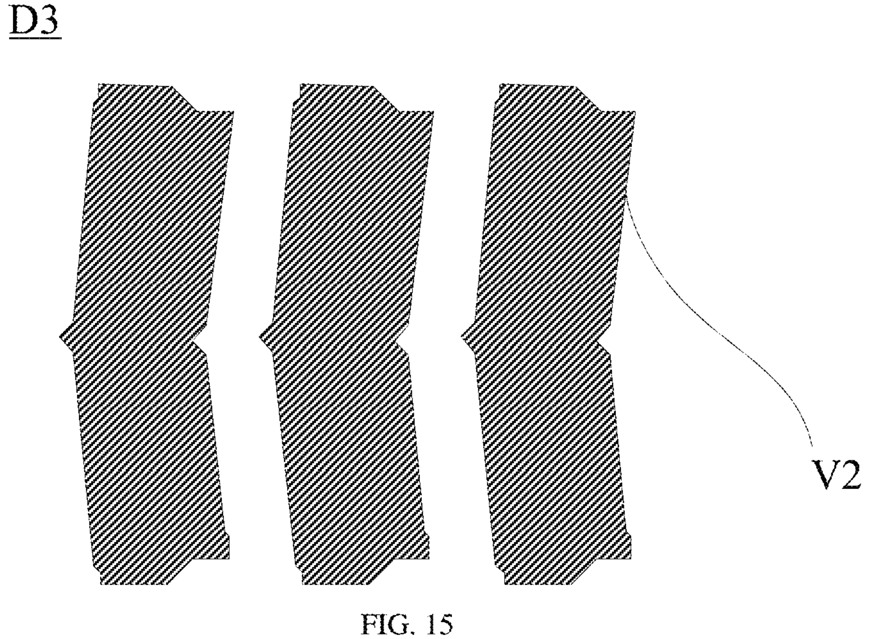
Figure 16:
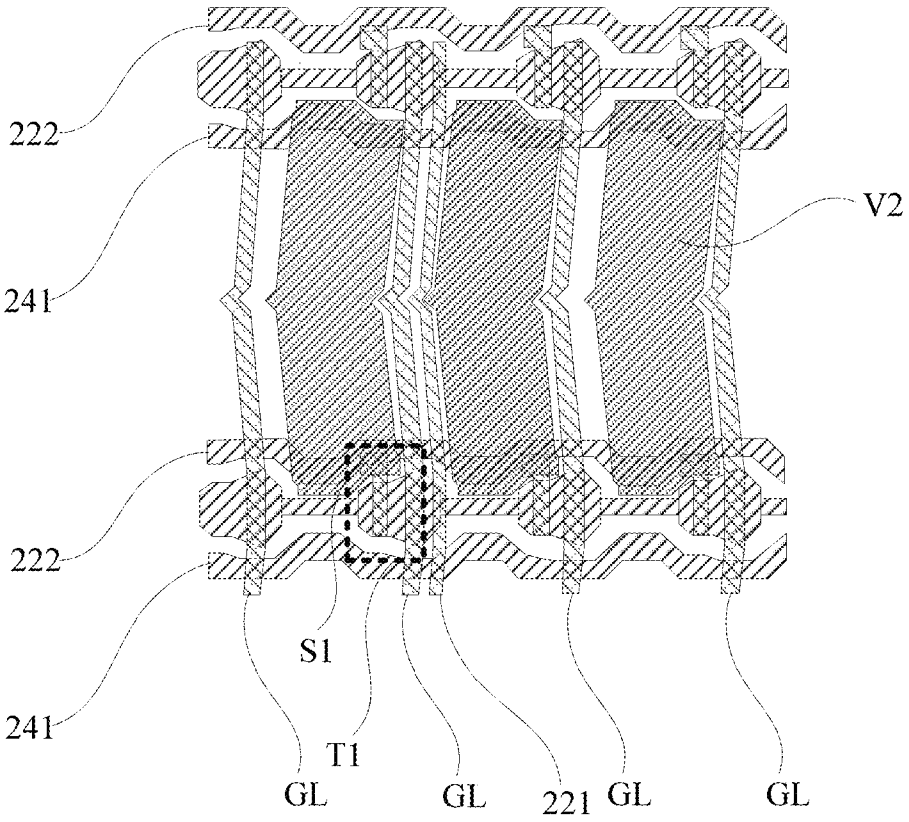
Figure 17:
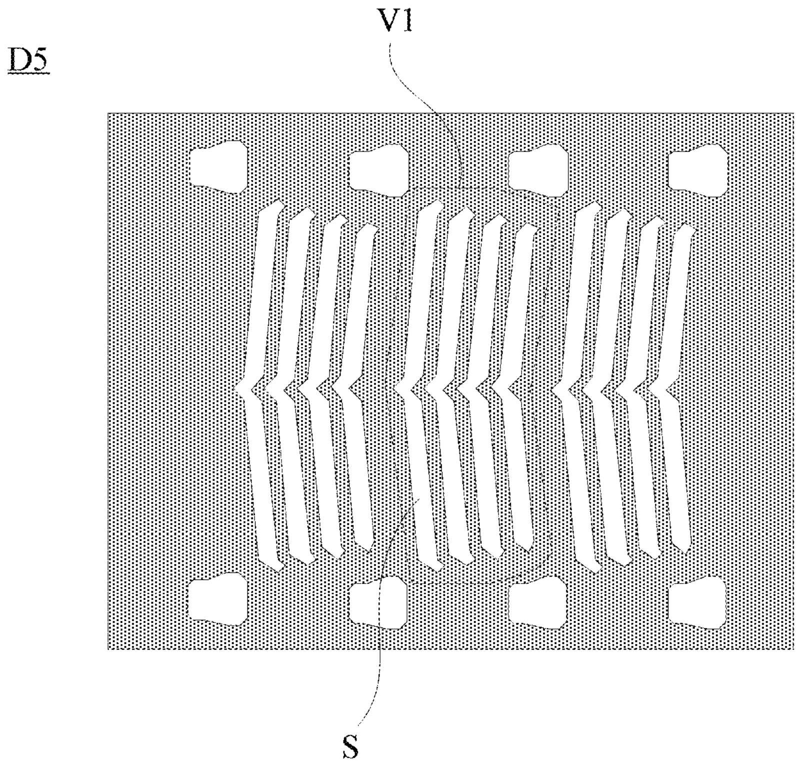

FIG. 12 to FIG. 18 schematically show first partial plan views of upper film layers on a display substrate according to embodiments of the present disclosure. FIG. 12 schematically shows a first plan view of a second conductive layer according to embodiments of the present disclosure. FIG. 13 schematically shows a first plan view of a first conductive layer according to embodiments of the present disclosure. FIG. 14 schematically shows a plan view of a first conductive layer and a second conductive layer according to embodiments of the present disclosure. FIG. 15 schematically shows a first plan view of a first transparent electrode layer according to embodiments of the present disclosure. FIG. 16 schematically shows a plan view of a first conductive layer, a second conductive layer and a first transparent electrode layer according to embodiments of the present disclosure. FIG. 17 schematically shows a first plan view of a second transparent electrode layer according to embodiments of the present disclosure. FIG. 18 schematically shows a plan view of a first conductive layer, a second conductive layer, a first transparent electrode layer and a second transparent electrode layer according to embodiments of the present disclosure.

With reference to FIG. 12 to FIG. 18, in some specific embodiments, the display substrate further includes a first conductive layer D1 disposed on the base substrate 200. The display substrate further includes a plurality of data lines DL. The plurality of data lines DL extend in the first direction Y. The plurality of data lines DL and the plurality of first touch lines 221 are located in the first conductive layer D1. Orthographic projections of the plurality of first touch lines 221 on the base substrate 200 do not overlap with orthographic projections of the plurality of data lines DL on the base substrate 200.

In embodiments of the present disclosure, the plurality of data lines DL are disposed on the same layer as the plurality of first touch lines 221, and a material of the plurality of data lines DL is the same as a material of the plurality of first touch lines 221. At least one data line DL is substantially parallel to at least one first touch line 221. For example, a data line DL is disposed on the right side of each sub-pixel PX, and a first touch line 221 substantially parallel to the data line DL is disposed on the right side of one of the data lines DL. Optionally, a first touch line 221 may be disposed on the right side of each data line DL, thereby improving touch monitoring accuracy.

For example, the plurality of sub-pixels PX include a plurality of sub-pixel groups. The plurality of sub-pixel groups are arranged in the second direction X. At least one sub-pixel group includes a plurality of sub-pixels PX arranged in the first direction Y. A plurality of sub-pixel groups are disposed between two adjacent first touch lines 221.

Optionally, the plurality of sub-pixels PX may be arranged in an array in the first direction Y and the second direction X. In embodiments of the present disclosure, a column of sub-pixels PX may be used as a sub-pixel group. That is to say, a plurality of columns of sub-pixels PX are disposed between two adjacent first touch lines 221. For example, the first touch lines 221 may be disposed at intervals of three columns of sub-pixels PX, which may reduce the space occupied by the first touch line 221 and increase an opening area of the sub-pixel PX.

Optionally, the plurality of sub-pixels PX include three types of sub-pixels PX, that is, a first sub-pixel PX, a second sub-pixel PX, and a third sub-pixel PX. For ease of expression, the first sub-pixel PX may be described as a red sub-pixel PX, the second sub-pixel PX as a green sub-pixel PX, and the third sub-pixel PX as a blue sub-pixel PX. In embodiments of the present disclosure, the first touch line 221 may be disposed between any two types of sub-pixels PX, which may be determined as desired in practice. For example, since eyes are more sensitive to red and green, the first touch line 221 may be used to improve crosstalk between these two colors. Specifically, the first touch line 221 may be disposed between the red sub-pixel PX and the green sub-pixel PX, and a black matrix may be disposed correspondingly at a position at which the first touch line 221 is located. In this way, the added black matrix is conducive to reducing light leakage between the red sub-pixel PX and the green sub-pixel PX, thereby improving crosstalk between the red sub-pixel PX and the green sub-pixel PX. It should be noted that the black matrix is disposed on a side of the first touch line 221 away from the base substrate 200. The black matrix may be disposed on the display substrate or on a color film substrate that is mated with the display substrate. The specific details may be determined as desired in practice and are not limited here.

In some specific embodiments, the display substrate further includes a second conductive layer D2 disposed on the base substrate 200. The display substrate further includes a plurality of gate lines GL and a plurality of common electrode lines 241. The plurality of gate lines GL extend in the second direction X, the plurality of common electrode lines 241 extend in the second direction X, and the plurality of common electrode lines 241 are electrically connected to the common electrodes V1 of the plurality of sub-pixels PX. The plurality of second touch lines 222, the plurality of gate lines GL, and the plurality of common electrode lines 241 are located in the second conductive layer D2. A resistance on a transmission path of the common electrode V1 in the display region AA may be reduced through the common electrode line 241.

At least one common electrode line 241, at least one gate line GL, and at least one second touch line 222 are disposed between two adjacent sub-pixels PX in the first direction Y. The second touch line 222 and the common electrode line 241 are symmetrical relative to the gate line GL between two adjacent sub-pixels PX in the first direction Y.

For example, a common electrode line 241, a gate line GL, and a second touch line 222 are disposed between two adjacent sub-pixels PX in the first direction Y. The common electrode line 241 and the second touch line 222 are located on the upper and lower sides of the gate line GL, respectively, and a spacing between the common electrode line 241 and the gate line GL is substantially the same as a spacing between the second touch line 222 and the gate line GL.

In embodiments of the present disclosure, at least one sub-pixel PX includes a common electrode V1. The common electrode V1 is provided with a plurality of slits S. The plurality of slits S are arranged in the second direction X.

In the same sub-pixel PX, each slit S includes a first end close to a previous row of sub-pixels PX and a second end close to a next row of sub-pixels PX. An orthographic projection of the second touch line 222 on the base substrate 200 crosses the plurality of slits S and overlaps with an orthographic projection of the second end of each slit S on the base substrate 200. An orthographic projection of the common electrode line 241 on the base substrate 200 crosses the plurality of slits S and overlaps with an orthographic projection of the first end of each slit S on the base substrate 200.

In the embodiments shown in FIG. 12 to FIG. 18, with reference to FIG. 4 and FIG. 5, the display substrate includes a second conductive layer D2, a gate insulation layer D8, a first conductive layer D1, a first transparent electrode layer D3, a first insulation layer D4 and a second transparent electrode layer D5. The second conductive layer D2, the gate insulation layer D8, the first conductive layer D1, the first transparent electrode layer D3, the first insulation layer D4 and the second transparent electrode layer D5 are sequentially arranged in a direction away from the base substrate 200. The second touch line 222, the gate line GL, the common electrode line 241 and the third common signal line 213 are disposed on the same layer and made of the same material. The second touch line 222, the gate line GL, the common electrode line 241 and the third common signal line 213 are located in the second conductive layer D2. The first touch line 221 and the data line DL are disposed on the same layer and made of the same material. The first touch line 221 and the data line DL are located in the first conductive layer D1. The pixel electrode V2 is located in the first transparent electrode layer D3, and the common electrode V1 is located in the second transparent electrode layer D5. In this way, the existing film layer may be reused to form the first touch line 221 and the second touch line 222, thereby saving processes.

It should be noted that the film layers in which the first common signal line 211 and the second common signal line 212 are located may be disposed with reference to the aforementioned embodiments, which will not be repeated here.

The first touch lead 231 may be disposed on the same layer as the first touch line 221, and a material of the first touch lead 231 is the same as a material of the first touch line 221. In the display region AA, the first touch line 221 is substantially parallel to the data line DL. In the peripheral region NA, the first touch line 221 is electrically connected to the touch bonding terminal PAD1 through the first touch lead 231. At an intersection of the first touch lead 231 and the data line DL, the first touch lead 231 may be transferred through a first transfer portion, so as to prevent the first touch lead 231 from short circuiting with the data line DL. The first transfer portion may be located in the second transparent electrode layer D5.

The second touch lead 232 may be disposed on the same layer as the second touch lead 222, and a material of the second touch lead 232 is the same as a material of the second touch lead 222. In the display region AA, the second touch line 222, the gate line GL, and the common electrode line 241 extend in the first direction X. In the peripheral region NA, the second touch line 222 is electrically connected to the touch bonding terminal PAD1 through the second touch lead 232. At an intersection of the second touch lead 232 and the gate line GL (common electrode line 241), the second touch lead 232 may be transferred through a second transfer portion, so as to prevent the second touch lead 232 from short circuiting with the gate line GL (common electrode line 241). The second transfer portion may be located in the second transparent electrode layer D5.

In embodiments of the present disclosures, the material of the first touch line 221 and the second touch line 222 may include a single metal material such as molybdenum, aluminum, and titanium, and the material of the first touch line 221 and the second touch line 222 may include alloy materials of at least two of molybdenum, aluminum, and titanium. Taking a display substrate with 10.1-inch and a resolution of 1920×1080 as an example, both the first touch line 221 and the second touch line 222 are made of molybdenum/aluminum/molybdenum materials, and 36 first touch line groups Z1 and 23 second touch line groups Z2 may be provided. A width of each first touch line group Z1 is set to 6.2 mm, and each first touch line group Z1 includes 55 first touch lines 221 connected in parallel. A remote loop resistance formed by the first touch lines 221 is about 1.4 K Q. A width of each second touch line group Z2 is set to 6.1 mm, and each second touch line group Z2 includes 54 second touch lines 222 connected in parallel. A remote loop resistance formed by the second touch lines 222 is about 3.2 K Q. The touch accuracy may reach to 5 um-50 um, far higher than traditional capacitive touch solutions.

In some specific embodiments, at least one sub-pixel PX includes a first transistor T1. The first transistor T1 is electrically connected to at least one gate line GL. Between two adjacent sub-pixels PX in the first direction Y, an orthographic projection of the first transistor T1 electrically connected to the gate line GL on the base substrate 200 is located between an orthographic projection of the second touch line 222 on the base substrate 200 and an orthographic projection of the common electrode line 241 on the base substrate 200.

In embodiments of the present disclosure, for the first transistor T1 and the gate line GL electrically connected to the first transistor T1, an orthographic projection of a gate S3 of the first transistor T1 on the base substrate 200 overlaps with an orthographic projection of the gate line GL on the base substrate 200, and in the overlapping region, the gate S3 of the first transistor T1 is electrically connected to the gate line GL. Optionally, the gate S3 of the first transistor T1 and the gate line GL are formed as an integrated structure. The second touch line 222 and the common electrode line 241 adjacent to the gate line GL bend towards a direction away from the first transistor T1 when passing through the first transistor T1, so that the second touch line 222 and the common electrode line 241 are located on the upper and lower sides of the first transistor T1, respectively.

Optionally, a spacer may be provided at a position at which the first transistor T1 is located. The spacer is used to support between the display substrate and a paired substrate, so as to maintain a box thickness of the liquid crystal layer. The spacer may be disposed on the display substrate or on the paired substrate, which may be determined as desired in practice and is not limited here.

In embodiments of the present disclosure, by disposing the second touch line 222 and the common electrode line 241 on the upper and lower sides of the first transistor T1 respectively, a barrier may be formed on the upper and lower sides of the first transistor T1, thereby preventing the spacer from offset.

Optionally, in the same sub-pixel PX, a first electrode S1 of the first transistor T1 is in connection with the pixel electrode V2, and an orthographic projection of the connection region on the base substrate 200 overlaps with at least one second touch line 222.

Figure 19:
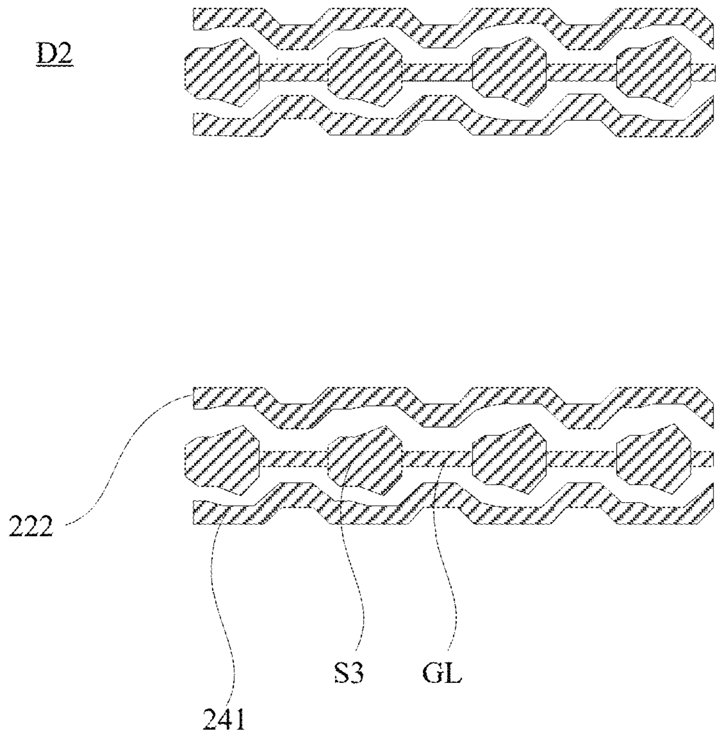
FIG. 19 to FIG. 27 schematically show second partial plan views of upper film layers on a display substrate according to embodiments of the present disclosure.
Figure 20:
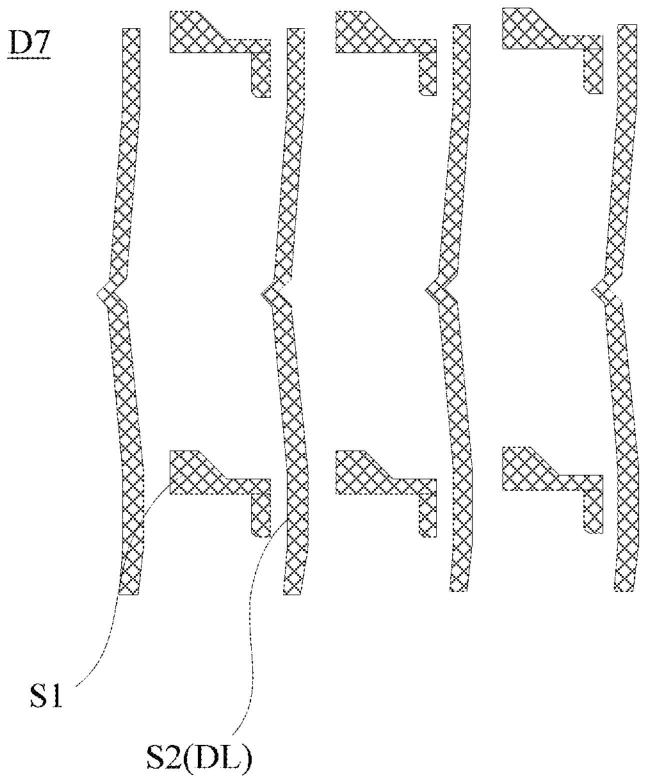
Figure 21:
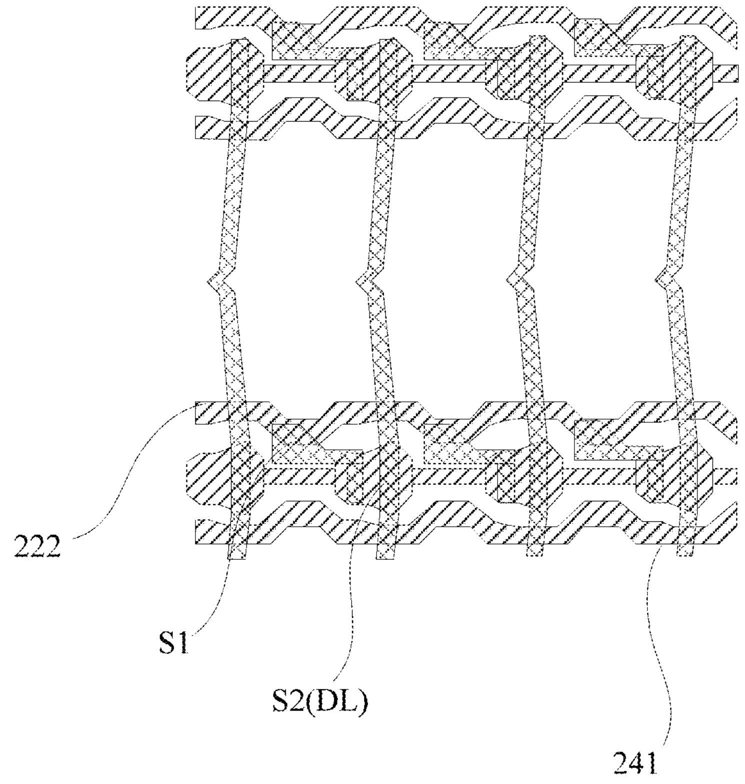
Figure 22:
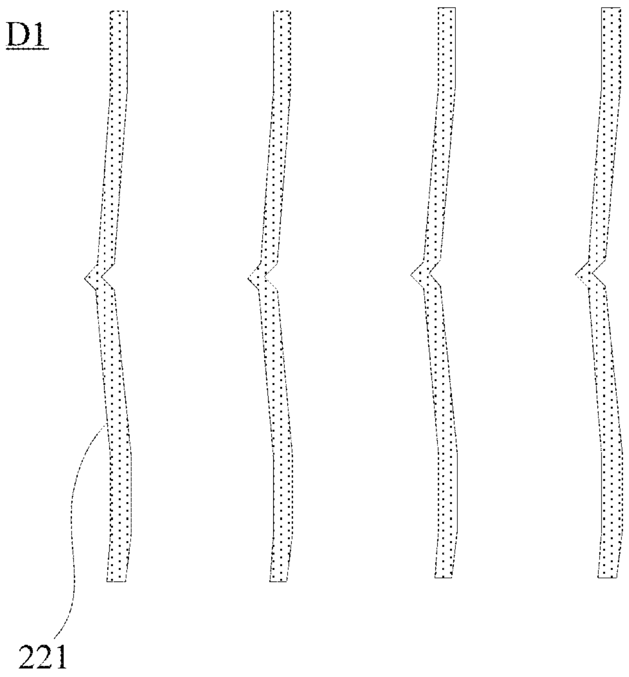
Figure 23:
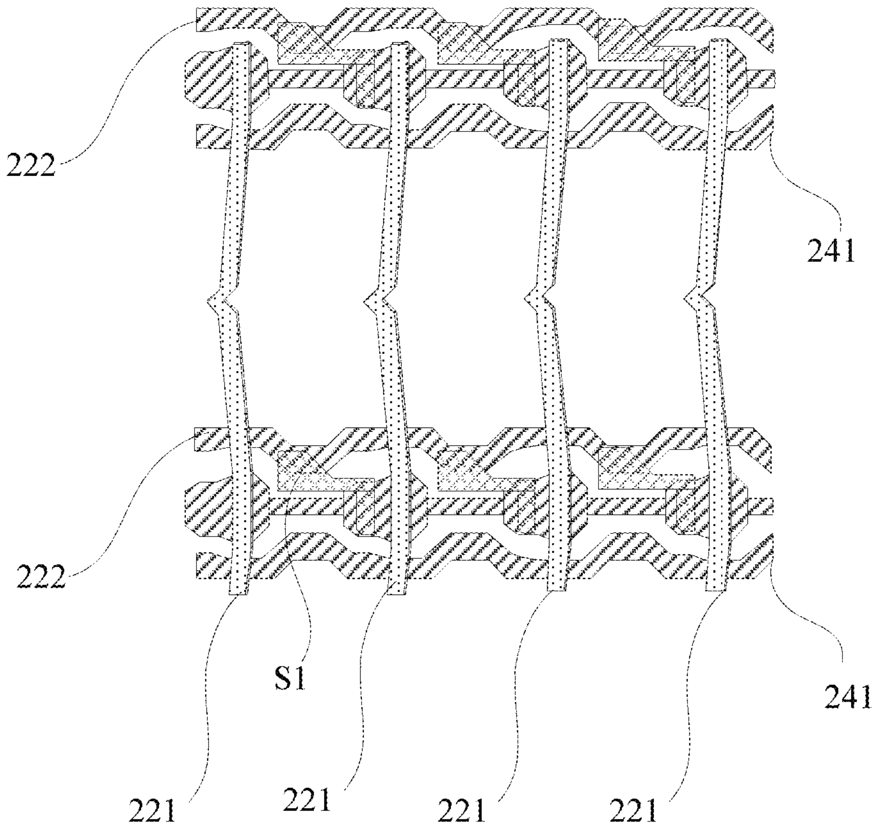
Figure 24:
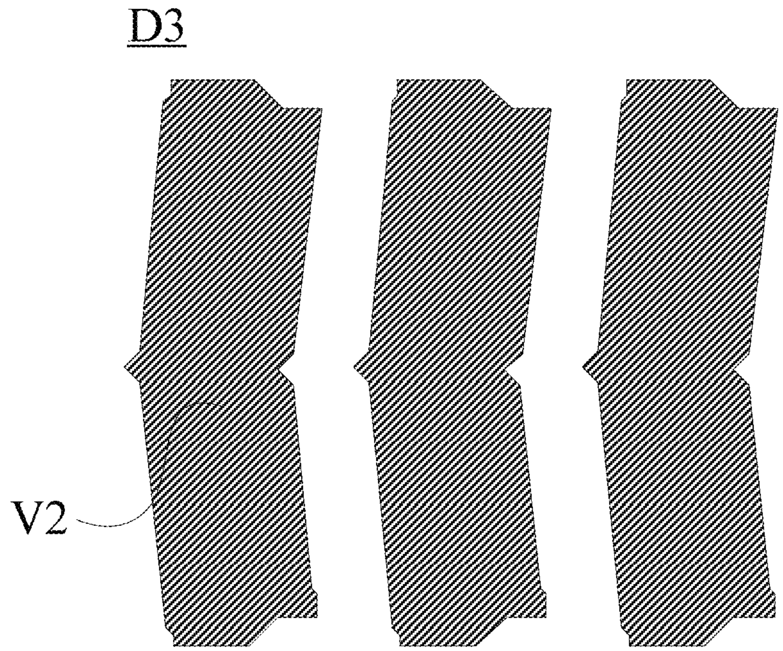
Figure 25:
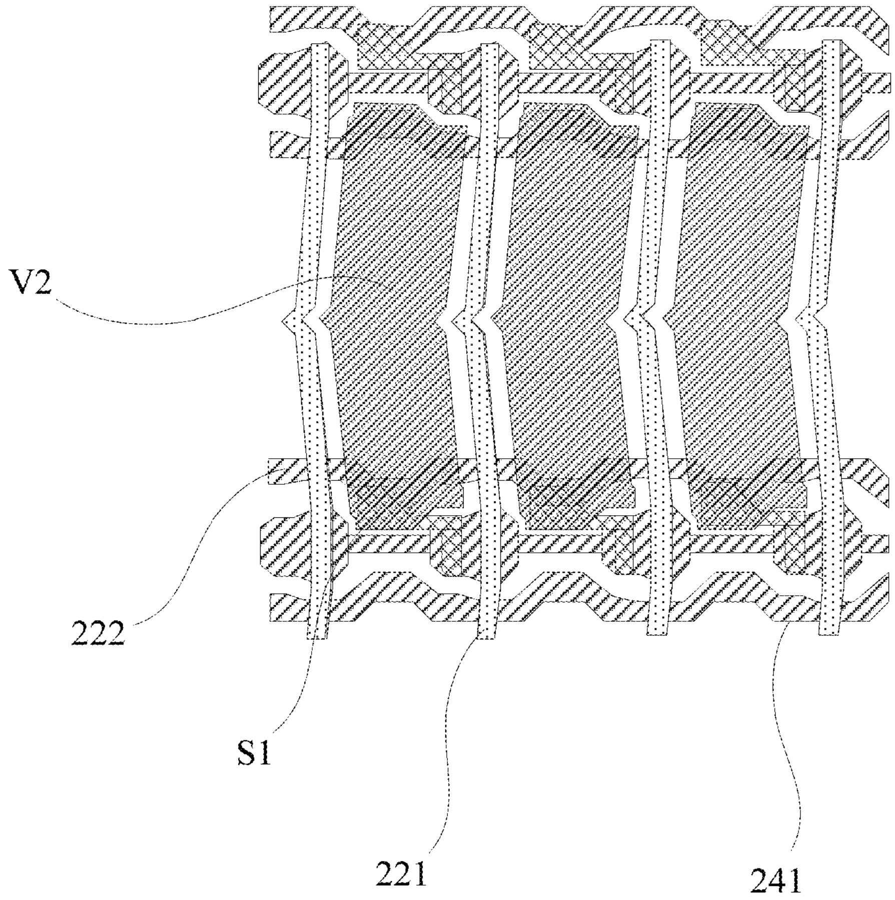
Figure 26:
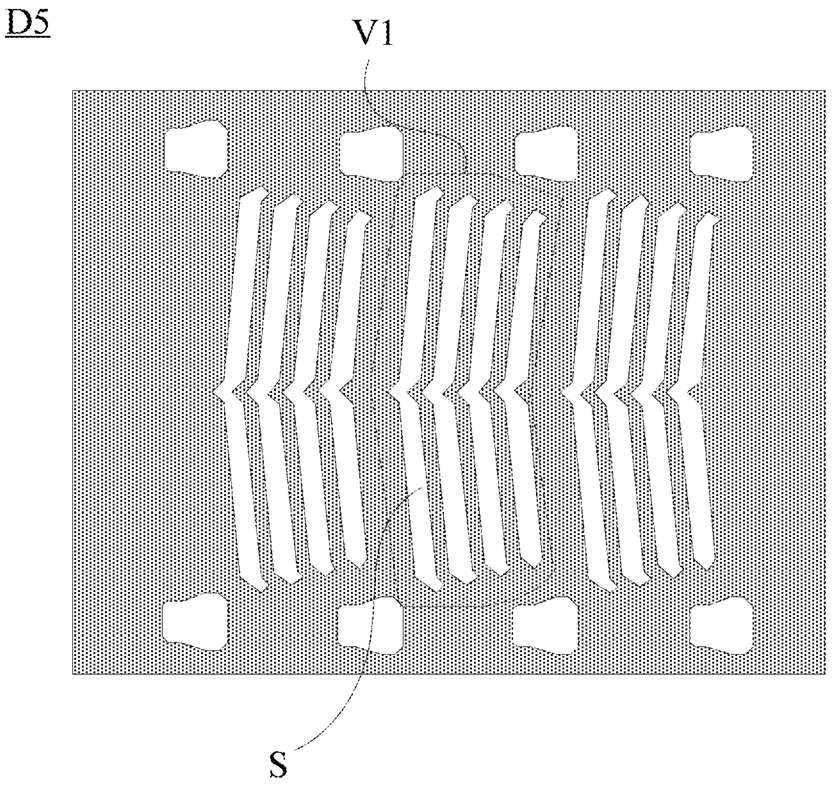
Figure 27:
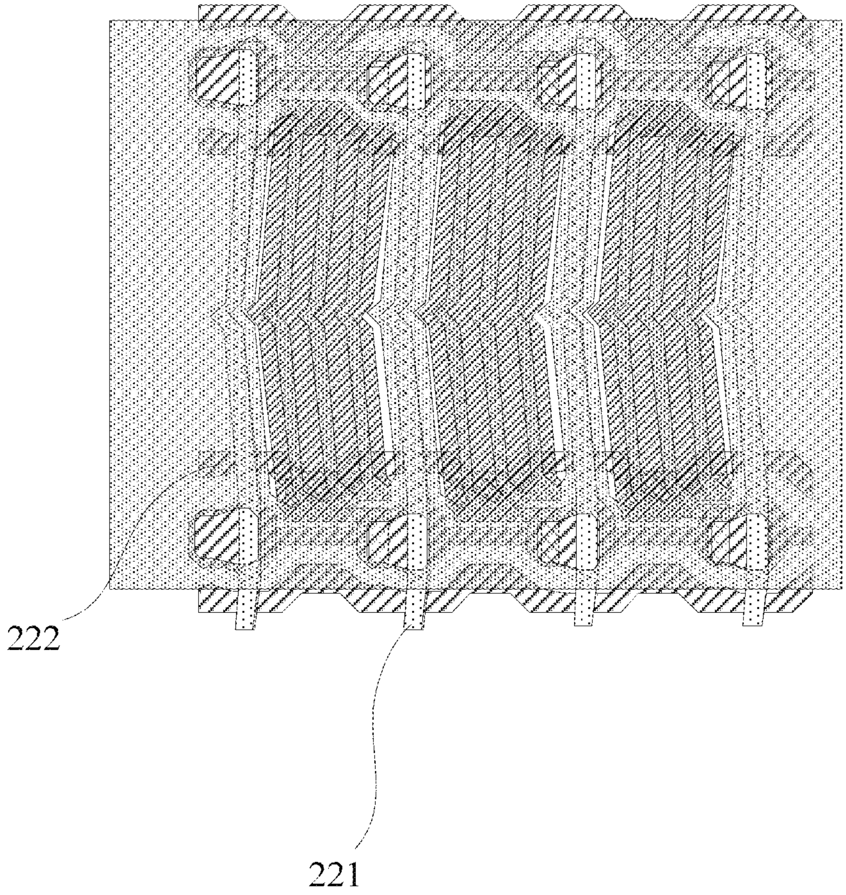

FIG. 19 to FIG. 27 schematically show second partial plan views of upper film layers on a display substrate according to embodiments of the present disclosure. FIG. 19 schematically shows a second plan view of a second conductive layer according to embodiments of the present disclosure. FIG. 20 schematically shows a first plan view of a third conductive layer according to embodiments of the present disclosure. FIG. 21 schematically shows a plan view of a second conductive layer and a third conductive layer according to embodiments of the present disclosure. FIG. 22 schematically shows a second plan view of a first conductive layer according to embodiments of the present disclosure. FIG. 23 schematically shows a plan view of a second conductive layer, a third conductive layer and a first conductive layer according to embodiments of the present disclosure. FIG. 24 schematically shows a second plan view of a first transparent electrode layer according to embodiments of the present disclosure. FIG. 25 schematically shows a plan view of a second conductive layer, a third conductive layer, a first conductive layer and a first transparent electrode layer according to embodiments of the present disclosure. FIG. 26 schematically shows a second plan view of a second transparent electrode layer according to embodiments of the present disclosure. FIG. 27 schematically shows a plan view of a second conductive layer, a third conductive layer, a first conductive layer, a first transparent electrode layer and a second transparent electrode layer according to embodiments of the present disclosure.

With reference to FIG. 19 to FIG. 27, in some specific embodiments, the display substrate further includes a first conductive layer D1 and a third conductive layer D7. The third conductive layer D7 is located on a side of the first conductive layer D1 close to the base substrate 200. The display substrate further includes a plurality of data lines DL. The plurality of data lines DL extend in the first direction Y. The plurality of data lines DL are located in the third conductive layer D7. The plurality of first touch lines 221 are located in the first conductive layer D1. In the display region AA, an orthographic projection of at least one first touch line 221 on the base substrate 200 overlaps with an orthographic projection of at least one data line DL on the base substrate 200, and a ratio of an area of the overlapping region to an area of the first touch line 221 is greater than or equal to 90%.

In embodiments of the present disclosure, the data line DL and the first touch line 221 are disposed in the third conductive layer D7 and the first conductive layer D1 respectively, so that the data line DL and the first touch line 221 are disposed in different layers. Therefore, it is possible to allow the orthographic projection of the data line DL on the base substrate 200 to overlap with the orthographic projection of the first touch line 221 on the base substrate 200, thereby being beneficial for improving the opening rate of the sub-pixel PX. The sub-pixel PX includes a transparent region and other regions located outside the transparent region. The opening rate of the sub-pixel PX may refer to a ratio of an area of the transparent region to an area of other regions. In the display region AA, the data line DL substantially overlaps with the first touch line 221, thereby further improving the opening rate of the sub-pixel PX.

In the embodiments shown in FIG. 19 to FIG. 27, the display substrate may include a second conductive layer D2, a gate insulation layer D8, a third conductive layer D7, a second insulation layer D6, a first conductive layer D1, a first transparent electrode layer D3, a first insulation layer D4, and a second transparent electrode layer D5. The second conductive layer D2, the gate insulation layer D8, the third conductive layer D7, the second insulation layer D6, the first conductive layer D1, the first transparent electrode layer D3, the first insulation layer D4, and the second transparent electrode layer D5 are sequentially disposed in a direction away from the base substrate 200. The second touch line 222, the gate line GL, the common electrode line 241 and the third common signal line 213 are disposed on the same layer and made of the same material. The second touch line 222, the gate line GL, the common electrode line 241 and the third common signal line 213 are located in the second conductive layer D2. The data cable DL is located in the third conductive layer D7. The first touch line 221 is located in the first conductive layer D1. The pixel electrode V2 is located in the first transparent electrode layer D3. The common electrode V1 is located in the second transparent electrode layer D5. In this way, the first touch line 221 may be disposed independently, thereby improving the flexibility of wiring and film thickness design, which is beneficial for improving touch detection effect.

It should be noted that the film layers in which the first common signal line 211 and the second common signal line 212 are located may be disposed with reference to the aforementioned embodiments, which will not be repeated here.

The first touch lead 231 may be disposed on the same layer as the first touch lead 221, a material of the first touch lead 231 is the same as a material of the first touch lead 221. In this way, the first touch lead 231 may avoid short circuiting with the data line DL without transferring, so as to reduce via holes required for transferring, which is beneficial for reducing the risk of encapsulation failure. In this case, it is beneficial for achieving narrow borders by eliminating via holes, where a width of the left and right borders may be reduced by about 2 mm, and a width of the top and bottom borders may be reduced by about 3 mm.

The second touch lead 232 may be disposed on the same layer as the second touch lead 222, and a material of the second touch lead 232 is the same as a material of the second touch lead 222. In the display region AA, the second touch lead 222 and the gate line GL (common electrode line 241) extend in the second direction X. In the peripheral region NA, the second touch lead 222 is electrically connected to the touch bonding terminal PAD1 through the second touch lead 232. At an intersection of the second touch lead 232 and the gate line GL (common electrode line 241), the second touch lead 232 may be transferred through the second transfer portion, so as to prevent the second touch lead 232 from short circuiting with the gate line GL (common electrode line 241). The second transfer portion may be located in the second transparent electrode layer D5.

In embodiments of the present disclosure, the number of the first touch line groups Z1 is smaller than the number of the second touch line groups Z2. By disposing the first touch line 221 and the first touch lead 231 independently in the first conductive layer D1, it is beneficial for reducing the resistance on the first touch line 221 and the first touch lead 231. For example, since the layer in which the first touch line 221 (first touch lead 231) is located does not participate in a formation of a structure of the first transistor T1, a selective range of a material of the first touch line 221 (first touch lead 231) is wider, for example, copper material with lower resistivity may be selected. Moreover, a thickness of the first touch line 221 (first touch lead 231) is not limited by the structure of the first transistor T1. The first touch line 221 (first touch lead 231) may be thicker, thereby further reducing the resistance. For example, the first touch line 221 (first touch lead 231) may be deposited by vacuum sputtering or electroplating, and may be patterned through photolithography. When forming the first touch line 221 (first touch lead 231) using sputtering technology, the thickness of the first touch line 221 (first touch lead 231) may reach to 900 nm, and a loop resistance of the first touch lead 231 may be reduced to 0.2 KΩ, with significant advantages. When forming the first touch line 221 (first touch lead 231) using electroplating technology, the thickness of the first touch line 221 (first touch lead 231) may reach to 2000 nm, and the loop resistance of the first touch lead 231 may be reduced to 0.1 K Q.

Figure 28:
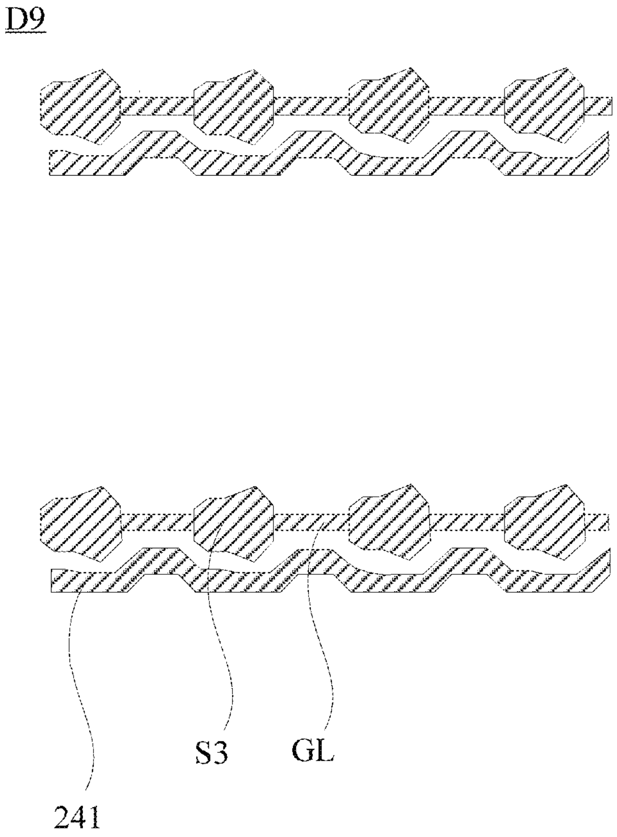
FIG. 28 to FIG. 36 schematically show third partial plan views of upper film layers on a display substrate according to embodiments of the present disclosure.
Figure 29:
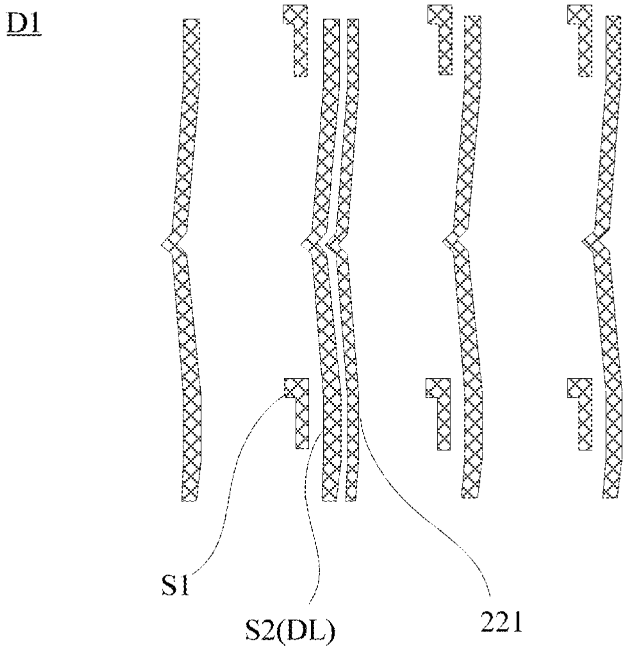
Figure 30:
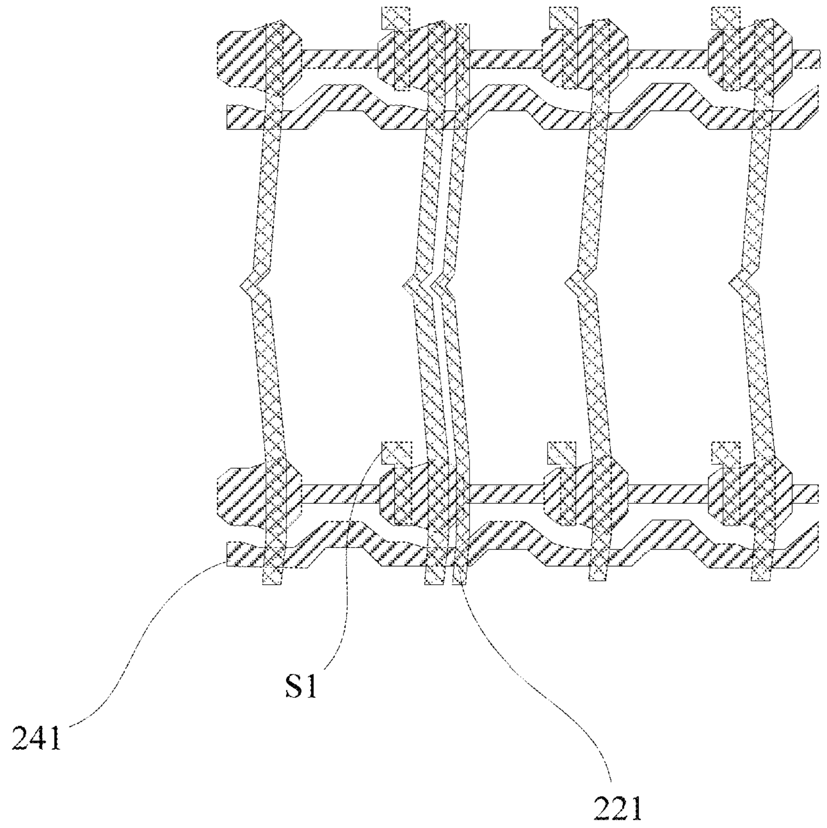
Figure 31:
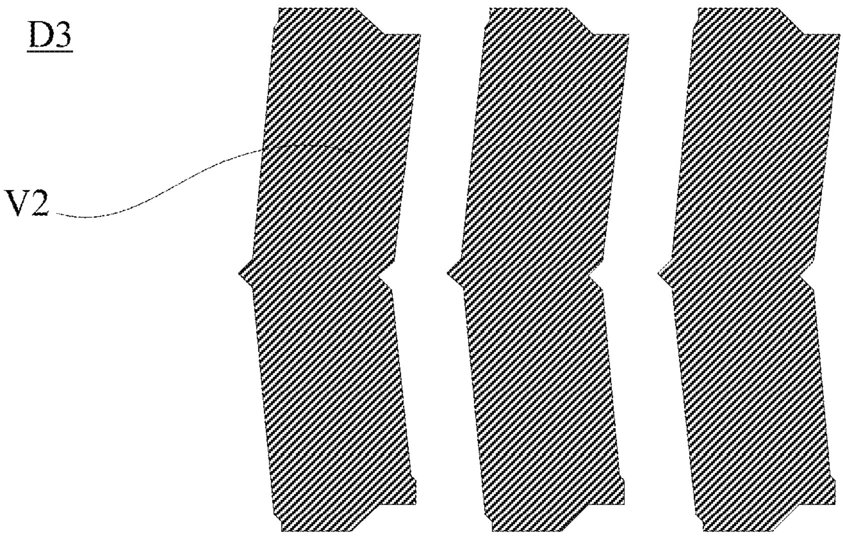
Figure 32:
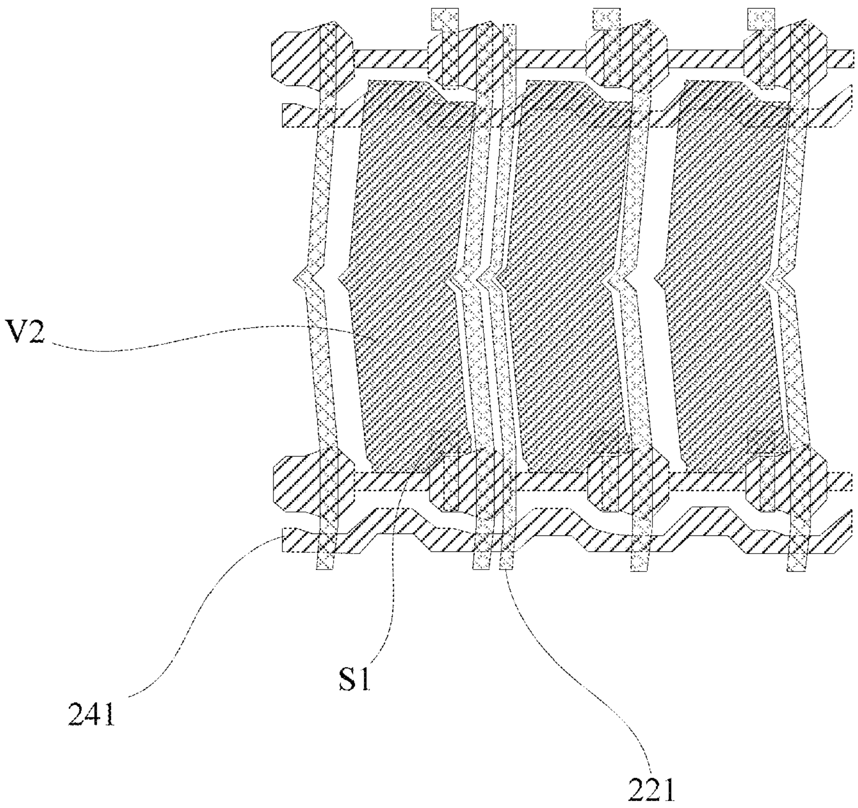
Figure 33:
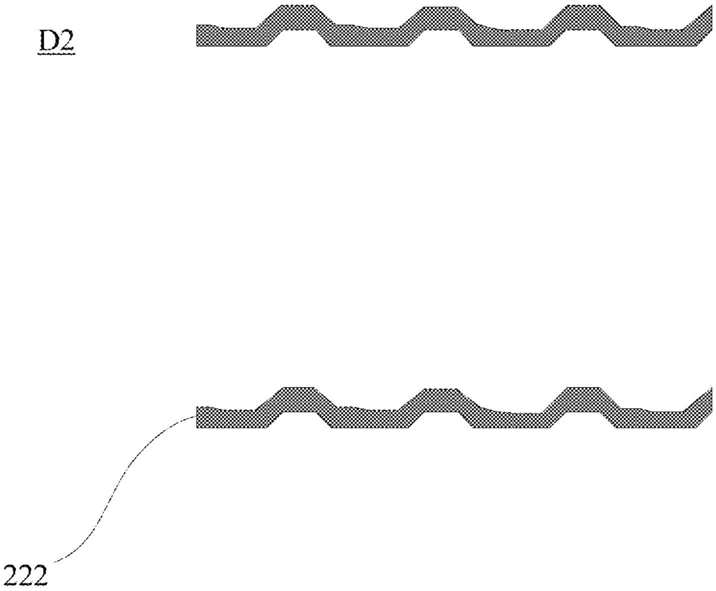
Figure 34:
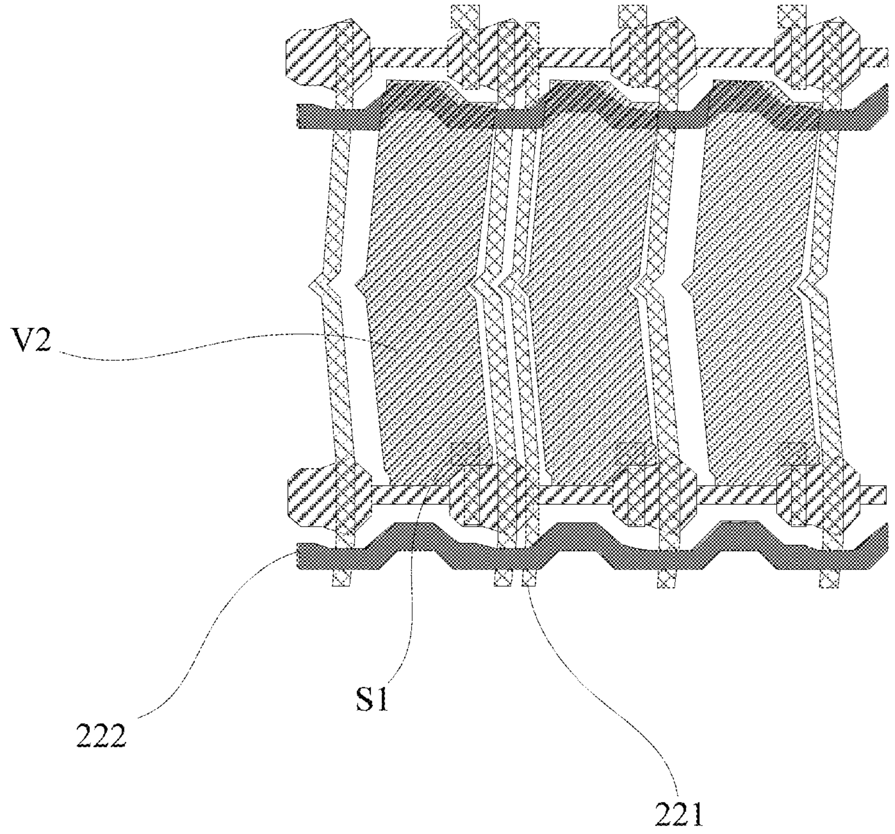
Figure 35:
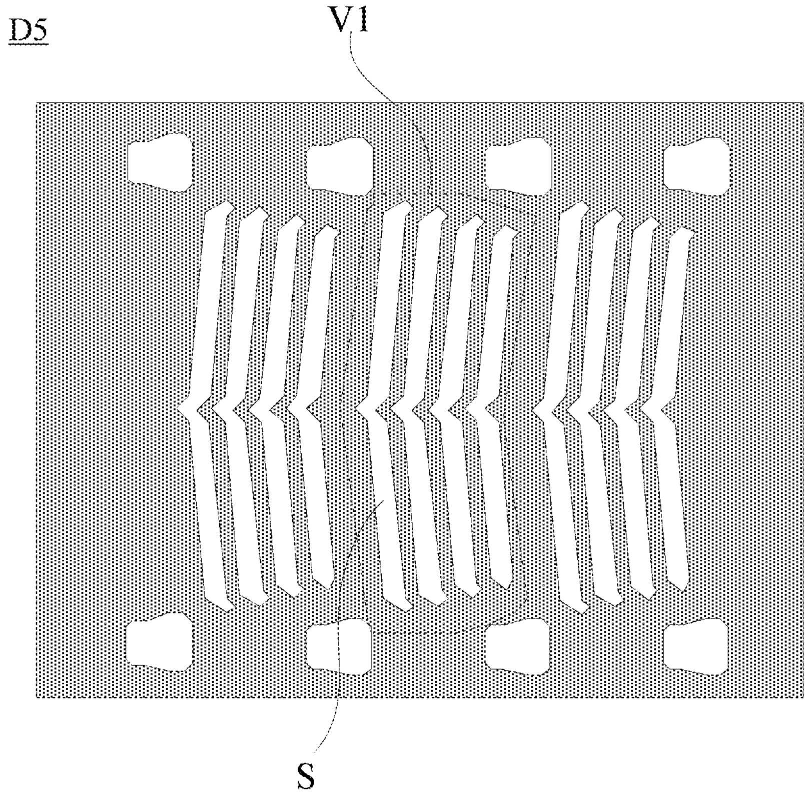
Figure 36:
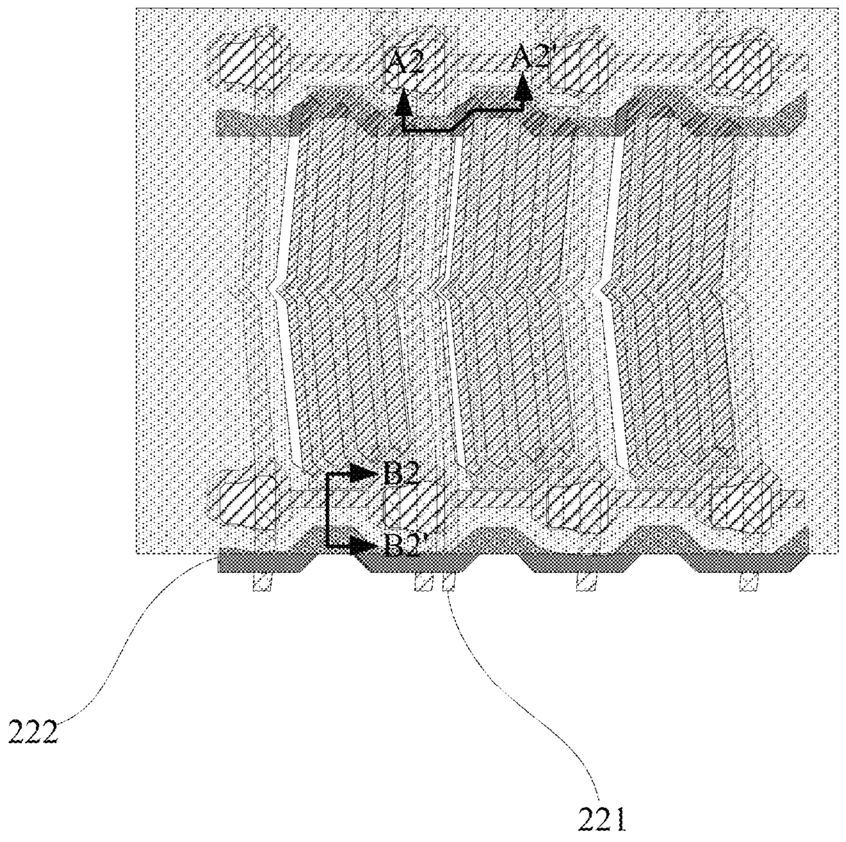
Figure 37:
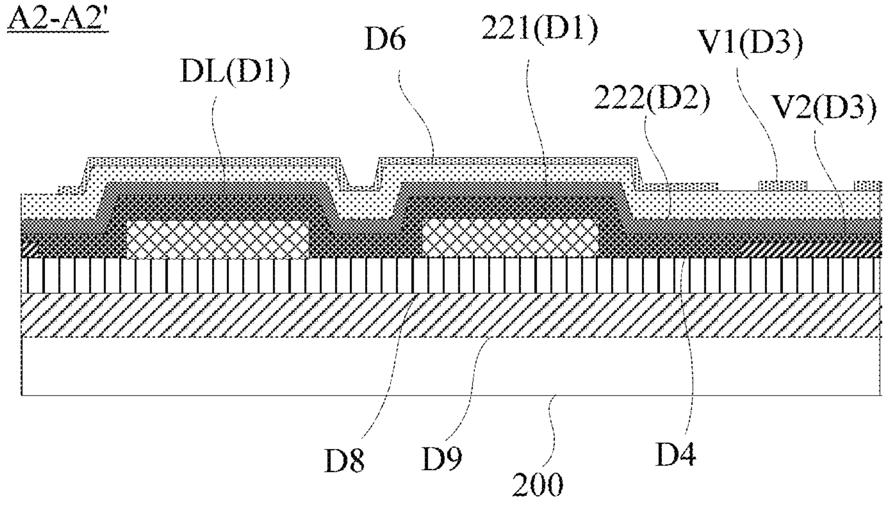
FIG. 37 schematically shows a sectional view taken along sectional line A2-A2' in FIG. 36.
Figure 38:
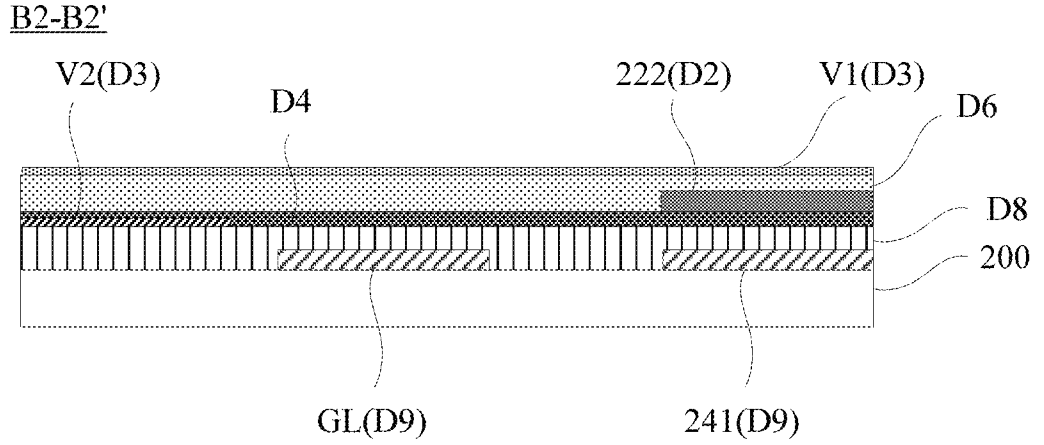
FIG. 38 schematically shows a sectional view taken along sectional line B2-B2' in FIG. 36.
Figure 39:
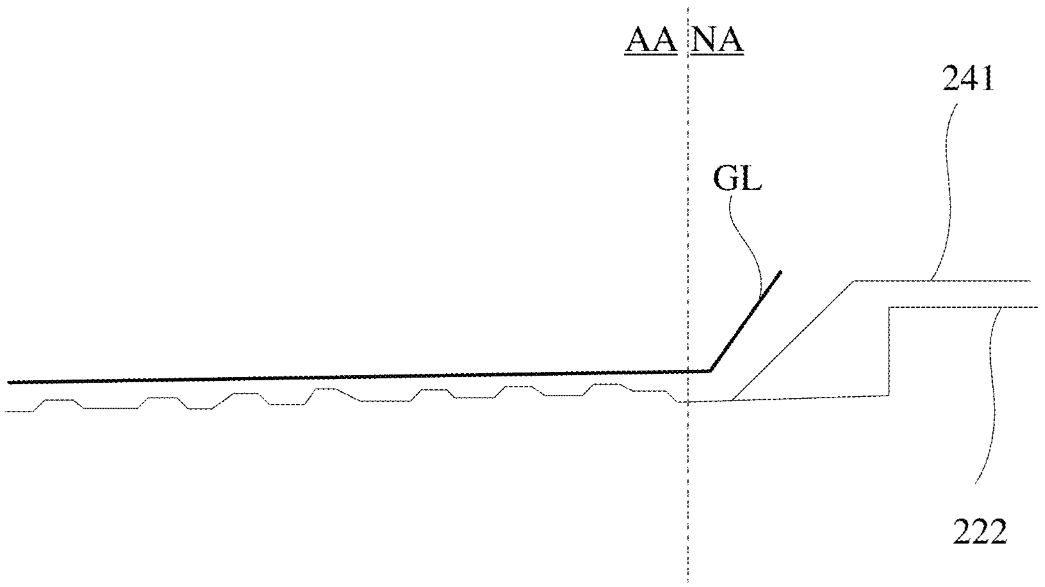
FIG. 39 schematically shows a schematic diagram of a common electrode line and a second touch line extending from a peripheral region to a display region.

FIG. 28 to FIG. 36 schematically show third partial plan views of upper film layers on a display substrate according to embodiments of the present disclosure. FIG. 28 schematically shows a first plan view of a fourth conductive layer according to embodiments of the present disclosure. FIG. 29 schematically shows a third plan view of a first conductive layer according to embodiments of the present disclosure. FIG. 30 schematically shows a plan view of a fourth conductive layer and a first conductive layer according to embodiments of the present disclosure. FIG. 31 schematically shows a third plan view of a first transparent electrode layer according to embodiments of the present disclosure. FIG. 32 schematically shows a plan view of a fourth conductive layer, a first conductive layer and a first transparent electrode according to embodiments of the present disclosure. FIG. 33 schematically shows a third plan view of a second conductive layer according to embodiments of the present disclosure. FIG. 34 schematically shows a plan view of a fourth conductive layer, a first conductive layer, a first transparent electrode layer and a second conductive layer according to embodiments of the present disclosure. FIG. 35 schematically shows a third plan view of a second transparent electrode layer according to embodiments of the present disclosure. FIG. 36 schematically shows a plan view of a fourth conductive layer, a first conductive layer, a first transparent electrode layer, a second conductive layer and a second transparent electrode layer according to embodiments of the present disclosure. FIG. 37 schematically shows a sectional view taken along sectional line A2-A2' in FIG. 36. FIG. 38 schematically shows a sectional view taken along sectional line B2-B2' in FIG. 36. FIG. 39 schematically shows a schematic diagram of a common electrode line and a second touch line extending from a peripheral region to a display region.

With reference to FIG. 28 to FIG. 39, in some specific embodiments, the display substrate further includes a second conductive layer D2 and a fourth conductive layer D9. The fourth conductive layer D9 is located on a side of the second conductive layer D2 close to the base substrate 200. The display substrate further includes a plurality of common electrode lines 241. The plurality of common electrode lines 241 extend in the second direction X. The plurality of common electrode lines 241 are electrically connected to the common electrodes V1 of the plurality of sub-pixels PX. The plurality of common electrode lines 241 are located in the fourth conductive layer D9, and the plurality of second touch lines 222 are located in the second conductive layer D2. In the display region AA, an orthographic projection of at least one second touch line 222 on the base substrate 200 overlaps with an orthographic projection of at least one common electrode line 241 on the base substrate 200, and a ratio of an area of the overlapping region to an area of the second touch line 222 is greater than or equal to 90%.

In embodiments of the present disclosure, the common electrode line 241 and the second touch line 222 are disposed in the fourth conductive layer D9 and the second conductive layer D2 respectively, so that the common electrode line 241 and the second touch line 222 are disposed in different layers. Therefore, it is possible to allow the orthographic projection of the common electrode line 241 on the base substrate 200 to overlap with the orthographic projection of the second touch line 222 on the base substrate 200, thereby being beneficial for improving the opening rate of the sub-pixel PX. For example, with reference to FIG. 39, in the peripheral region NA, the common electrode line 241 and the second touch line 222 may be disposed separately or may be overlapped. In a part of the peripheral region NA close to the display region AA, the common electrode line 241 gradually converges with the second touch line 222, so as to achieve an overlap between the two. After converging, the common electrode line 241 and the second touch line 222 extend into the display region AA. In this way, in the display region AA, the common electrode line 241 substantially overlaps with the second touch line 222, thereby further improving the opening rate of the sub-pixel PX.

Taking a display substrate with 10.1-inch and a resolution of 1920×1200 as an example, when disposing the second touch line 222 on the same layer as the common electrode line 241 and manufacturing the second touch line 222 and the common electrode line 241 by the same material, the opening rate of the sub-pixel PX is about 54%. When the second touch line 222 and the common electrode line 241 are disposed in different layers, the second touch line 222 overlaps with the common electrode line 241, the opening rate of the sub-pixel PX is greater than or equal to 56%.

In some specific embodiments, the display substrate further includes a plurality of second touch leads 232, a gate driving circuit 21 and a third common signal line 213. The third common signal line 213 is located in the peripheral region NA, and at least one sub-pixel PX includes a common electrode V1. The third common signal line 213 is electrically connected to the common electrodes V1 of the plurality of sub-pixels PX. The plurality of second touch lines 222 are electrically connected to the touch bonding terminal PAD1 through the plurality of second touch leads 232. The second touch lines 222 in different second touch line groups Z2 are electrically connected to the touch bonding terminal PAD1 through different second touch leads 232. The plurality of second touch leads 232 are located in the second conductive layer D2. A layer in which the first common signal line 211, the second common signal line 212, the third common signal line 213, and the gate S3 driving circuit 21 are located is on a side of the second conductive layer D2 close to the base substrate 200. Orthographic projections of the plurality of second touch leads 232 on the base substrate 200 overlap with orthographic projections of the first common signal line 211, the second common signal line 212, the third common signal line 213 and the gate driving circuit 21 on the base substrate 200.

In the embodiments shown in FIG. 28 to FIG. 39, the display substrate may include a fourth conductive layer D9, a gate insulation layer D8, a first conductive layer D1, a first transparent electrode layer D3, a first insulation layer D4, a second conductive layer D2, a third insulation layer D10 and a second transparent electrode layer D5. The fourth conductive layer D9, the gate insulation layer D8, the first conductive layer D1, the first transparent electrode layer D3, the first insulation layer D4, the second conductive layer D2, the third insulation layer D10, and the second transparent electrode layer D5 are sequentially disposed in a direction away from the base substrate 200. The gate line GL, the common electrode line 241 and the third common signal line 213 are disposed on the same layer and made of the same material.

The gate line GL, the common electrode line 241 and the third common signal line 213 are located in the fourth conductive layer D9. The first touch line 221 and the data line DL are disposed on the same layer and made of the same material. The first touch line 221 and the data line DL are located in the first conductive layer D1. The pixel electrode V2 is located in the first transparent electrode layer D3, the second touch line 222 is located in the second conductive layer D2, and the common electrode V1 is located in the second transparent electrode layer D5. In this way, the second touch line 222 may be disposed independently, thereby improving the flexibility of wiring and film thickness design, which is beneficial for improving touch detection effect.

It should be noted that the film layers in which the first common signal line 211 and the second common signal line 212 are located may be disposed with reference to the aforementioned embodiments, which will not be repeated here.

The first touch lead 231 may be disposed on the same layer as the first touch line 221, and a material of the first touch lead 231 is the same as a material of the first touch line 221. In the display region AA, the first touch line 221 is substantially parallel to the data line DL. In the peripheral region NA, the first touch line 221 is electrically connected to the touch bonding terminal PAD1 through the first touch lead 231. At an intersection of the first touch lead 231 and the data line DL, the first touch lead 231 may be transferred through the first transfer portion, so as to prevent the first touch lead 231 from short circuiting with the data line DL. The first transfer portion may be located in the second transparent electrode layer D5.

The second touch lead 232 may be disposed on the same layer as the second touch lead 222, and a material of the second touch lead 232 is the same as a material of the second touch lead 222. In this way, the second touch lead 232 may avoid short circuiting with the gate line GL (common electrode line 241) without transferring, so as to reduce via holes required for transferring, which is beneficial for reducing the risk of encapsulation failure. Moreover, when the second touch lead 232 extends from the side edge region Q3 towards the bonding region Q2, the second touch lead 232 may pass through the region in which at least one of the first common signal line 211, the second common signal line 212, the third common signal line 213 and the gate driving circuit 21 is located, which is conducive to achieving narrow borders. In this way, a width of the left and right borders may be reduced by about 2 mm, and a width of the upper and lower borders may be reduced by about 5 mm.

In embodiments of the present disclosure, the number of the second touch line groups Z2 is smaller than the number of the first touch line groups Z1. By disposing the second touch line 222 and the second touch lead 232 independently in the second conductive layer D2, it is beneficial for reducing the resistance on the second touch line 222 and the second touch lead 232. For example, since the layer in which the second touch line 222 (second touch lead 232) is located does not participate in a formation of a structure of the first transistor T1, a selective range of a material of the second touch line 222 (second touch lead 232) is wider, for example, copper material with lower resistivity may be selected. Moreover, a thickness of the second touch line 222 (second touch lead 232) is not limited by the structure of the first transistor T1. The second touch line 222 (second touch lead 232) may be thicker, thereby further reducing the resistance. For example, the second touch line 222 (second touch lead 232) may be deposited by vacuum sputtering or electroplating, and may be patterned through photolithography. When forming the second touch line 222 (second touch lead 232) using sputtering technology, the thickness of the second touch line 222 (second touch lead 232) may reach to 900 nm, and a remote loop resistance of the second touch lead 232 may be reduced to 0.5 KΩ, with significant advantages. When forming the second touch line 222 (second touch lead 232) using electroplating technology, the thickness of the second touch line 222 (second touch lead 232) may reach to 2000 nm, and the remote loop resistance of the second touch lead 232 may be reduced to 0.2 KΩ.

Figure 40:
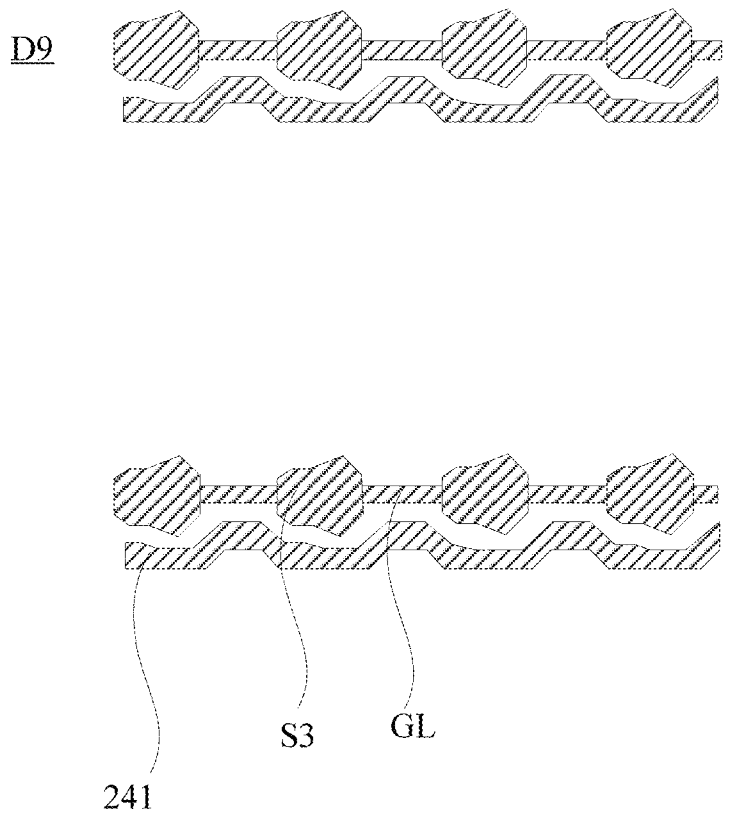
FIG. 40 to FIG. 50 schematically show fourth partial plan views of upper film layers on a display substrate according to embodiments of the present disclosure.
Figure 41:
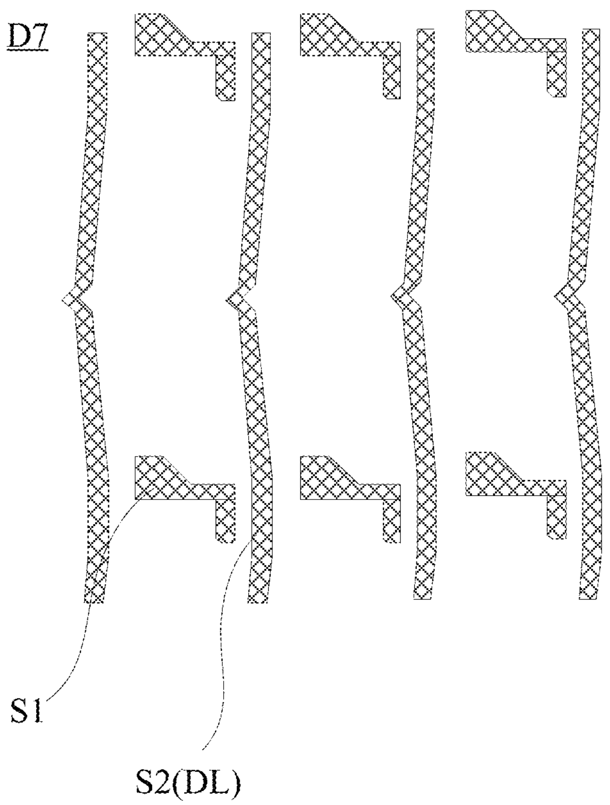
Figure 42:
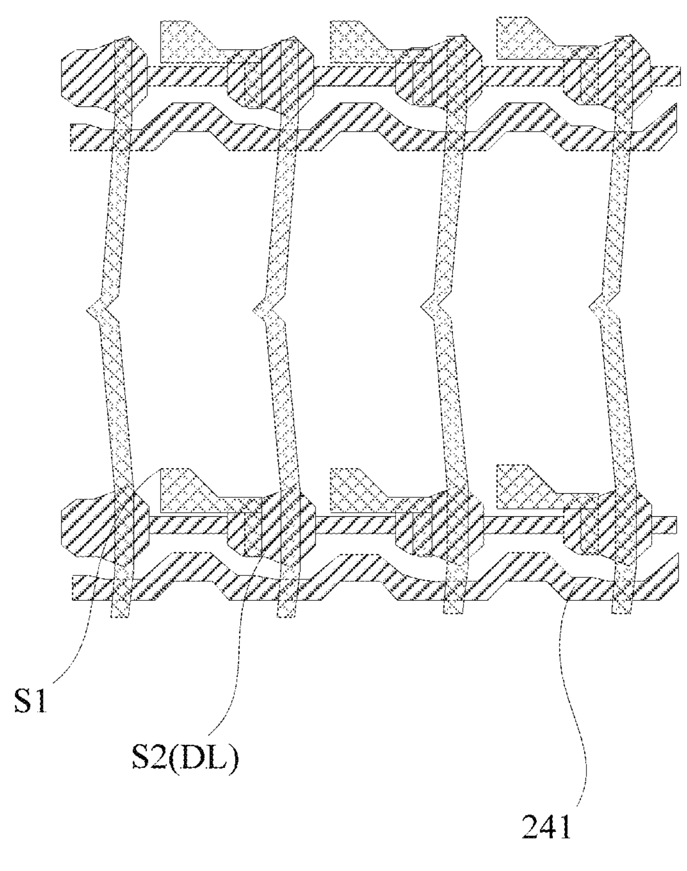
Figure 43:
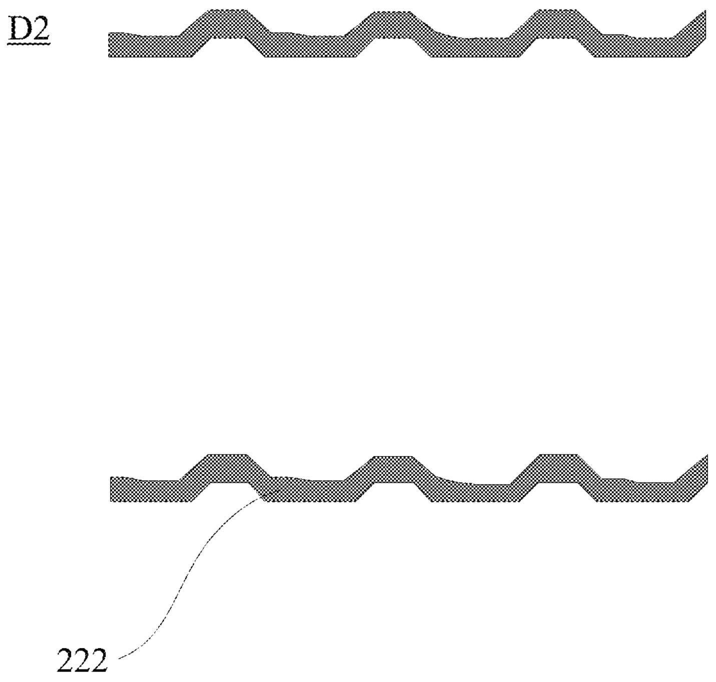
Figure 44:
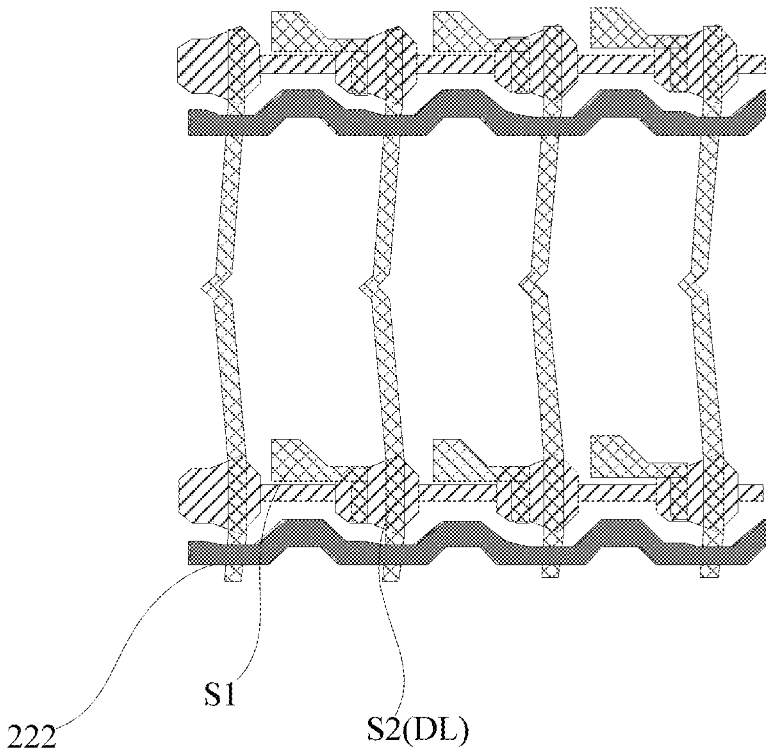
Figure 45:
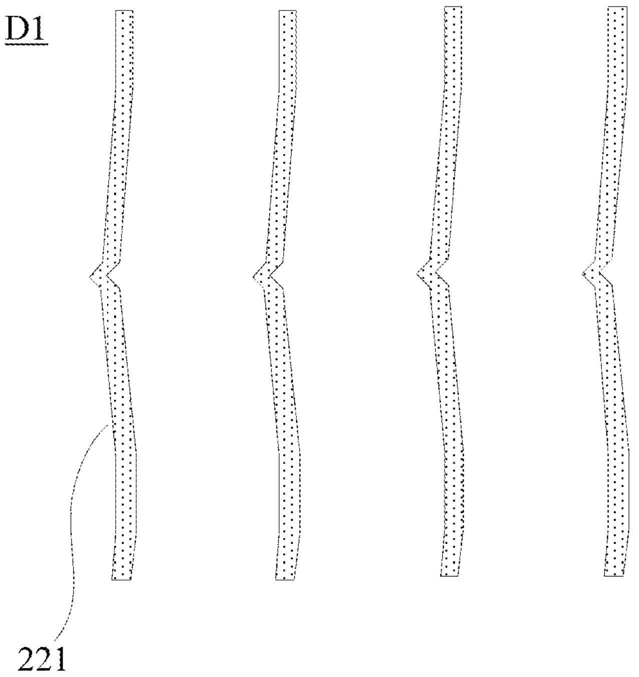
Figure 46:
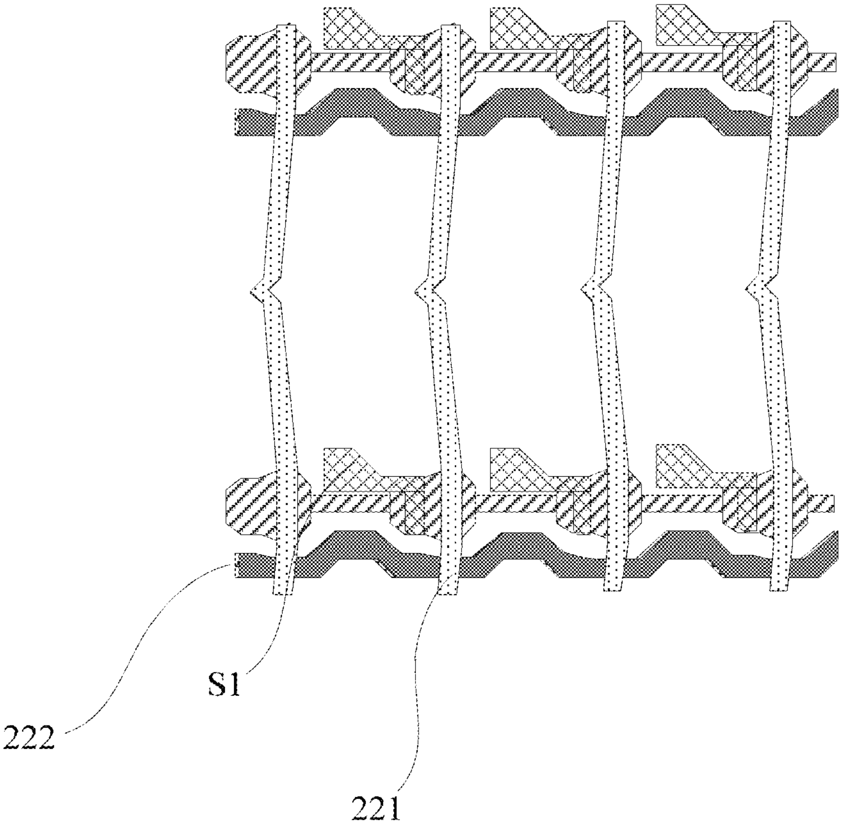
Figure 47:
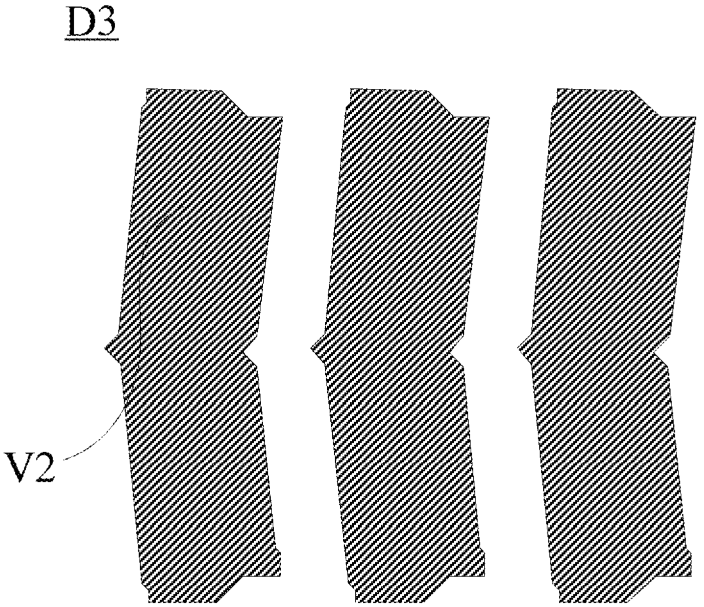
Figure 48:
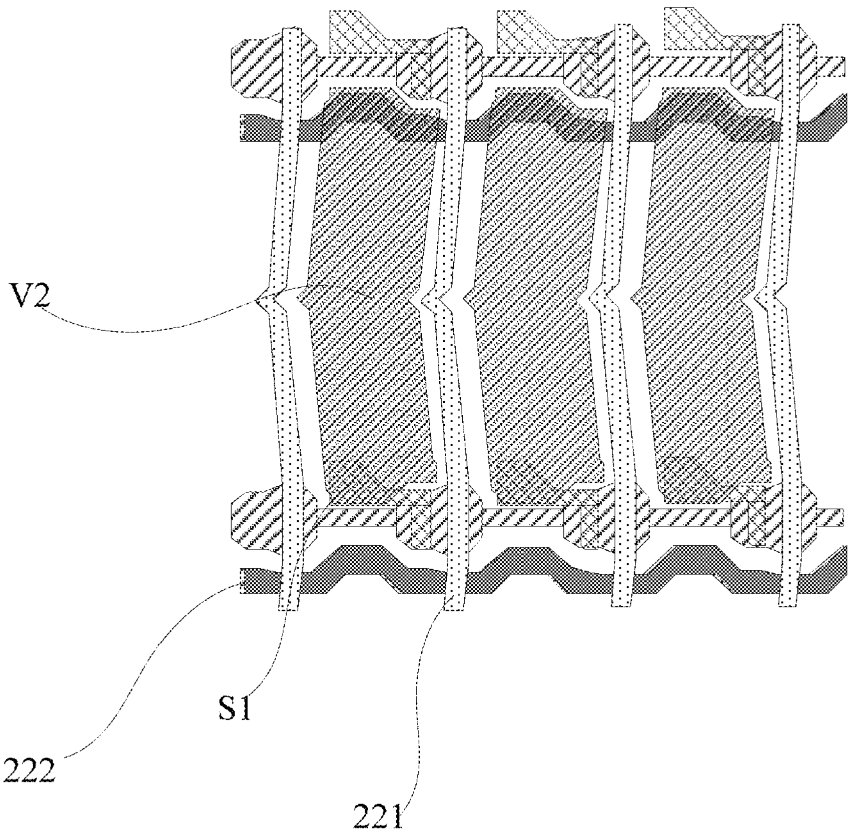
Figure 49:
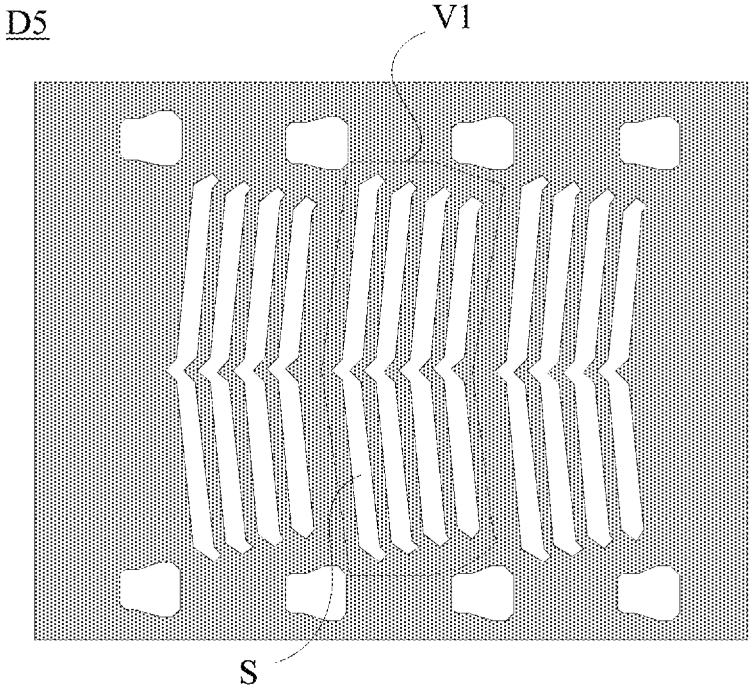
Figure 50:
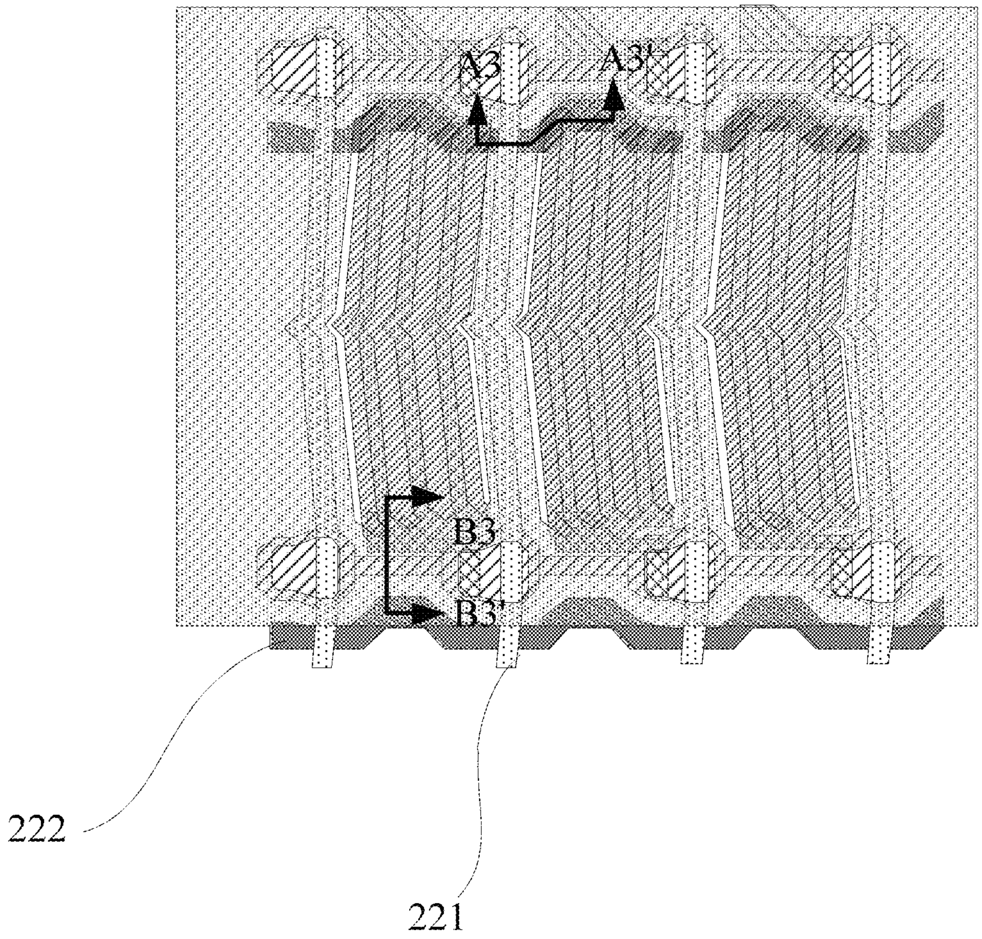
Figure 51:
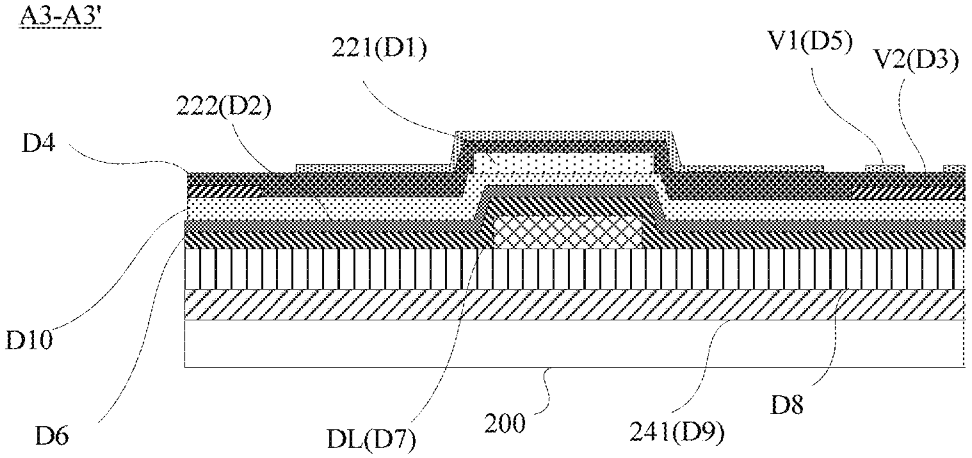
FIG. 51 schematically shows a sectional view taken along sectional line A3-A3' in FIG. 50.
Figure 52:
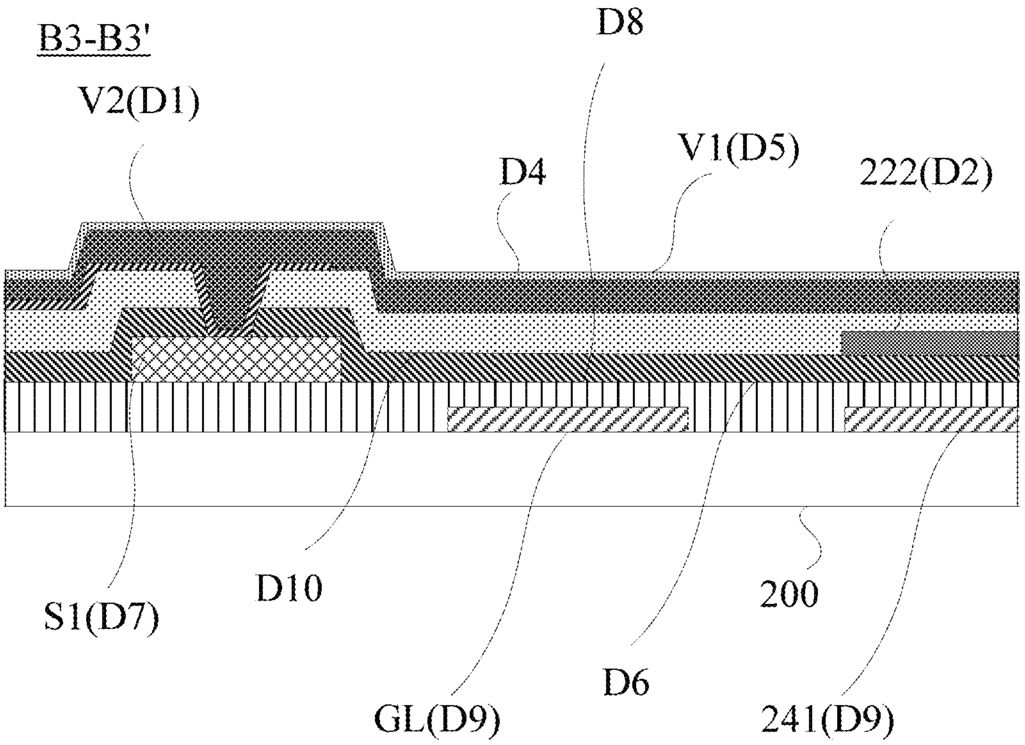
FIG. 52 schematically shows a sectional view taken along sectional line B3-B3' in FIG. 50.

FIG. 40 to FIG. 50 schematically show fourth partial plan views of upper film layers on a display substrate according to embodiments of the present disclosure. FIG. 40 schematically shows a second plan view of a fourth conductive layer according to embodiments of the present disclosure. FIG. 41 schematically shows a second plan view of a third conductive layer according to embodiments of the present disclosure. FIG. 42 schematically shows a plan view of a fourth conductive layer and a third conductive layer according to embodiments of the present disclosure. FIG. 43 schematically shows a fourth plan view of a second conductive layer according to embodiments of the present disclosure. FIG. 44 schematically shows a plan view of a fourth conductive layer, a third conductive layer and a second conductive layer according to embodiments of the present disclosure. FIG. 45 schematically shows a fourth plan view of a first conductive layer according to embodiments of the present disclosure. FIG. 46 schematically shows a plan view of a fourth conductive layer, a third conductive layer, a second conductive layer and a first conductive layer according to embodiments of the present disclosure. FIG. 47 schematically shows a fourth plan view of a first transparent electrode layer according to embodiments of the present disclosure. FIG. 48 schematically shows a plan view of a fourth conductive layer, a third conductive layer, a second conductive layer, a first conductive layer and a first transparent electrode layer according to embodiments of the present disclosure. FIG. 49 schematically shows a fourth plan view of a second transparent electrode layer according to embodiments of the present disclosure. FIG. 50 schematically shows a plan view of a fourth conductive layer, a third conductive layer, a second conductive layer, a first conductive layer, a first transparent electrode layer and a second transparent electrode layer according to embodiments of the present disclosure. FIG. 51 schematically shows a sectional view taken along sectional line A3-A3' in FIG. 50. FIG. 52 schematically shows a sectional view taken along sectional line B3-B3' in FIG. 50.

With reference to FIG. 40 to FIG. 52, in some specific embodiments, the display substrate further includes a first conductive layer D1, a second conductive layer D2, a third conductive layer D7 and a fourth conductive layer D9. The fourth conductive layer D9, the third conductive layer D7, the second conductive layer D2 and the first conductive layer D1 are sequentially disposed in a direction away from the base substrate 200. The display substrate further includes a plurality of common electrode lines 241 and a plurality of data lines DL. The plurality of data lines DL extend in the first direction Y. The plurality of common electrode lines 241 extend in the second direction X. The plurality of common electrode lines 241 are electrically connected to the common electrodes V1 of the plurality of sub-pixel PX. The plurality of first touch lines 221 are located in the first conductive layer D1. The plurality of second touch lines 222 are located in the second conductive layer D2. The plurality of data lines DL are located in the third conductive layer D7.

The plurality of common electrode lines 241 are located in the fourth conductive layer D9. In the display region AA, an orthographic projection of at least one first touch line 221 on the base substrate 200 overlaps with an orthographic projection of at least one data line DL on the base substrate 200, and a ratio of an area of the overlapping region to an area of the first touch line 221 is greater than or equal to 90%. And/or, an orthographic projection of at least one second touch line 222 on the base substrate 200 overlaps with an orthographic projection of at least one common electrode line 241 on the base substrate 200, and a ratio of an area of the overlapping region to an area of the second touch line 222 is greater than or equal to 90%.

In the display region AA, the data line DL substantially overlaps with the first touch line 221, and the common electrode line 241 substantially overlaps with the second touch line 222, thereby further improving the opening rate of the sub-pixel PX.

Taking a display substrate with 10.1-inch and a resolution of 1920×1200 as an example, when the first touch line 221 overlaps with the data line DL and the second touch line 222 overlaps with the common electrode line 241, the opening rate of the sub-pixel PX is greater than or equal to 62%.

In addition, when disposing the first touch line 221 and the data line DL on the same layer and manufacturing the first touch line 221 and the data line DL by the same material, in order to ensure the opening rate of the sub-pixel PX, a first touch line 221 is disposed every three columns of sub-pixels PX. After disposing the first touch line 221 and the data line DL in different layers, a corresponding first touch line 221 may be disposed on each data line DL. In this case, the opening rate of the sub-pixel PX may be larger. Besides, the number of wires on the first touch line 221 is three times of the original number, and the resistance on the first touch line 221 may be reduced to 1/18 of the original resistance.

It should be noted that the thicknesses of the first touch line 221 (first touch lead 231) and the second touch line 222 (second touch lead 232) may be set with reference to the aforementioned embodiments, which will not be repeated here.

In the embodiments shown in FIG. 40 to FIG. 52, the display substrate may include a fourth conductive layer D9, a gate insulation layer D8, a third conductive layer D7, a second insulation layer D6, a second conductive layer D2, a third insulation layer D10, a first conductive layer D1, a first transparent electrode layer D3, a first insulation layer D4, and a second transparent electrode layer D5. The fourth conductive layer D9, the gate insulation layer D8, the third conductive layer D7, the second insulation layer D6, the second conductive layer D2, the third insulation layer D10, the first conductive layer D1, the first transparent electrode layer D3, the first insulation layer D4 and the second transparent electrode layer D5 are sequentially disposed in a direction away from the base substrate plate 200. The gate line GL, the common electrode line 241, and the third common signal line 213 are disposed on the same layer and made of the same material. The gate line GL, the common electrode line 241, and the third common signal line 213 are located in the fourth conductive layer D9. The data line DL is located in the third conductive layer D7. The second touch line 222 is located in the second conductive layer D2. The first touch line 221 is located in the first conductive layer D1. The pixel electrode V2 is located in the first transparent electrode layer D3. The common electrode V1 is located in the second transparent electrode layer D5. In this way, the first touch line 221 and the second touch line 222 may be independently disposed, thereby improving the flexibility of wiring and film thickness design of the first touch line 221 and the second touch line 222 simultaneously, which is beneficial for further improving touch detection effect.

It should be noted that the film layers in which the first common signal line 211, the second common signal line 212, the first touch lead 231, and the second touch lead 232 are located may be disposed with reference to the aforementioned embodiments, which will not be repeated here.

In the embodiments shown in FIG. 12 to FIG. 18 and the embodiments shown in FIG. 28 to FIG. 39, the pixel electrode V2 may be in connection with the first transistor T1.

Specifically, in some embodiments, the display substrate further includes a first conductive layer D1, a first transparent electrode layer D3, and a first insulation layer D4. The first transparent electrode layer D3 is located on a side of the first conductive layer D1 away from the base substrate 200. The first insulation layer D4 is located on a side of the first transparent electrode layer D3 away from the base substrate 200. The plurality of first touch lines 221 are located in the first conductive layer D1. At least one sub-pixel PX includes a first transistor T1 and a pixel electrode V2. The pixel electrode V2 is located in the first transparent electrode layer D3. A first electrode S1 of the first transistor T1 is located in the first conductive layer D1. The first insulation layer D4 covers the pixel electrode V2, the first electrode S1 of the first transistor T1 and the plurality of first touch lines 221. In the same sub-pixel PX, the pixel electrode V2 in connection with the first electrode S1 of the first transistor T1.

In embodiments of the present disclosure, the first transistor T1 further includes a second electrode S2 and a gate S3. The gate S3 is electrically connected to the gate line GL. The second electrode S2 is electrically connected to the data line DL. Optionally, both the data line DL and the second electrode S2 of the first transistor T1 may be disposed in the first conductive layer D1. That is to say, in embodiments of the present disclosure, the data line DL, the first electrode S1 and second electrode S2 of the first transistor T1, and the plurality of first touch lines 221 are disposed on the same layer and made of the same material. After forming the first conductive layer D1, the first transparent electrode layer D3 may be directly formed, and the pixel electrode V2 may overlap with the first electrode S1 of the first transistor T1. Afterwards, a first insulation layer D4 is formed on a side of the first transparent electrode layer D3 away from the base substrate 200. Optionally, a second transparent electrode layer D5 is further provided on a side of the first insulation layer D4 away from the base substrate 200. At least one sub-pixel PX further includes a common electrode V1. The common electrode V1 is located in the second transparent electrode layer D5. Through covering the pixel electrode V2, the first electrode S1 of the first transistor T1 and the plurality of first touch lines 221 by the first insulation layer D4, the pixel electrode V2, the first electrode S1 of the first transistor T1 and the plurality of first touch lines 221 may be insulated and spaced from the common electrode V1.

In the embodiments shown in FIG. 19 to FIG. 27 and the embodiments shown in FIG. 40 to FIG. 52, the pixel electrode V2 may be electrically connected to the first transistor T1 through a first via hole.

Specifically, in some embodiments, the display substrate further includes a first conductive layer D1, a second insulation layer D6, a third conductive layer D7, a first transparent electrode layer D3 and a first insulation layer D4. The second insulation layer D6 is located on a side of the third conductive layer D7 away from the base substrate 200. The first conductive layer D1 is located on a side of the second insulation layer D6 away from the base substrate 200. The first transparent electrode layer D3 is located on a side of the second insulation layer D6 away from the base substrate 200. The first insulation layer D4 is located on a side of the first transparent electrode layer D3 away from the base substrate 200. The plurality of first touch lines 221 are located in the first conductive layer D1. At least one sub-pixel PX includes a first transistor T1 and a pixel electrode V2. The pixel electrode V2 is located in the first transparent electrode layer D3. The first electrode S1 of the first transistor T1 is located in the third conductive layer D7. The second insulation layer D6 covers the first electrode S1 of the first transistor T1. The first insulation layer D4 covers the pixel electrode V2 and the plurality of first touch lines 221. In the same sub-pixel PX, the pixel electrode V2 is electrically connected to the first electrode S1 of the first transistor T1 through the first via hole penetrating through the second insulation layer D6.

In embodiments of the present disclosure, the data line DL and the second electrode S2 of the first transistor T1 may be disposed in the third conductive layer D7. That is to say, in embodiments of the present disclosure, the data line DL, the first electrode S1 and second electrode S2 of the first transistor T1 are disposed on the same layer and made of the same material, and the first touch line 221 is independently disposed in the first conductive layer D1. After forming the second insulation layer D6, a first via hole may be formed on the second insulation layer D6. The first via hole exposes the first electrode S1 of the first transistor T1. After forming the first conductive layer D1, a first transparent electrode layer D3 may be directly formed, and the pixel electrode V2 may be electrically connected to the first electrode S1 of the first transistor T1 through the first via hole. Afterwards, a first insulation layer D4 is formed on a side of the first transparent electrode layer D3 away from the base substrate 200. Optionally, a second transparent electrode layer D5 is further provided on a side of the first insulation layer D4 away from the base substrate 200. At least one sub-pixel PX further includes a common electrode V1. The common electrode V1 is located in the second transparent electrode layer D5. Through covering the pixel electrode V2 and the plurality of first touch lines 221 by the first insulation layer D4, the pixel electrode V2 and the plurality of first touch lines 221 may be insulated and spaced from the common electrode V1.

In some specific embodiments, the plurality of sub-pixels PX include a plurality of sub-pixel groups. The plurality of sub-pixel groups are arranged in the second direction X. At least one sub-pixel group includes a plurality of sub-pixels PX arranged in the first direction Y. At least one first touch line 221 is disposed between two adjacent sub-pixel groups.

In embodiments of the present disclosure, a column of sub-pixels PX may be used as a sub-pixel group. In a case that the first touch line 221 and the data line DL are disposed in different layers, that is, in a case that the first touch line 221 is located in the first conductive layer D1 and the data line DL is located in the third conductive layer D7, a first touch line 221 may be disposed between each two adjacent column of sub-pixels PX. The first touch line 221 overlaps with the data line DL. In this way, it is possible to improve touch detection accuracy while the opening rate (the first touch line 221 overlaps with the data line DL) is affected as little as possible or even not affected at all.

In some specific embodiments, the plurality of sub-pixels PX include a plurality of sub-pixel groups. The plurality of sub-pixel groups are arranged in the second direction X. At least one sub-pixel group includes a plurality of sub-pixels PX arranged in the first direction Y. The sub-pixels PX in different sub-pixel groups are different. At least one sub-pixel PX includes a common electrode V1. The common electrode V1 is provided with a plurality of slits S. In at least one sub-pixel group, an orthographic projection of an $i^{th}$ slit S of the plurality of sub-pixels PX on the base substrate 200 defines a fifth pattern. An orthographic projection of the at least one first touch line 221 on the base substrate 200 overlaps with the fifth pattern, where i is a positive integer.

Figure 53:
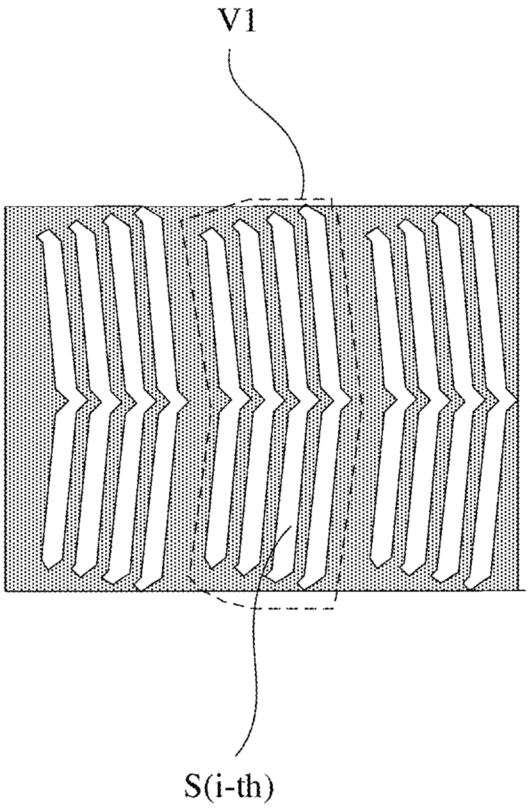
FIG. 53 and FIG. 54 schematically show an $i^{th}$ slit according to embodiments of the present disclosure.
Figure 54:
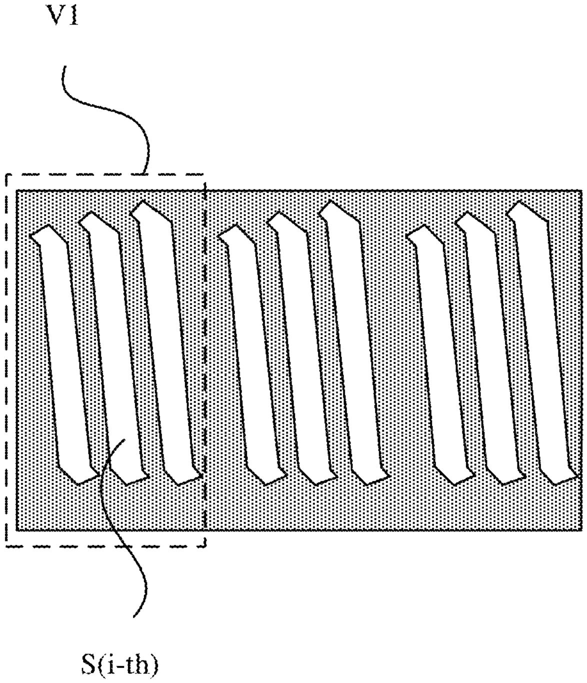

FIG. 53 and FIG. 54 schematically show an $i^{th}$ slit according to embodiments of the present disclosure.

With reference to FIG. 53, the $i^{th}$ slit S may refer to a slit located in the interior part of a sub-pixel PX. In some embodiments, the $i^{th}$ slit S may refer to a slit located in the interior part of a sub-pixel PX, that is, at least one slit is provided between the $i^{th}$ slit S and its adjacent data line on both sides of the $i^{th}$ slit S, and the number of slits between the $i^{th}$ slit S and the data line is not equal on the two sides, that is, the distances between the first touch line 221 and the data lines are not equal on the two sides.

With reference to FIG. 54, in some embodiments, the $i^{th}$ slit S may refer to a slit located in the middle of a sub-pixel PX, where the distances between the first touch line 221 and the data lines on two sides of the first touch line 221 are substantially equal. In some embodiments, the distances between the first touch line 221 and the data lines on two sides of the first touch line 221 are equal.

In a column of sub-pixels PX, the orthographic projection of the $i^{th}$ slit S of the plurality of sub-pixels PX on the base substrate 200 may define the fifth pattern. The fifth pattern may be substantially parallel to the orthographic projection of the data line DL on the base substrate 200. The first touch line 221 overlaps with the $i^{th}$ slit S in a column of sub-pixels PX, thereby reducing an overlap area between the first touch line 221 and the common electrode V1, thereby facilitating the interference between the first touch line 221 and the common electrode V1.

At least some embodiments of the present disclosure further provide a display panel. The display panel includes the display substrate as described above. The display panel has a display region AA, a peripheral region NA and related structures thereof. For example, the display panel may be a liquid crystal display panel.

At least some embodiments of the present disclosure further provide a display device. The display device may include any device or product with display function. For example, the display device may be a smartphone, a mobile phone, an e-book reader, a desktop computer (PC), a laptop PC, a netbook PC, a personal digital assistant (PDA), a portable multimedia player (PMP), a digital audio player, a mobile medical device, a camera, a wearable device (such as head-worn device, electronic clothing, electronic bracelet, electronic necklace, electronic accessory, or electronic tattoo, or smartwatch), or a television, etc.

It should be understood that according to embodiments of the present disclosure, the display device has the characteristics and advantages of the display substrate and the display panel described above, and reference may be made to the previous descriptions, which will not be repeated here.

Those of skill in the art may understand that the features recorded in the various embodiments and/or claims of the present disclosure may be associated or combined in various ways, even if such associations or combinations are not explicitly recorded in the present disclosure. Specifically, without departing from the spirit and teachings of the present disclosure, the features recorded in the various embodiments and/or claims of the present disclosure may be associated and/or combined in various ways. All these associations and/or combinations fall within the scope of the present disclosure.

Embodiments of the present disclosure have been described above. However, these embodiments are for illustrative purposes only and are not intended to limit the scope of the present disclosure. Although each embodiment is described separately above, this does not mean that the measures in the various embodiments may not be used in conjunction to advantage. The scope of the present disclosure is limited by the accompanying claims and their equivalents. Without departing from the scope of the present disclosure, those skilled in the art may make various substitutions and modifications, and all of which should fall within the scope of the present disclosure.

What is claimed is:

1. A display substrate, comprising a display region and a peripheral region at least partially surrounding the display region, wherein the display substrate further comprises:

a base substrate;

a plurality of sub-pixels disposed on the base substrate and located in the display region, wherein the plurality of sub-pixels are arranged in an array in a first direction and a second direction intersecting with the first direction;

a first common signal line, a second common signal line and a touch bonding terminal disposed on the base substrate, wherein the first common signal line, the second common signal line and the touch bonding terminal are located in the peripheral region, the peripheral region comprises a bonding pair region and a bonding region opposite to the bonding pair region in the first direction, and the touch bonding terminal is located in the bonding region; and a plurality of first touch lines and a plurality of second touch lines disposed on the base substrate, wherein the plurality of first touch lines and the plurality of second touch lines are at least located in the display region, the plurality of first touch lines and the plurality of second touch lines are insulated and spaced from each other, the plurality of first touch lines extend in the first direction, and the plurality of second touch lines extend in the second direction, wherein a first end of each of the plurality of first touch lines is electrically connected to the first common signal line, a second end of each of the plurality of first touch lines is electrically connected to the touch bonding terminal, a first end of each of the plurality of second touch lines is electrically connected to the second common signal line, and a second end of each of the plurality of second touch lines is electrically connected to the touch bonding terminal;

wherein the plurality of first touch lines comprise M first touch line groups, the plurality of second touch lines comprise N second touch line groups, each first touch line group comprises at least one first touch line, different first touch line groups comprise different first touch lines, each second touch line group comprises at least one second touch line, and different second touch line groups comprise different second touch lines;

wherein the touch bonding terminal comprises a plurality of sensing terminals, the M first touch line groups and the N second touch line groups are electrically connected to different sensing terminals, different first touch line groups are electrically connected to different sensing terminals, and different second touch line groups are electrically connected to different sensing terminals; and wherein M and N are positive integers.

2. The display substrate of claim 1, wherein the touch bonding terminal comprises a plurality of first sensing terminals, a plurality of second sensing terminals, a plurality of third sensing terminals and a plurality of fourth sensing terminals, the plurality of first sensing terminals are located between two adjacent third sensing terminals, and the plurality of second sensing terminals are located between two adjacent fourth sensing terminals;

wherein the M first touch line groups are electrically connected to the plurality of first sensing terminals, different first touch line groups are electrically connected to different first sensing terminals, the N second touch line groups are electrically connected to the plurality of second sensing terminals, and different second touch line groups are electrically connected to different second sensing terminals; and wherein a first end of the first common signal line is electrically connected to one third sensing terminal, a second end of the first common signal line is electrically connected to another third sensing terminal, a first end of the second common signal line is electrically connected to one fourth sensing terminal, and a second end of the second common signal line is electrically connected to another fourth sensing terminal.

3. The display substrate of claim 1, wherein orthographic projections of the plurality of first touch lines on the base substrate define a first pattern, orthographic projections of the plurality of second touch lines on the base substrate define a second pattern, and at least one of the first pattern and the second pattern covers an orthographic projection of the display region on the base substrate.

4. The display substrate of claim 3, wherein in the first direction, the first pattern protrudes from the orthographic projection of the display region on the base substrate, and in the second direction, the first pattern is located within the orthographic projection of the display region on the base substrate; and wherein the second pattern covers the orthographic projection of the display region on the base substrate.

5. The display substrate of claim 3, wherein in the first direction, the second pattern comprises a first side edge and a second side edge opposite to the first side edge, the display region comprises a third side edge and a fourth side edge opposite to the third side edge, a spacing between the first side edge and the third side edge is a first spacing, a spacing between the second side edge and the fourth side edge is a second spacing, and at least one of the first spacing and the second spacing is less than a width of a second touch line group.

6. The display substrate of claim 1, further comprising a plurality of first touch leads and a plurality of second touch leads, wherein the peripheral region further comprises two side edge regions opposite to each other in the second direction;

wherein the plurality of first touch lines are electrically connected to the touch bonding terminal through the plurality of first touch leads, and the first touch lines in different first touch line groups are electrically connected to the touch bonding terminal through different first touch leads;

wherein the plurality of second touch lines are electrically connected to the touch bonding terminal through the plurality of second touch leads, and the second touch lines in different second touch line groups are electrically connected to the touch bonding terminal through different second touch leads; and wherein the plurality of first touch leads are located in the bonding region, the plurality of second touch leads are located in the same side edge region, and the plurality of second touch leads extend from the side edge region to the bonding region.

7. The display substrate of claim 6, further comprising a plurality of gate lines and a plurality of data lines, wherein the plurality of gate lines and the plurality of data lines are located in the display region;

wherein the first common signal line comprises a first line segment in the bonding pair region and a second line segment in the side edge region, the second common signal line comprises a third line segment in the bonding pair region and a fourth line segment in the side edge region, the first line segment and the third line segment extend in the second direction, and the second line segment and the fourth line segment extend in the first direction;

wherein the first line segment and the third line segment are disposed on the same layer as the plurality of gate lines, and a material of the first line segment and the third line segment is the same as a material of the plurality of gate lines; and wherein the second line segment and the fourth line segment are disposed on the same layer as the plurality of data lines, and a material of the second line segment and the fourth line segment is the same as a material of the plurality of data lines.

8. The display substrate of claim 7, further comprising a third common signal line disposed on the base substrate, wherein the third common signal line is located in the peripheral region, at least one of the plurality of sub-pixels comprises a common electrode, and the third common signal line is electrically connected to common electrodes of the plurality of sub-pixels;

wherein an orthographic projection of the third common signal line on the base substrate at least partially surrounds an orthographic projection of the display region on the base substrate;

wherein in the bonding pair region, an orthographic projection of the third line segment on the base substrate is located on a side of an orthographic projection of the first line segment on the base substrate away from the orthographic projection of the third common signal line on the base substrate; and wherein in the same side edge region, an orthographic projection of the second line segment on the base substrate is located on a side of an orthographic projection of the fourth line segment on the base substrate away from the orthographic projection of the third common signal line on the base substrate.

9. The display substrate of claim 8, further comprising a gate driving circuit, wherein the gate driving circuit is located in at least one of the side edge regions;

wherein in the same side edge region, the orthographic projection of the fourth line segment on the base substrate is located on a side of an orthographic projection of the gate driving circuit on the base substrate close to the orthographic projection of the third common signal line on the base substrate.

10. The display substrate of claim 7, wherein in the same side edge region, orthographic projections of the plurality of second touch leads on the base substrate are located on a side of an orthographic projection of the fourth line segment on the base substrate away from an orthographic projection of the second line segment on the base substrate.

11. The display substrate of claim 6, wherein orthographic projections of the plurality of first touch lines on the base substrate and orthographic projections of the plurality of first touch leads on the base substrate define a third pattern, and orthographic projections of the plurality of second touch lines on the base substrate and orthographic projections of the plurality of second touch leads on the base substrate define a fourth pattern; and wherein an orthographic projection of the first common signal line on the base substrate at least partially surrounds the third pattern, and an orthographic projection of the second common signal line on the base substrate at least partially surrounds the fourth pattern.

12. The display substrate of claim 1, further comprising a first conductive layer, a first transparent electrode layer and a first insulation layer, wherein the first transparent electrode layer is located on a side of the first conductive layer away from the base substrate, the first insulation layer is located on a side of the first transparent electrode layer away from the base substrate, and the plurality of first touch lines are located in the first conductive layer;

wherein at least one sub-pixel comprises a first transistor and a pixel electrode, the pixel electrode is located in the first transparent electrode layer, a first electrode of the first transistor is located in the first conductive layer, and the first insulation layer covers the pixel electrode, the first electrode of the first transistor and the plurality of first touch lines; and wherein in the at least one sub-pixel, the pixel electrode is in connection with the first electrode of the first transistor.

13. The display substrate of claim 1, further comprising a first conductive layer, a second insulation layer, a third conductive layer, a first transparent electrode layer and a first insulation layer, wherein the second insulation layer is located on a side of the third conductive layer away from the base substrate, the first conductive layer is located on a side of the second insulation layer away from the base substrate, the first transparent electrode layer is located on a side of the first conductive layer away from the base substrate, and the first insulation layer is located on a side of the first transparent electrode layer away from the base substrate;

wherein the plurality of first touch lines are located in the first conductive layer;

wherein at least one sub-pixel comprises a first transistor and a pixel electrode, the pixel electrode is located in the first transparent electrode layer, a first electrode of the first transistor is located in the third conductive layer, the second insulation layer covers the first electrode of the first transistor, and the first insulation layer covers the pixel electrode and the plurality of first touch lines; and wherein in the at least one sub-pixel, the pixel electrode is electrically connected to the first electrode of the first transistor through a first via hole penetrating through the second insulation layer.

14. The display substrate of claim 1, further comprising a first conductive layer on the base substrate, wherein the display substrate further comprises a plurality of data lines, and the plurality of data lines extend in the first direction;

wherein the plurality of data lines and the plurality of first touch lines are located in the first conductive layer, and orthographic projections of the plurality of first touch lines on the base substrate do not overlap with orthographic projections of the plurality of data lines on the base substrate;

wherein the plurality of sub-pixels comprise a plurality of sub-pixel groups arranged in the second direction, and at least one sub-pixel group comprises a plurality of the sub-pixels arranged in the first direction; and wherein a plurality of the sub-pixel groups are disposed between two adjacent first touch lines.

15. The display substrate of claim 1, further comprising a second conductive layer on the base substrate;

wherein the display substrate further comprises a plurality of gate lines and a plurality of common electrode lines, the plurality of gate lines extend in the second direction, the plurality of common electrode lines extend in the second direction, and the plurality of common electrode lines are electrically connected to common electrodes of the plurality of sub-pixels;

wherein the plurality of second touch lines, the plurality of gate lines and the plurality of common electrode lines are located in the second conductive layer;

wherein the plurality of sub-pixels comprise a plurality of sub-pixel groups arranged in the second direction, and at least one sub-pixel group comprises a plurality of the sub-pixels arranged in the first direction;

wherein at least one common electrode line, at least one gate line and at least one second touch line are disposed between two adjacent sub-pixels in the first direction; and wherein the second touch line and the common electrode line are symmetrical relative to the gate line between the two adjacent sub-pixels in the first direction.

16. The display substrate of claim 1, further comprising a first conductive layer and a third conductive layer, wherein the third conductive layer is located on a side of the first conductive layer close to the base substrate;

wherein the display substrate further comprises a plurality of data lines, the plurality of data lines extend in the first direction, the plurality of data lines are located in the third conductive layer, and the plurality of first touch lines are located in the first conductive layer; and wherein in the display region, an orthographic projection of at least one first touch line on the base substrate overlaps with an orthographic projection of at least one data line on the base substrate, and a ratio of an area of an overlapping region to an area of the at least one first touch line is greater than or equal to 90%.

17. The display substrate of any one of claim 1, further comprising a second conductive layer and a fourth conductive layer, wherein the fourth conductive layer is located on a side of the second conductive layer close to the base substrate;

wherein the display substrate further comprises a plurality of common electrode lines, the plurality of common electrode lines extend in the second direction, and the plurality of common electrode lines are electrically connected to common electrodes of the plurality of sub-pixels;

wherein the plurality of common electrode lines are located in the fourth conductive layer, and the plurality of second touch lines are located in the second conductive layer; and wherein in the display region, an orthographic projection of at least one second touch line on the base substrate overlaps with an orthographic projection of at least one common electrode line on the base substrate, and a ratio of an area of an overlapping region to an area of the at least one second touch line is greater than or equal to 90%.

18. The display substrate of claim 1, further comprising a first conductive layer, a second conductive layer, a third conductive layer and a fourth conductive layer, wherein the fourth conductive layer, the third conductive layer, the second conductive layer and the first conductive layer are sequentially disposed in a direction away from the base substrate;

wherein the display substrate further comprises a plurality of common electrode lines and a plurality of data lines, the plurality of data lines extend in the first direction, the plurality of common electrode lines extend in the second direction, and the plurality of common electrode lines are electrically connected to common electrodes of the plurality of sub-pixels;

wherein the plurality of first touch lines are located in the first conductive layer, the plurality of second touch lines are located in the second conductive layer, the plurality of data lines are located in the third conductive layer, and the plurality of common electrodes are located in the fourth conductive layer; and wherein in the display region, an orthographic projection of at least one first touch line on the base substrate overlaps with an orthographic projection of at least one data line on the base substrate, and a ratio of an area of an overlapping region to an area of the at least one first touch line is greater than or equal to 90%; and/or, an orthographic projection of at least one second touch line on the base substrate overlaps with an orthographic projection of at least one common electrode line on the base substrate, and a ratio of an area of an overlapping region to an area of the at least one second touch line is greater than or equal to 90%.

19. The display substrate of claim 1, wherein the plurality of sub-pixels comprise a plurality of sub-pixel groups, the plurality of sub-pixel groups are arranged in the second direction, each sub-pixel group comprises a plurality of the sub-pixels arranged in the first direction, wherein the sub-pixels in different sub-pixel groups are different;

wherein at least one first touch line is disposed between two adjacent sub-pixel groups, wherein at least one sub-pixel comprises a common electrode, and the common electrode is provided with a plurality of slits;

wherein in at least one sub-pixel group, an orthographic projection of an $i^{th}$ slit of the plurality of sub-pixels on the base substrate defines a fifth pattern, and an orthographic projection of the at least one first touch line on the base substrate overlaps with the fifth pattern; and wherein i is a positive integer.

20. A display device comprising the display substrate of claim 1.

* * * * *